United States Patent [19]
Takagi et al.

[11] Patent Number: 6,085,028
[45] Date of Patent: Jul. 4, 2000

[54] RECORDING APPARATUS AND METHOD FOR RECORDING AN IMAGE WITH DRIVE DATA CALCULATED IN ACCORDANCE WITH IMAGE DATA AND CONTEXT DATA

[75] Inventors: Shinji Takagi, Kawasaki; Hideki Tanaka, Yokohama; Hiroyuki Hyotani, Tokyo; Takehiko Kasamatsu, Fujisawa, all of Japan

[73] Assignee: Canon Kabushiki Kaisha, Tokyo, Japan

[21] Appl. No.: 08/824,907

[22] Filed: Mar. 26, 1997

[30] Foreign Application Priority Data

Mar. 27, 1996 [JP] Japan .................................. 8-072615

[51] Int. Cl.[7] ............................................... B41B 15/00
[52] U.S. Cl. ..................... 395/115; 395/113; 395/117; 347/57; 347/74
[58] Field of Search ....................... 395/104, 109, 395/113–117; 347/41–47, 3–5, 10–15, 74, 57–60, 65–66

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,384,587 | 1/1995 | Takagi et al. | 347/41 |
| 5,594,478 | 1/1997 | Matsubara et al. | 347/41 |
| 5,625,391 | 4/1997 | Hirabayashi et al. | 347/41 |

FOREIGN PATENT DOCUMENTS

| | | | |
|---|---|---|---|
| 0513989 | 11/1992 | European Pat. Off. | B41J 2/505 |
| 0595517 | 5/1994 | European Pat. Off. | G06K 15/40 |
| 0689159 | 12/1995 | European Pat. Off. | G06K 15/02 |
| 0698491 | 2/1996 | European Pat. Off. | B41J 2/05 |
| 4127560 | 2/1993 | Germany | B41J 2/515 |
| 54-056847 | 5/1979 | Japan | B41M 005/26 |
| 59-123670 | 7/1984 | Japan | B41J 003/04 |
| 59-138461 | 8/1984 | Japan | B05B 013/00 |
| 60-071260 | 4/1985 | Japan | B41J 003/04 |
| 53-030083 | 5/1992 | Japan | B30B 011/02 |

*Primary Examiner*—Leo H. Boudreau
*Assistant Examiner*—Ishrat Sherali
*Attorney, Agent, or Firm*—Fitzpatrick, Cella, Harper & Scinto

[57] ABSTRACT

A data control apparatus is structured to execute complementary recording on one pixel array by dividing the scans of a recording head into four. In a nozzle context memory, the nozzle context data, which can be updated, are stored as control data to determine discharge or non-discharge of ink from discharge ports. In an operational circuit, the nozzle context data and image data are processed operationally, thus outputting drive data for the recording head. The data that indicates ink discharge in one pixel array are sequentially assigned to recording data per scan appropriately by use of the nozzle context data and the operational circuit. With the structure thus arranged, it is possible to implement making the capacity of memory smaller for use of data to control recording or non-recording, and also, to execute an intermittent recording by controlling recording or non-recording as required.

60 Claims, 23 Drawing Sheets

FIG. 2

OUTPUT OF OUTPUT BUFFER (DI) 102

| (PIXEL ARRAY) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1001 | 1 | 1 | 1 | 1 | 0 | 0 | 0 | 1 | 1 | 0 | 0 | 0 | 0 | 1 | 1 | 0 |
| 1002 | 0 | 1 | 1 | 1 | 1 | 1 | 0 | 1 | 1 | 1 | 1 | 0 | 1 | 0 | 1 | 1 |
| 1003 | 1 | 1 | 1 | 1 | 1 | 1 | 1 | 1 | 1 | 1 | 1 | 1 | 1 | 1 | 1 | 1 |
| 1004 | 1 | 0 | 0 | 0 | 0 | 1 | 0 | 0 | 0 | 0 | 1 | 0 | 0 | 0 | 0 | 1 |

(LINE NUMBER)

FIG. 3A (PIXEL ARRAY)    OUTPUT OF NOZZLE CONTEXT (S1)    105 (DISCHARGE PORT NUMBER)

FIRST SCAN

| Line | 1 | 2 | 3 | 4 | 5 | 6 | 7 | 8 | 9 | 10 | 11 | 12 | 13 | 14 | 15 | 16 | # |
|---|---|---|---|---|---|---|---|---|---|---|---|---|---|---|---|---|---|
| 1001 | 0 | 1 | 2 | 3 | 0 | 0 | 0 | 1 | 2 | 2 | 2 | 2 | 2 | 3 | 0 | | #97 |
| 1002 | 0 | 0 | 1 | 2 | 3 | 0 | 1 | 1 | 2 | 3 | 0 | 1 | 1 | 2 | 2 | 3 | #98 |
| 1003 | 0 | 1 | 2 | 3 | 0 | 1 | 2 | 3 | 0 | 1 | 2 | 3 | 0 | 1 | 2 | 3 | #99 |
| 1004 | 0 | 1 | 1 | 1 | 1 | 2 | 2 | 2 | 2 | 3 | 3 | 3 | 3 | 3 | 3 | 3 | #100 |

(LINE NUMBER)

FIG. 3B

SECOND SCAN

| Line | 1 | 2 | 3 | 4 | 5 | 6 | 7 | 8 | 9 | 10 | 11 | 12 | 13 | 14 | 15 | 16 | # |
|---|---|---|---|---|---|---|---|---|---|---|---|---|---|---|---|---|---|
| 1001 | 0 | 1 | 2 | 3 | 0 | 0 | 0 | 1 | 2 | 2 | 2 | 2 | 2 | 3 | 0 | | #65 |
| 1002 | 0 | 0 | 1 | 2 | 3 | 0 | 1 | 1 | 2 | 3 | 0 | 1 | 1 | 2 | 2 | 3 | #66 |
| 1003 | 0 | 1 | 2 | 3 | 0 | 1 | 2 | 3 | 0 | 1 | 2 | 3 | 0 | 1 | 2 | 3 | #67 |
| 1004 | 0 | 1 | 1 | 1 | 1 | 2 | 2 | 2 | 2 | 3 | 3 | 3 | 3 | 3 | 3 | 3 | #68 |

FIG. 3C

THIRD SCAN

| Line | 1 | 2 | 3 | 4 | 5 | 6 | 7 | 8 | 9 | 10 | 11 | 12 | 13 | 14 | 15 | 16 | # |
|---|---|---|---|---|---|---|---|---|---|---|---|---|---|---|---|---|---|
| 1001 | 0 | 1 | 2 | 3 | 0 | 0 | 0 | 1 | 2 | 2 | 2 | 2 | 2 | 3 | 0 | | #33 |
| 1002 | 0 | 0 | 1 | 2 | 3 | 0 | 1 | 1 | 2 | 3 | 0 | 1 | 1 | 2 | 2 | 3 | #34 |
| 1003 | 0 | 1 | 2 | 3 | 0 | 1 | 2 | 3 | 0 | 1 | 2 | 3 | 0 | 1 | 2 | 3 | #35 |
| 1004 | 0 | 1 | 1 | 1 | 1 | 2 | 2 | 2 | 2 | 3 | 3 | 3 | 3 | 3 | 3 | 3 | #36 |

FIG. 3D

FOURTH SCAN

| Line | 1 | 2 | 3 | 4 | 5 | 6 | 7 | 8 | 9 | 10 | 11 | 12 | 13 | 14 | 15 | 16 | # |
|---|---|---|---|---|---|---|---|---|---|---|---|---|---|---|---|---|---|
| 1001 | 0 | 1 | 2 | 3 | 0 | 0 | 0 | 1 | 2 | 2 | 2 | 2 | 2 | 3 | 0 | | #1 |
| 1002 | 0 | 0 | 1 | 2 | 3 | 0 | 1 | 1 | 2 | 3 | 0 | 1 | 1 | 2 | 2 | 3 | #2 |
| 1003 | 0 | 1 | 2 | 3 | 0 | 1 | 2 | 3 | 0 | 1 | 2 | 3 | 0 | 1 | 2 | 3 | #3 |
| 1004 | 0 | 1 | 1 | 1 | 1 | 2 | 2 | 2 | 2 | 3 | 3 | 3 | 3 | 3 | 3 | 3 | #4 |

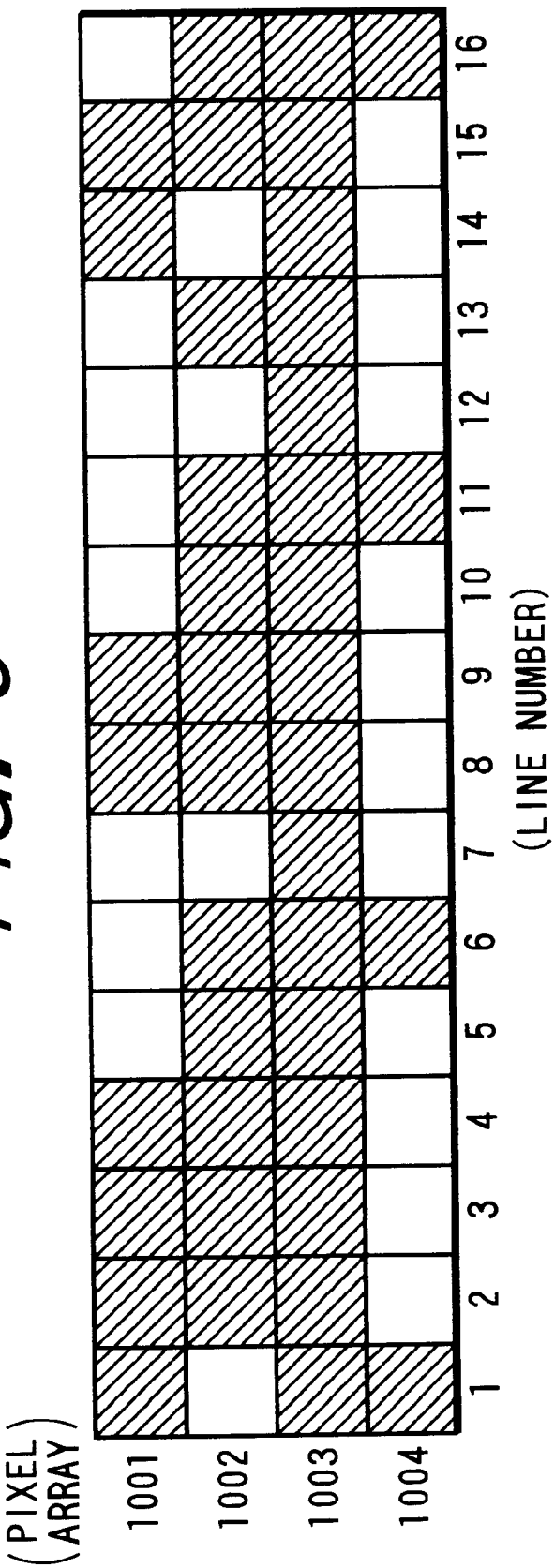

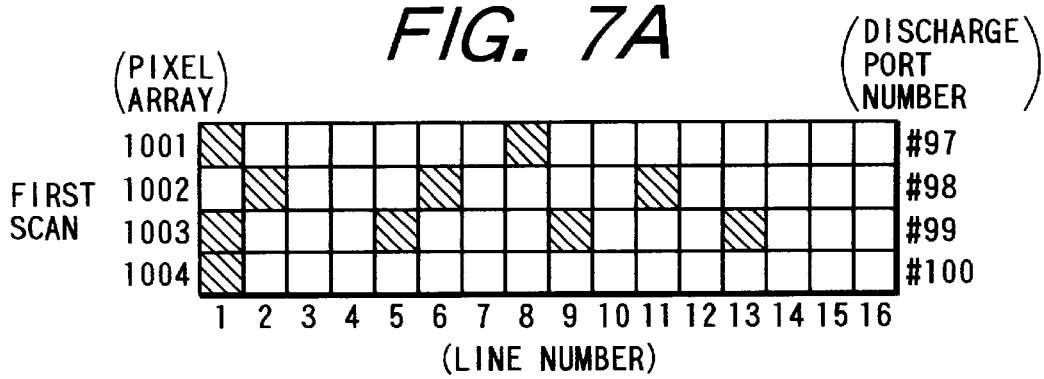
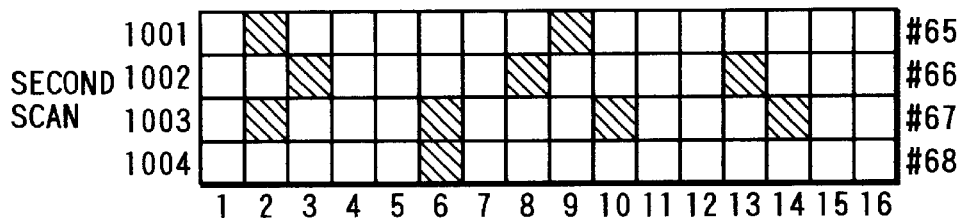
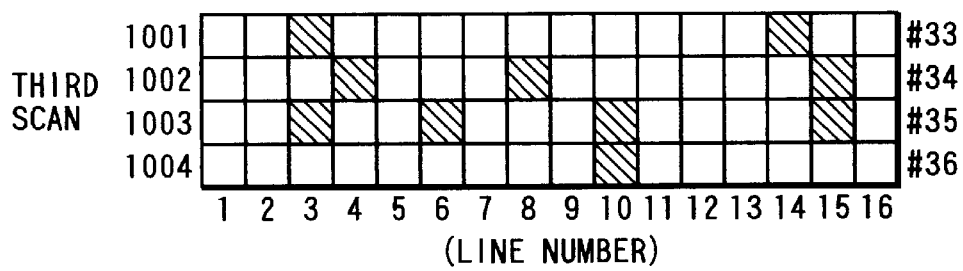
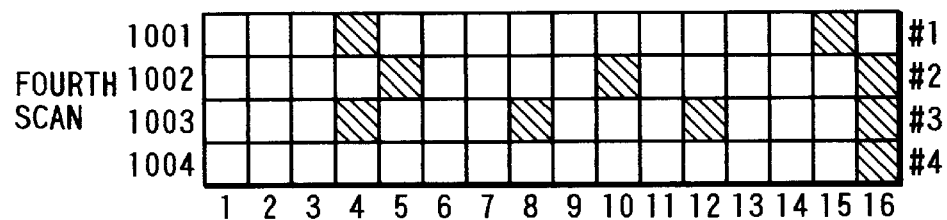

FIG. 8

| | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| 1001 | ▨ | ▨ | ▨ | ▨ | | | | ▨ | ▨ | | | | | ▨ | ▨ | | |
| FIRST SCAN → | #97 | | | | | | | #97 | | | | | | | | | 2 (USED NUMBER OF DISCHARGE PORT) |
| SECOND SCAN → | | #65 | | | | | | | #65 | | | | | | | | 2 (USED NUMBER OF DISCHARGE PORT) |
| THIRD SCAN → | | | #33 | | | | | | | | | | | #33 | | | 2 (USED NUMBER OF DISCHARGE PORT) |
| FOURTH SCAN → | | | | #1 | | | | | | | | | | | #1 | | 2 (USED NUMBER OF DISCHARGE PORT) |

FIG. 10A

OUTPUT OF NOZZLE CONTEXT (S1)

(PIXEL ARRAY) 105 (DISCHARGE PORT NUMBER)

FIRST SCAN

| | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| 1001 | 1 | 2 | 5 | 3 | 7 | 7 | 7 | 6 | 4 | 4 | 4 | 4 | 4 | 1 | 2 | | #65 |
| 1002 | 1 | 1 | 2 | 5 | 3 | 7 | 6 | 6 | 4 | 1 | 2 | 5 | 5 | 3 | 3 | 7 | #66 |
| 1003 | 1 | 2 | 5 | 3 | 7 | 6 | 4 | 1 | 2 | 5 | 3 | 7 | 6 | 4 | 1 | 2 | #67 |
| 1004 | 1 | 2 | 2 | 2 | 2 | 5 | 5 | 5 | 5 | 5 | 7 | 7 | 7 | 7 | 7 | 7 | #68 |

(LINE NUMBER)

FIG. 10B

SECOND SCAN

| | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| 1001 | 1 | 2 | 5 | 3 | 7 | 7 | 7 | 6 | 4 | 4 | 4 | 4 | 4 | 1 | 2 | | #1 |
| 1002 | 1 | 1 | 2 | 5 | 3 | 7 | 6 | 6 | 4 | 1 | 2 | 5 | 5 | 3 | 3 | 7 | #2 |
| 1003 | 1 | 2 | 5 | 3 | 7 | 6 | 4 | 1 | 2 | 5 | 3 | 7 | 6 | 4 | 1 | 2 | #3 |
| 1004 | 1 | 2 | 2 | 2 | 2 | 5 | 5 | 5 | 5 | 5 | 7 | 7 | 7 | 7 | 7 | 7 | #4 |

FIG. 11A

FIRST SCAN — pixel arrays 1001–1004, discharge ports #65–#68

FIG. 11B

SECOND SCAN — pixel arrays 1001–1004, discharge ports #1–#4

FIG. 13

| | 1 | 2 | 3 | 4 | 5 | 6 | 7 | 8 | 9 | 10 | 11 | 12 | 13 | 14 | 15 | 16 | 4 (USED NUMBER OF DISCHARGE PORT) | 4 (USED NUMBER OF DISCHARGE PORT) |
|---|---|---|---|---|---|---|---|---|---|---|---|---|---|---|---|---|---|---|
| 1001 | ▨ | ▨ | ▨ | ▨ | | | | ▨ | ▨ | | | | | ▨ | ▨ | | | |
| FIRST SCAN | #1 | #1 | | #1 | | | | | | | | | | | #1 | | | |
| SECOND SCAN | | | #65 | | | | | #65 | #65 | | | | | #65 | | | | |

FIG. 14A

| NOZZLE NUMBER 1–32 ||||
|---|---|---|---|
| D1 | S1 | D0 | S0 |
| 0 | 0 | 0 | 0 |
| 0 | 1 | 0 | 1 |
| 0 | 2 | 0 | 2 |
| 0 | 3 | 0 | 3 |
| 1 | 0 | 0 | 1 |
| 1 | 1 | 0 | 2 |
| 1 | 2 | 0 | 3 |
| 1 | 3 | 1 | 0 |

FIG. 14B

| NOZZLE NUMBER 33–64 ||||
|---|---|---|---|
| D1 | S1 | D0 | S0 |
| 0 | 0 | 0 | 0 |
| 0 | 1 | 0 | 1 |
| 0 | 2 | 0 | 2 |
| 0 | 3 | 0 | 3 |
| 1 | 0 | 0 | 1 |
| 1 | 1 | 0 | 2 |
| 1 | 2 | 1 | 3 |
| 1 | 3 | 0 | 0 |

FIG. 14C

| NOZZLE NUMBER 65–96 ||||
|---|---|---|---|
| D1 | S1 | D0 | S0 |
| 0 | 0 | 0 | 0 |
| 0 | 1 | 0 | 1 |
| 0 | 2 | 0 | 2 |
| 0 | 3 | 0 | 3 |
| 1 | 0 | 0 | 1 |
| 1 | 1 | 1 | 2 |
| 1 | 2 | 0 | 3 |
| 1 | 3 | 0 | 0 |

FIG. 14D

| NOZZLE NUMBER 97–128 ||||
|---|---|---|---|
| D1 | S1 | D0 | S0 |
| 0 | 0 | 0 | 0 |
| 0 | 1 | 0 | 1 |
| 0 | 2 | 0 | 2 |
| 0 | 3 | 0 | 3 |
| 1 | 0 | 1 | 1 |
| 1 | 1 | 0 | 2 |
| 1 | 2 | 0 | 3 |
| 1 | 3 | 0 | 0 |

FIG. 15A

| \\ | NOZZLE NUMBER 1-64 | | |
|---|---|---|---|
| D1 | S1 | D0 | S0 |
| 0 | 0 | 0 | 0 |
| 0 | 1 | 0 | 1 |
| 0 | 2 | 0 | 2 |
| 0 | 5 | 0 | 5 |
| 0 | 3 | 0 | 3 |
| 0 | 7 | 0 | 7 |
| 0 | 6 | 0 | 6 |
| 0 | 4 | 0 | 4 |
| 1 | 0 | 0 | 0 |
| 1 | 1 | 1 | 2 |
| 1 | 2 | 1 | 5 |
| 1 | 5 | 0 | 3 |
| 1 | 3 | 1 | 7 |
| 1 | 7 | 0 | 6 |
| 1 | 6 | 0 | 4 |
| 1 | 4 | 0 | 1 |

FIG. 15B

| \\ | NOZZLE NUMBER 65-124 | | |
|---|---|---|---|
| D1 | S1 | D0 | S0 |
| 0 | 0 | 0 | 0 |
| 0 | 1 | 0 | 1 |
| 0 | 2 | 0 | 2 |
| 0 | 5 | 0 | 5 |
| 0 | 3 | 0 | 3 |
| 0 | 7 | 0 | 7 |
| 0 | 6 | 0 | 6 |
| 0 | 4 | 0 | 4 |
| 1 | 0 | 0 | 0 |
| 1 | 1 | 0 | 2 |
| 1 | 2 | 0 | 5 |
| 1 | 5 | 1 | 3 |
| 1 | 3 | 0 | 7 |
| 1 | 7 | 1 | 6 |
| 1 | 6 | 1 | 4 |
| 1 | 4 | 1 | 1 |

FIG. 18

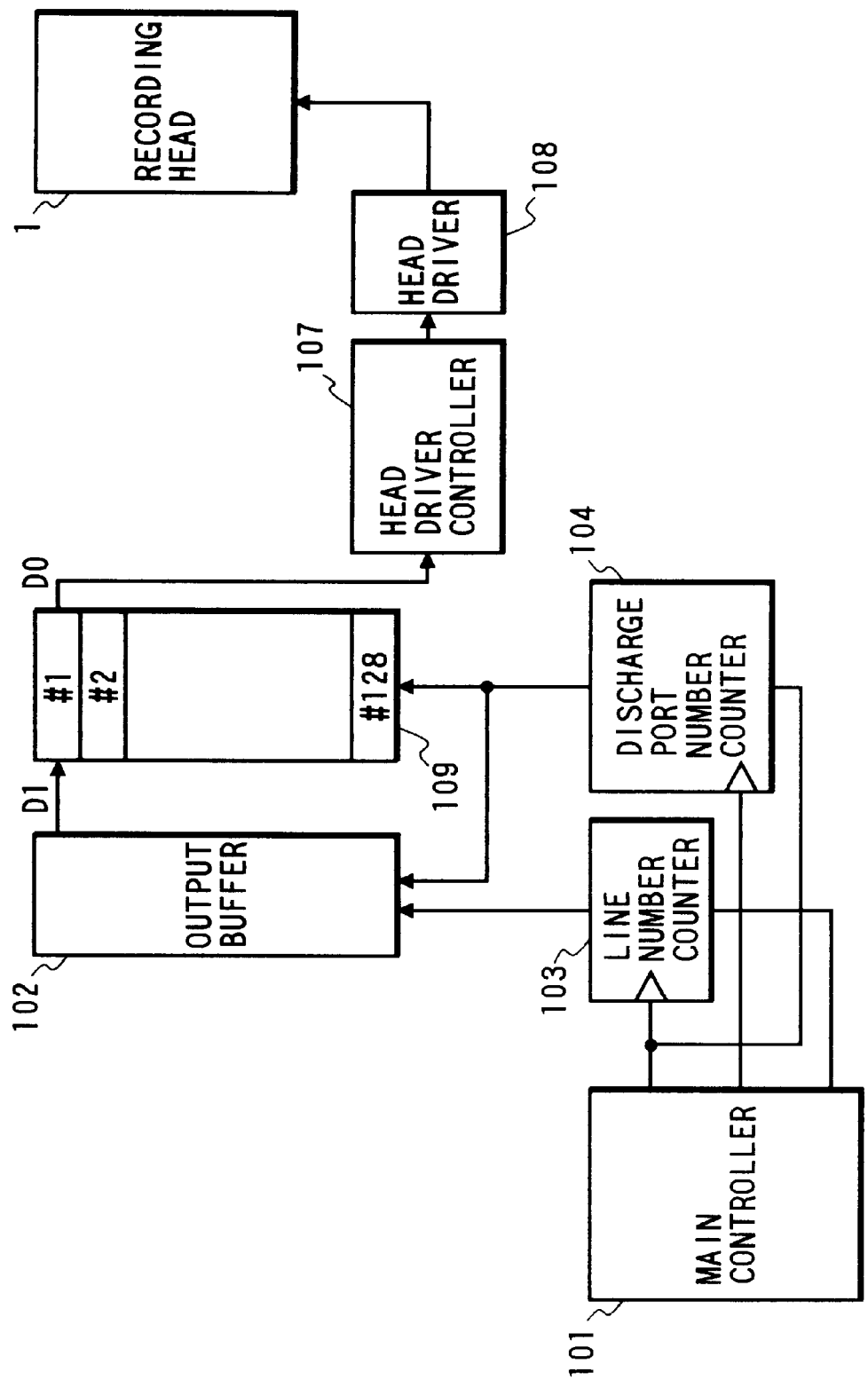

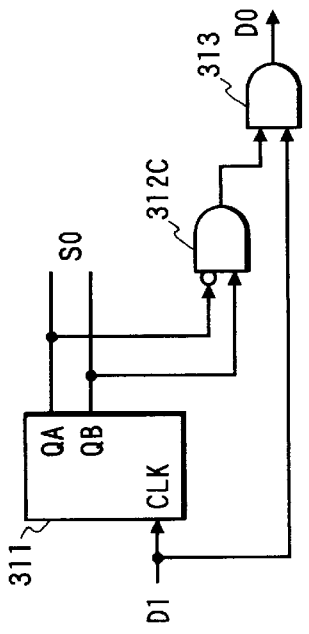
FIG. 21A PROCESSING CIRCUIT CORRESPONDING TO DISCHARGE PORT NUMBER 1-32
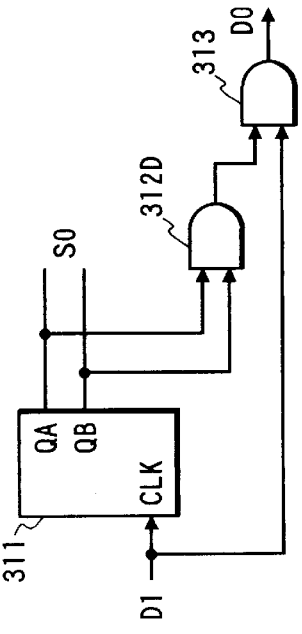
FIG. 21B PROCESSING CIRCUIT CORRESPONDING TO DISCHARGE PORT NUMBER 33-64
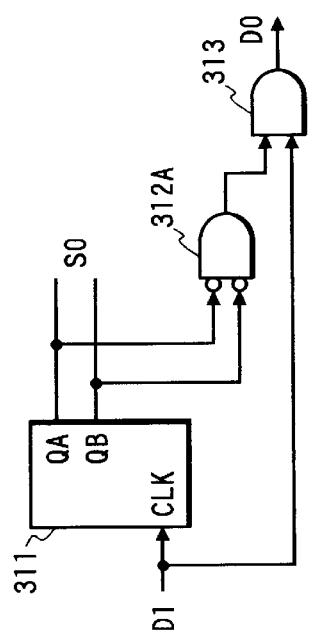
FIG. 21C PROCESSING CIRCUIT CORRESPONDING TO DISCHARGE PORT NUMBER 65-96
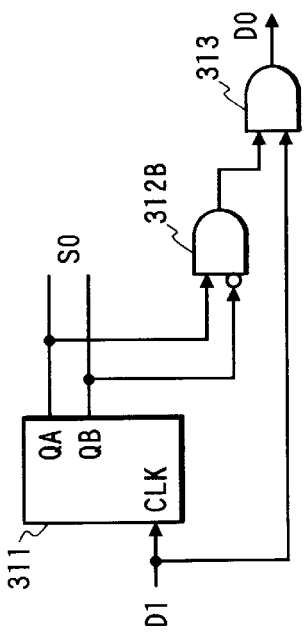
FIG. 21D PROCESSING CIRCUIT CORRESPONDING TO DISCHARGE PORT NUMBER 97-128

PROCESSING CIRCUIT CORRESPONDING
TO DISCHARGE PORT NUMBER 1–64

PROCESSING CIRCUIT CORRESPONDING
TO DISCHARGE PORT NUMBER 65–128

RECORDING APPARATUS AND METHOD FOR RECORDING AN IMAGE WITH DRIVE DATA CALCULATED IN ACCORDANCE WITH IMAGE DATA AND CONTEXT DATA

BACKGROUND OF THE INVENTION

1. Field of the Invention

The present invention relates to an ink jet recording apparatus that discharges ink liquid to a recording medium for the formation of images thereon, and an ink jet recording method therefor. More particularly, the invention relates to an ink jet recording apparatus capable of attaining image recording in high quality and in high precision as well. The invention also relates to an ink jet recording method therefor.

2. Related Background Art

There have been widely known recording apparatuses that adopt the ink jet method whereby to form images by discharging ink to an recording medium. The ink jet recording method is of a recording method of a non-impact type. Therefore, its noises are smaller. Also, this method has an advantage, among others, that color images can be recorded easier by use of multiple color ink. With such advantages this method has, it becomes more popular increasingly and rapidly in recent years.

Also, for the ink jet method, the bubble jet method is known, in which electrothermal transducing elements (or heaters) that serve as means for discharging ink are used for the generation of air bubbles in ink by giving thermal energy generated by the electrothermal transducing elements to ink, and then, ink is discharged by the utilization of pressures exerted when air bubbles are generated. This bubble jet method makes it possible to arrange discharge ports in high density. Also, it has an advantage that apparatuses can be fabricated smaller, while performing image recording in higher resolution.

For the recording head of an ink jet method, the so-called multiple nozzle head is generally used. For this head, a plurality of ink discharge ports are arranged to enable plural ink droplets to be discharged at a time by use of recording elements provided for the recording head. In accordance with a recording head of the kind where a plurality of ink discharge ports are arranged, it is possible to form a plurality of dots at a time, and also, to shorten a period of time required for recording characters, images, and the like, which are formed by the collection of such dots. The recording speed of the apparatus can be enhanced as a whole accordingly.

However, it is known that there are the problems as given below with respect to recording by use of the multiple nozzle head described above.

In other words, for a recording head of the kind, it is difficult to manufacture a plurality of ink discharge ports and recording elements uniformly. As a result, recorded dots become uneven to a certain extent inevitably. For the multiple nozzle head, the amount of ink droplets and the discharging direction thereof are varied minutely, for example, due to the variation in the configuration of ink discharge ports and some other factors. Also, for the recording elements that discharge ink, its discharging performance is caused to vary, producing adverse effect upon discharged ink droplets. Also, in the bubble jet method described above, it is obvious that difference in the thermal energy generated by each of the individual recording elements makes the discharged ink droplets uneven.

As described above, unevenness occurs in the densities of recorded images if the sizes and densities of dots to be recorded are made uneven.

Particularly, for a recording apparatus of a serial type where recording is made while the recording head travels, the density unevenness takes place in the scanning of the recording head itself, at first, and then, the patterns of uneven density are formed repeatedly by a specific cycle due to the repeated scanning. Such patterns repeatedly made in a specific cycle can easily be observed visually by eyesight. In such case, therefore, the quality of recorded images and the like becomes remarkably inferior.

In order to reduce a density unevenness of the kind for the serial type recording apparatus, there has been proposed a method called a multiple scan where the feeding amount of a recording medium per scan of the recording head is made smaller than the recording width of the recording head, and an image in a given area is completed by the application of several scans. In accordance with this method, pixels on a given line in the scanning direction of the recording head are recorded by use of different discharge ports per scan. As a result, the density unevenness, which is characteristic of each discharge port of the ink jet head, is scattered in the recorded image, thus making its density unevenness less conspicuous.

Also, the defective discharge may take place in a particular ink discharge port of a multiple nozzle head and causes the generation of density unevenness in a recorded image or the discharge amount may vary due to the difference in use frequency of the discharge ports of the head. If use frequencies may differ greatly between each of them, the discharge amount of each discharge port varies. As a result, the density unevenness occurs in the recording image. Also, if the defective discharge takes place in a discharge port whose use frequency is particularly high, a problem arises to present more conspicuous streaks and density unevenness. Moreover, if it is arranged to form an image by the frequent use of only specific ink discharge ports, the use frequencies of ink discharge ports are greatly deviated among them. As a result, the probability of malfunction becomes higher for the discharge port whose use frequency is high. In other words, a problem is encountered that the life of a recording head becomes shorter eventually.

As means for solving these problems, a technique is disclosed in the specification of Japanese Patent Laid-Open Application No. 5-330083 wherein different discharge ports are used per pixel when forming pixels, and at the same time, the use frequencies of discharge ports are made uniform. In accordance with the disclosed technique, plural pixels contained in a given line in the main scanning direction are formed by the application of several scans, while a control is given so that plural pixels to be recorded are assigned to the corresponding discharge ports in a specific order per scan. In this way, the ink discharge ports are used uniformly, thus making it possible to prolong the life of the recording head. Also, even if defective discharge or other drawbacks take place in part of the discharge ports, the location of pixels that are not formed due to the defective discharges are scattered to make such pixels less conspicuous.

Now, the recording process will be described in accordance with such conventional method described above.

FIG. 5A is a view which schematically shows an ink jet type recording head 1 provided with a plurality of ink discharge ports (hereinafter, simply referred to as discharge ports). In FIG. 5A, 128 discharge ports are arranged in the direction from the upper part to the down part of the recording head 1. Here, the numbers marked with # are those indicating the positions of the discharge ports. For the recording head 1, the discharge ports #1 to #128 are provided.

Also, FIG. 5B is a view which illustrates the conventional recording method using the recording head 1. In FIG. 5B, an example is shown, in which an image is formed by scanning a given recording area with the recording head 1 four times. This example shows a recording method adopted for a so-called serial printer. The recording head 1 performs its recording while scanning in the main scanning direction indicated by a reference mark X, and the recording medium is fed in the sub-scanning direction indicated by a reference mark Y in FIG. 5B. This feeding of the recording medium should be good enough if only its operation is such that a recording medium shifts relatively with respect to the recording head. It may be possible to arrange so that a recording head is arranged to move in the sub-scanning direction while a recording medium is fixed. For the example shown in FIG. 5B, it is arranged that the recording head 1 moves relatively with respect to the recording medium in order to describe the recording positions of the recording head 1 on the recording medium.

Also, in FIG. 5B, reference numerals 1001, 1002, 1003, and 1004 designate the corresponding pixel arrays in the main scanning direction of the recording head 1, which are adjacent to each other in the arrangement direction of the discharge ports of the recording head 1, respectively.

In FIG. 5B, the pixel array 1001 is formed by ink droplets discharged from the discharge port numbers #97, #65, #33, and #1, respectively, at each of the four-time scans of the head, for example.

FIG. 6 is a view which illustrates an image formed on a recording sheet by the application of the recording method shown in FIGS. 5A and 5B. Each square represents the position where one pixel is formed. The squares indicated by slanted lines represent pixels formed by discharged ink. In FIG. 6, reference numerals 1001 to 1004 designate those pixel arrays shown in FIG. 5B. The numbers 1 to 16 shown in the lower part of FIG. 6 are line numbers that indicate recording positions in the main scanning direction of the recording head 1. In FIG. 6, only pixels designated by the numbers 1 to 16 are described for convenience's sake.

FIGS. 7A, 7B, 7C, and 7D represent each of the images formed by each scanning when the image shown in FIG. 6 is formed by the four-time scans as shown in FIG. 5B. Each of them corresponds to each image formed at the time of first to fourth scans, respectively. In FIGS. 7A, 7B, 7C and 7D, one square represents the position where one pixel is formed as in FIG. 6. The squares with slanted lines indicate pixels formed by discharged ink. The numbers with # shown on the right-hand side of each figure designate the discharge port numbers that correspond to the pixel positions in each of the pixel array. Also, the numbers shown in the lower part of each figure correspond to the line numbers represented in FIG. 6, respectively.

FIG. 8 is a view which illustrates the recorded pixels in the pixel array by use of the respective discharge ports per each scan in order to form them in such pixel array with attention given to the pixel array 1001 in the main scanning direction of the recording head 1.

In FIG. 8, one square represents the position where one pixel is formed as in FIG. 6 and FIG. 7A, 7B, 7C and 7D. The squares with slanted lines represent the pixels to be recorded by discharged ink. Also, each number with # and the number shown in the lower part of FIG. 8 are the same as those shown in FIG. 6 and FIGS. 7A, 7B, 7C and 7D.

On referring to FIG. 8, it is understandable that the discharge port numbers #1, #33, #65, and #97 are used twice, respectively, in order to form the pixel array 1001. In this way, with the sequential use of the discharge ports, it becomes possible to almost uniformalize the use frequencies of plural discharge ports, thus making the life of the recording head longer. At the same time, the deterioration of the image quality caused by defective discharges can be reduced, because the positions where pixels are not recorded are scattered even if defective discharges take place; hence obtaining good images.

However, in accordance with the conventional method described above, there is a need for the provision of drive data on discharge/non-discharge of ink per discharge port per scan using a mask pattern or the like. In this case, a large memory capacity is needed depending on the numbers of recording scans to be executed. For example, when one pixel array is formed using different discharge ports of N numbers by recording it with N times of scans on a given recording area, it is required to increase the required memory capacity N times the capacity provided for recording such given recording area by one time scan only. In other words, the total amount of data to be stored on the memory should be calculated as follows:

{(the numbers of discharge ports of a recording head)×(pixel numbers per one pixel array)×N}

Such an increase of memory capacity creates a problem that the costs of an apparatus are inevitably increased as a whole.

Now, among known recording modes made available to recording apparatuses, there is one used for a high-speed recording in order to confirm the recorded result of prints or the like. This is generally called a draft mode. The draft mode is often applied to the case where it takes a long time to output the result of a regular recording, for example, and where such record should be made immediately or the output is made only for a document which is not very important. The draft mode is generally a method in which the pixels to be recorded are intermitted for recording. With the intermitted recording, it is implemented to make the recording speed faster. Among the intermitted patterns, there is a checker pattern, for example. Also, for the draft mode, the numbers of dots to be recorded are smaller than those of regular output. Therefore, this mode is also adopted for the purpose of curtailing ink consumption.

However, if an image is recorded in such draft mode while thinning the pixels to be recorded like a checker pattern, there is a fear that pixels are thinned unpreparedly, and that it tends to produce an image whose characters or the like cannot be recognized easily after all.

SUMMARY OF THE INVENTION

It is an object of the present invention to provide an ink jet recording apparatus capable of implementing the adoption of the memory of a smaller capacity to store data for use of controlling discharge/non-discharge of ink from plural discharge ports when printing is executed by assigning pixels to be formed to the plural discharge ports, and also, capable of assigning pixels to be formed to plural discharge ports appropriately when images are recorded intermittently as in the case of the so-called draft mode or the like, and to provide an ink jet recording method therefor as well.

It is another object of the invention to provide a data control apparatus that controls drive data indicating recording/non-recording by each of the recording elements of a recording head in accordance with image data on images to be recorded for a recording apparatus provided with the recording head having a plurality of recording elements, comprising:

means for storing image data that stores image data in accordance with images to be recorded;

means for storing context data that stores context data for controlling the recording/non-recording of the image data corresponding to the recording elements of the recording head; and calculating means for creating drive data indicating the recording/non-recording of the image data, at the same time, creating new context data corresponding to the recording elements in accordance with the image data to be stored on the means for storing image data, and the context data corresponding to the recording elements for recording the image data.

It is still another object of the invention to provide a data controlling method for controlling drive data indicating recording/non-recording by each of the recording elements of a recording head in accordance with recording image data stored on means for storing image data for the recording apparatus provided with the recording head having a plurality of recording elements, comprising the following steps of:

providing context data for controlling the recording/non-recording of the image data corresponding to the recording elements of the recording head;

creating drive data indicating the recording/non-recording of the image data in accordance with the image data and the context data corresponding to the recording elements that record the image data; and updating the context data for creating new context data corresponding to the recording elements in accordance with the image data, and the context data corresponding to the recording elements that record the image data.

It is a further object of the invention to provide a recording apparatus having a recording head provided with a plurality of recording elements for forming pixels to be recorded on a recording medium; means for storing image data that stores image data in accordance with images to be recorded; and scanning means for enabling the recording head to scan relatively with respect to the recording medium, comprising:

means for storing context data that stores the context data for controlling the recording/non-recording of the image data corresponding to the plural recording elements of the recording head;

calculating means for creating drive data indicating the recording/non-recording of the image data, at the same time, creating new context data corresponding to the recording elements in accordance with the image data to be stored on the means for storing image data, and the context data corresponding to the recording elements for recording the image data; and head driving means for driving the plural recording elements of the recording head in accordance with the drive data.

It is still a further object of the invention to provide a recording method for forming images on a recording medium by driving a recording head relatively with respect to a recording medium in its main scanning by use of the recording head provided with a plurality of recording elements for forming pixels to be recorded on the recording medium, comprising the following steps of:

providing context data for controlling the recording/non-recording of the image data corresponding to the plural recording elements of the recording head;

creating drive data indicating the recording/non-recording of the image data in accordance with the image data and the context data corresponding to the recording elements that record the image data;

updating the context data for creating new context data corresponding to the recording elements in accordance with the image data, and the context data corresponding to the recording elements that record the image data; and recording by driving the plural recording elements of the recording head in accordance with the created drive data.

It is another object of the invention to provide a recording apparatus having an ink jet head provided with a plurality of discharge ports to discharge ink onto a recording medium; main scanning means for enabling the ink jet head to scan in the main scanning direction relatively with respect to the recording medium; conveying means for conveying the recording medium in the sub-scanning direction orthogonal to the main scanning direction; and recording control means for forming images with ink on the recording medium by driving the ink jet head in accordance with the drive data while the ink jet head performs its main scanning by main scanning means, comprising:

image data storing means for storing the image data on images to be recorded, the image data being formed by data indicating pixels to be recorded or pixels not to be recorded;

context data storing means for storing the context data for controlling the recording/non-recording of the image data corresponding to each of the plural discharge ports;

calculating means for creating the drive data in accordance with the image data and the context data corresponding to the discharge ports that record the image data, at the same time, updating the context data in accordance with the data indicating the recording pixels of the image data; and setting means for setting the context data at its initial value per main scan by the main scanning means.

It is still another object of the invention to provide a recording method for a recording apparatus having an ink jet head provided with a plurality of discharge ports to discharge ink onto a recording medium; main scanning means for enabling the ink jet head to scan in the main scanning direction relatively with respect to the recording medium; conveying means for conveying the recording medium in the sub-scanning direction orthogonal to the main scanning direction; and recording control means for forming images with ink on the recording medium by driving the ink jet head in accordance with the drive data while the ink jet head performs its main scanning by main scanning means, comprising the following steps of:

providing image data formed by data indicating pixels to be recorded or pixels not to be recorded with respect to the image to be recorded;

providing context data for controlling the recording/non-recording of the image data corresponding to each of the plural discharge ports;

operating calculations to create the drive data in accordance with the image data and the context data corresponding to the discharge ports that record the image data, and at the same time, update the context data in accordance with the data indicating the recording pixels of the image data; and setting the context data at its initial value per main scan by main scanning means.

BRIEF DESCRIPTION OF THE DRAWINGS

FIG. 2 is a view which illustrates the stored contents of an output buffer represented in FIG. 1.

FIGS. 3A, 3B, 3C and 3D are views which illustrate the states of changes in the stored contents of the nozzle context memory represented in FIG. 1.

FIG. 6 is a view which shows one example of a recorded image.

FIGS. 7A, 7B, 7C and 7D are views which illustrate record images per scans when the image is recorded by separating it into four-time scans.

FIG. 8 is a view which illustrates discharge ports to be used for one pixel array in FIGS. 7A. 7B, 7C and 7D.

FIGS. 10A and 10B are views which illustrate the stored contents of the nozzle context memory in accordance with the second embodiment of the present invention.

FIGS. 11A and 11B are views which illustrate recorded images per scan when the image shown in FIG. 6 is recorded by dividing it into two-time scans in accordance with the second embodiment of the present invention.

FIG. 13 is a view which illustrates the discharge ports to be used for one pixel array shown in FIGS. 11A and 11B.

FIGS. 14A, 14B, 14C and 14D are views which illustrate the processed contents of the operational circuit in accordance with the first embodiment of the present invention.

FIGS. 15A and 15B are views which illustrate the processed contents of the operational circuit in accordance with the second embodiment of the present invention.

FIG. 18 is a view which illustrates changes in the stored contents of the nozzle context memory shown in FIG. 17.

FIG. 19 is a view which shows one example of an image recorded by the recording head represented in FIG. 17.

FIG. 20 is a block diagram which shows the principal part of a fifth embodiment in accordance with the present invention.

FIGS. 21A, 21B, 21C and 21D are views which partly show the structures of the operational circuit represented in FIG. 20.

DETAILED DESCRIPTION OF THE PREFERRED EMBODIMENTS

Hereinafter, with reference to the accompanying drawings, the preferred embodiments of the present invention will be described in detail.

First Embodiment

Figure 5A:
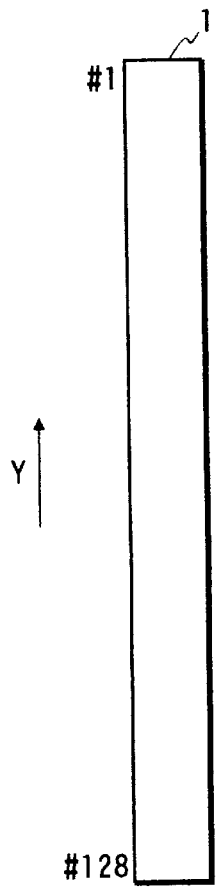
FIGS. 5A and 5B are views which illustrate recording methods for recording separately by means of four-time scans.
Figure 5B:
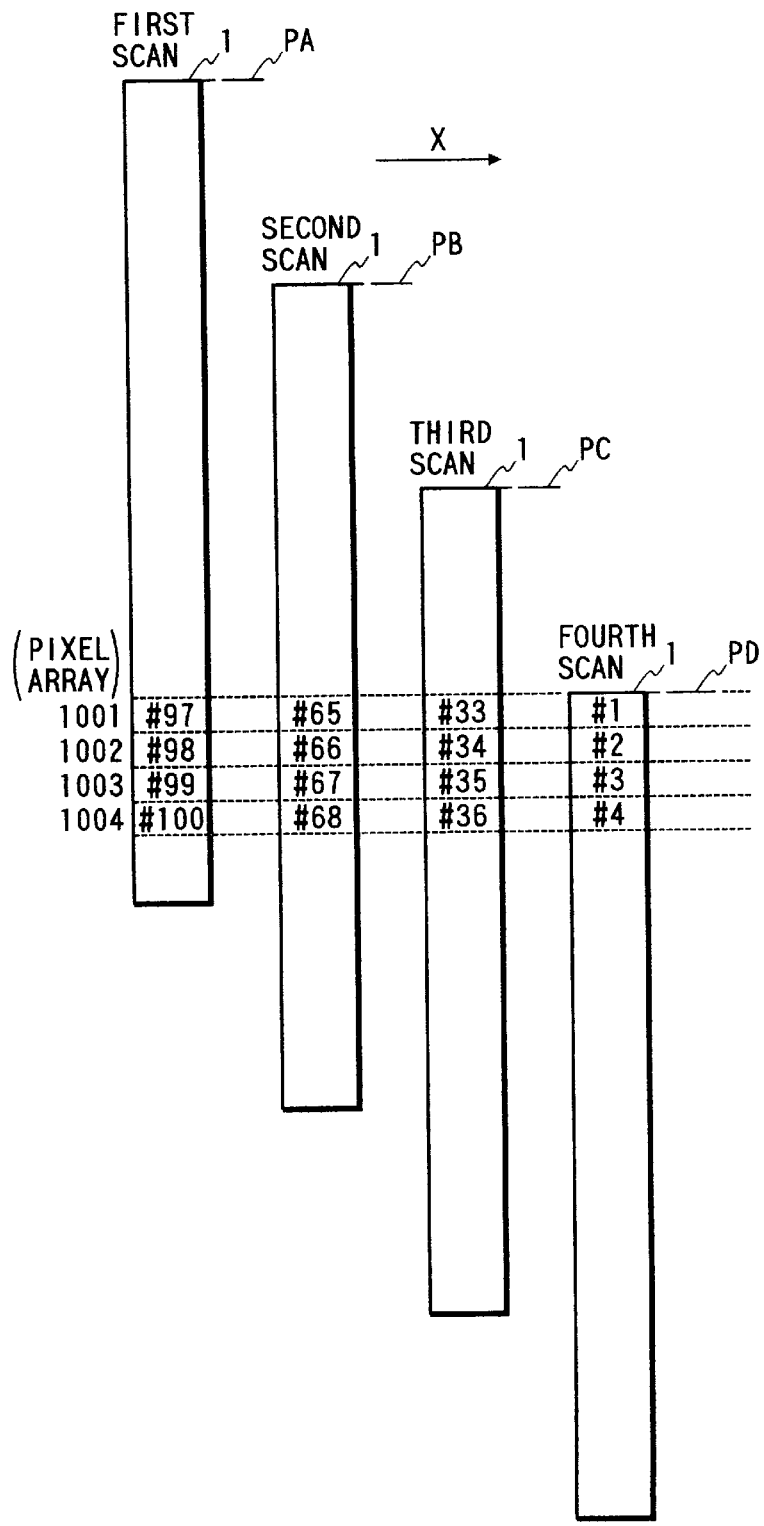

As a recording method, the present embodiment is arranged so that it adopts the recording method that divides scanning into four times in the same manner as described in conjunction with FIGS. 5A and 5B. Also, as its image recording example, the present embodiment records an image as described in conjunction with FIG. 6.

Figure 1:
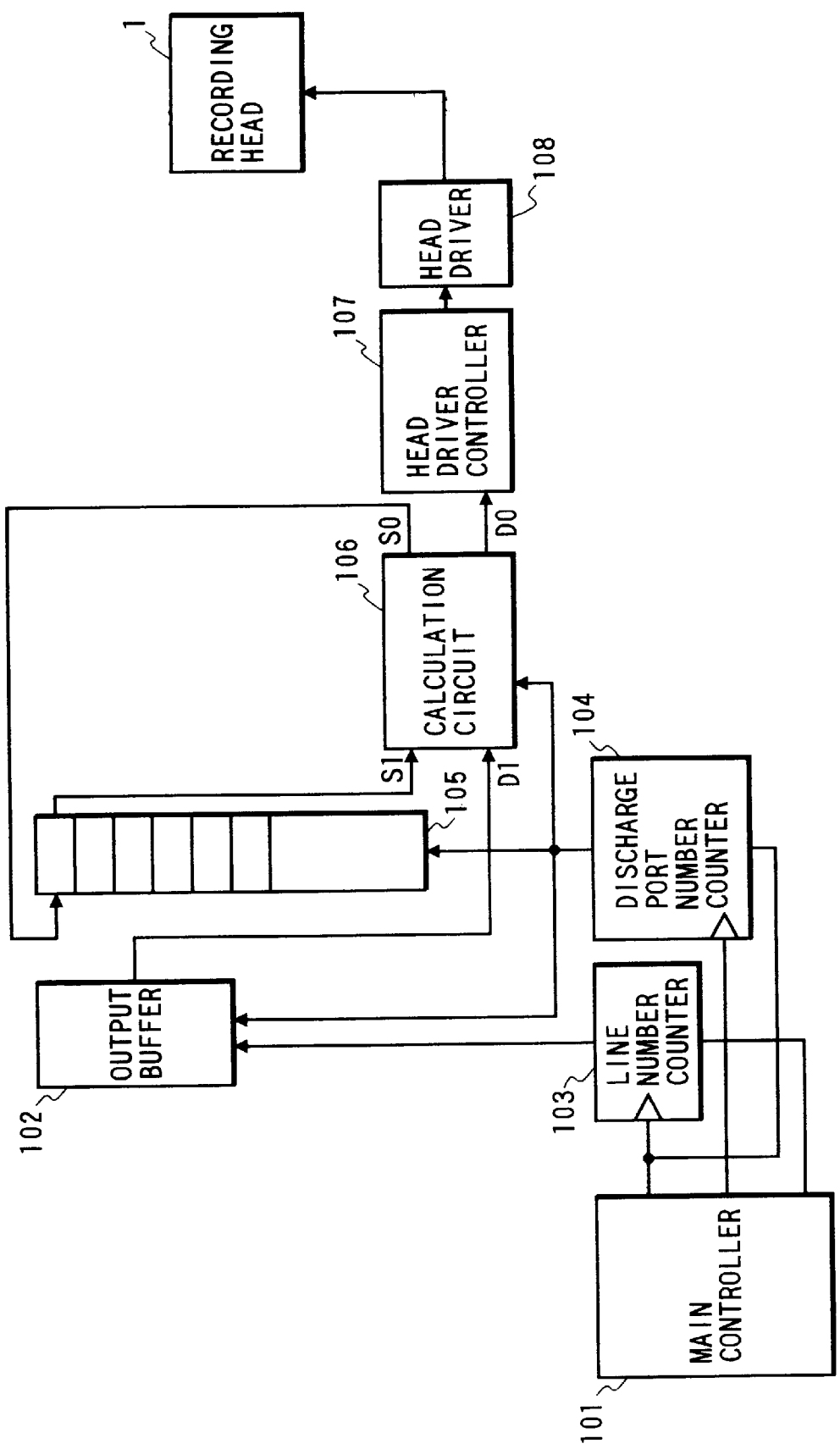
FIG. 1 is a block diagram which shows the structure of the principal part of a first embodiment in accordance with the present invention.

FIG. 1 is a structural block diagram which shows the principal part of a printing apparatus as the first embodiment in accordance with the present invention.

In FIG. 1, a reference numeral 1 designates a recording head, which is provided with 128 discharge ports; 101, a main controller; 102 an output buffer that stores binary data corresponding to dots to be recorded, and the output of the output buffer 102 is a one-bit information, which indicates ink discharge with the output "1", and non-discharge with the output "0"; 103, a counter that indicates the line numbers in the scanning direction of the recording head 1; 104, a counter that indicates the discharge port numbers; 105, a memory that stores control data on each of the discharge ports, and also, stores control data that assign pixels to be formed to a plurality of discharge ports. The control data is provided for each of the discharge ports, and formed with 2-bit data for one discharge port, and is capable of obtaining four status of "0", "1", "2", and "3" (hereinafter, this control data is referred to as a context data or a nozzle context, and 105 is referred to as a nozzle context).

A reference numeral 106 designates an operational circuit, and as described later, it works out head drive data DO and nozzle context SO based upon data DI from the output buffer 102, data SI from the nozzle context memory 105, and the discharge port numbers as well. A reference numeral 107 designates a head driver controller that supplies the output from the operational (calculation) circuit 106 to the recording head 1 in response to the control signals from the main controller 101.

Here, the main controller 101 gives increment at first to the counter that indicates discharge port numbers to let the counter indicate the discharge port numbers sequentially beginning at No. 1. Then, after this counter indicates the discharge port number 12, the main controller gives increment to the counter 103, which indicates the line numbers in the scanning direction.

FIG. 2 is a view which shows one example of the stored contents of the output buffer 102. For the present embodiment, the description will be made using the data that correspond to the image represented in FIG. 6. In other words, one square corresponds to one pixel in FIG. 2, and of the squares, the square given "1" indicates that the corresponding pixel is formed by discharged ink. Also, the square given "0" indicates the position where no ink discharge is provided, thus forming no pixel. In FIG. 2, reference numerals 1001, 1002, 1003, and 1004 designate pixel arrays in the scanning direction of the head 1, respectively. Also, reference numerals 1 to 16 designate the line numbers in the scanning direction of the head 1. For the present embodiment, the description will be made of the lines from 1 to 16 only for convenience sake.

FIGS. 3A, 3B, 3C, and 3D are views schematically showing the sequential changes in the contents of the nozzle context memory 105 by the line numbers at the time of the first, second, third, and fourth scans, respectively, as shown in FIG. 5B. In FIG. 3A, reference numerals 1001, 1002, 1003, and 1004 designate pixel arrays formed by pixels in the scanning direction of the head 1, respectively. These arrays correspond to those shown in FIG. 2. Reference numerals 1 to 16 are also the same, which designate the line numbers in the scanning direction of the head. For example, these numbers are related to the pixel arrays 1001, 1002, 1003, and 1004 in FIG. 3A at the time of the first scan. The control data (context data) that correspond to them are 0, 0, 0, and 0 before recording lines whose line number is 1, and then, the data are rewritten to be 1, 0, 1, 1 by means of the operational circuit 106 before recording lines whose line number is 2.

FIGS. 14A to 14D are views which illustrate the processed contents of the operational circuit 106.

In FIG. 14D, a reference mark DI designates an input from the output buffer 102; DO, an output to the head driver controller 107; SI, an input from the nozzle context memory 105; and SO, an output to the nozzle context memory 105. Also, the input DI from the output buffer 102, and the output DO to the head driver controller 107 are one-bit information, respectively, and "1" indicates ink discharge, and "0" indicates non-discharge of ink. The output DO becomes the drive data to drive the head. Also, the input and output SI and SO with respect to the nozzle context memory 105 are two-bit information, and as described above, these can be in the four different states of 0, 1, 2, and 3. For the present embodiment, the recording head 1 is provided with 128 discharge ports in total. As shown in FIG. 5B, these ports are divided into four groups of 32 discharge ports each in order to complete an image in a give area by the application of four-time scans. The recording sheet is fed by an amount equivalent to the portion of 32 discharge ports per recording scan. The operational circuit 106 makes the contents of process different with respect to the discharge ports of each of the divided groups. In accordance with the present embodiment, the discharge ports are divided into four groups. Therefore, processes are made different for every 32 discharge ports as shown in FIGS. 14A to 14D. For the discharge number from 1 to 32, the process is executed as shown in FIG. 14A; for 33 to 64, as shown in FIG. 14B; 65 to 96, as shown in FIG. 14C; and 97 to 128, as shown in FIG. 14D, respectively.

Figure 4:
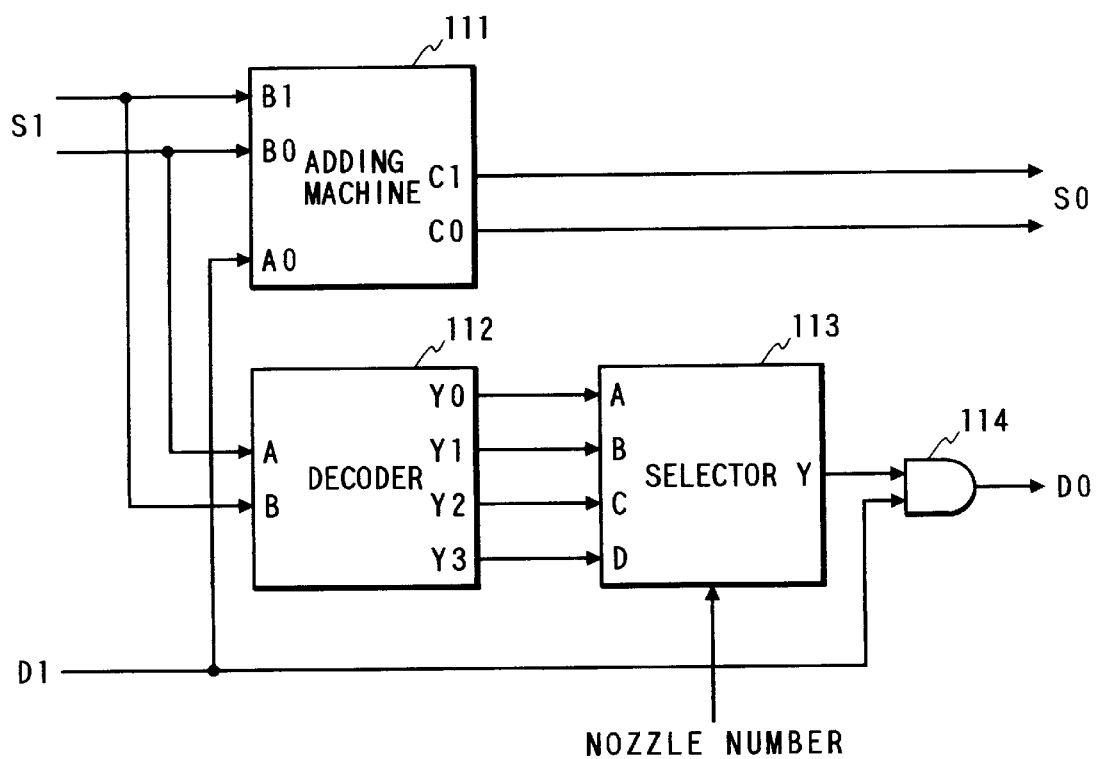
FIG. 4 is a view which partly shows the structure of an operational circuit represented in FIG. 1.

FIG. 4 is a view which shows one example of the circuit, which is structured in the operational circuit 106, in order to implement the process described in conjunction with FIGS. 14A to 14D.

In FIG. 4, a reference numeral 111 designates an adder to add the output DI from the output buffer 102 and the output SI from the nozzle context memory 105; 112, a decoder that develops the two-bit information of the output SI from the nozzle context memory 105 to the four-bit information; 113, a selector that selects the outputs from the decoder 112 in accordance with the discharge port numbers; and 114, an AND circuit (logical product).

Here, the adder 111 adds one-bit DI and two-bit SI (obtaining value 0, 1, 2, and 3), and then, outputs two-bit SO (obtaining value 0, 1, 2, and 3). Also, when SI=3, DI=1, that is, when the adder 111 receives B1="1", B2="1", A0="1", the added value overflows, making the output S0=0, that is, the outputs C0 and C1 from the adder become "0".

The decoder 112 makes Y0=Y1=Y2=Y3="0" when the input SI=0, that is, when the decoder 112 receives A="0", B="0". Also, it makes Y1=1, Y0=Y2=Y3="0" when SI=1; Y2="1", Y0=Y1=Y3="0" when SI=2; and Y3=1, Y0=Y1=Y2=0 when SI=3.

The selector 113 outputs the input A to Y when the nozzle number are 97 to 128; the input B to Y when the nozzle numbers are 65 to 96; the input C to Y when the nozzle number 33 to 64; and the input D to Y when the nozzle numbers are 1 to 32.

Therefore, if, for example, SI=3, DI=1, and the nozzle number 1, the outputs C1 and C1 from the adder 111 become "0", that is, S0=0. At the same time, the decoder 112 makes Y=1, and since the selector 113 selects the input D, the output Y from the selector 113 becomes "1", thus making the output DO of the circuit 114 "1".

A. Outline of the Operation

Now, with reference to FIG. 1, the outline of the operation will be described.

At first, the main controller 101 clears the contents of the nozzle context memory 105 to set the context data at "0" for all the discharge ports. Also, it instructs the counter 103, which indicates the line numbers in the scanning direction, to set the line number 1, while instructing the counter 104, which indicates the discharge port numbers, to set the discharge port number 1.

In this way, the output buffer 102 outputs data DI corresponding to the line number 1 and the discharge port number 1. Also, the nozzle context memory 105 outputs context data SI corresponding to the discharge port number 1.

The operational circuit 106 executes operation in accordance with the outputs from the output buffer 102, nozzle context memory 105, and the counter 104 that indicated the discharge port numbers, and outputs the head drive data DO for the discharge port number 1, and the data SO on the new nozzle context. The nozzle context memory 105 rewrites the context of the discharge port number 1 to the data SO on the new nozzle context output from the operational circuit 106.

The head driver controller 107 controls the head driver 108 in accordance with the head drive data DO on the discharge port number 1 output from the operational circuit 106, thus controlling discharge or non-discharge of ink from the discharge port #1 of the recording head 1.

Then, the main controller 101 lets the counter 104 that indicates the discharge port numbers to increase its value by 1.

Thus, the output buffer 102 outputs the data DI that corresponds to the line number 1 and the discharge port number 2. Also, the nozzle context memory 105 outputs the nozzle context data DI that corresponds to the discharge number 2.

The operational circuit 106 executes operation in accordance with the outputs from the output buffer 102, nozzle context memory 105, and the counter 104 that indicates the discharge port numbers, and outputs the drive data DO for the discharge port number 2, and the data SO on the new nozzle context. The nozzle context memory 105 rewrites the context of the discharge port number 2 to the data SO on the new nozzle context output from the operational circuit 106.

The head driver controller 107 controls the head driver 108 in accordance with the head drive data DO on the discharge port number 2 output from the operational circuit 106, and controls the discharge or non-discharge of ink from the discharge port #2 of the recording head 1.

Thereafter, the same processes will be executed up to the discharge port number 128 of the line number 1.

Then, when the processes required for the line number 1 are completed for all the discharge ports, the processes for the next line number will be executed. The main controller 101 instructs the counter 103 that indicates the line numbers in the scanning direction to increase its counter value by 1 so that the line number 2 is indicated. Also, it instructs the counter 104 that indicates the discharge port numbers so that the discharge number 1 is indicated. Thus, the output buffer 102 outputs the data DI on the line number 2 and the discharge port number 1. Also, the nozzle context memory 105 outputs the data SI on the discharge port number 1.

The operational circuit 106 executes operation in accordance with the outputs from the output buffer 102, nozzle context memory 105, and the counter 104 that indicates the discharge port numbers, and outputs the drive data DO for the discharge port number 1, and the data SO on the new nozzle context. The nozzle context memory 105 rewrites the context of the discharge port number 1 to the data SO on the new nozzle context output from the operational circuit 106.

The head driver controller 107 controls the head driver 108 in accordance with the head drive data DO on the discharge port number 1 output from the operational circuit 106, and controls the discharge or non-discharge of ink from the discharge port #1 of the recording head 1.

Thereafter, the same processes will be executed in the same manner for all the discharge port numbers of all the line numbers in the same manner, hence forming an image.

The operation described above is executed in the same manner each at the first, second, third, and fourth scans as shown in FIGS. 5A and 5B. Before each of the scans is executed, the contents of the nozzle context memory are cleared by means of the main controller 101, thus setting all the contexts of the discharge ports at "0".

Also, in the above description, it has been described that the head driver 108 is controlled at each time the operational process is completed for each of the discharge ports, thus executing the discharge operation. However, the present invention is not necessarily limited to such recording control. There is no problem even if the structure is arranged to provide a memory for storing the discharge data on all the discharge ports, in which the outputs DO from the operational circuit 106 are stored for all the discharge port portions, and then, the recording control is made at the drive timing in accordance with the conventionally known recording method, such as a time division drive, on the basis of the stored discharge data in the memory thus provided. Also, it may be possible to arrange a structure so that the shift register is provided for all the bits corresponding to all the discharge ports in the recording head 1 in order to store the discharge data.

B. Specific Example of the Operation

Now, with reference to FIG. 2, FIGS. 3A to 3D, FIGS. 5A and 5B, and FIG. 6, the specific description will be made of processes, in particular, for the pixel lines 1001, 1002, 1003, and 1004 by separating them for the first, second, third, and fourth scans, respectively.

B-1. First Scan
(Line Process for the Line Number 1)

The counter 103 that indicates the line numbers in the scanning direction indicates the line number 1. The counter 104 that indicates the discharge port numbers indicates the discharge port numbers 1, 2, 3, and . . . sequentially for processing. Now, it is assumed that the discharge port number 97 is indicated for the pixel array 1001. As shown in FIG. 7A, the discharge port number 97 is the one that corresponds to the position of the pixel array 1001 at the time of first scan.

The data DI from the output buffer 102 that corresponds to the line number 1 of the pixel array 1001 is "1" as shown in FIG. 2, while the context data SI on the discharge port number 97 in the context memory 105 corresponding thereto is "0" as shown in FIG. 3A. Also, now that the discharge port number is 97, the input and output relationship provided by the operational circuit 106 corresponds to those shown in FIG. 14D. Therefore, the operational circuit 106 outputs "1" as the nozzle context data SO and the head drive data DO. Thus, the context of the discharge port number 97 in the nozzle context memory 105 is rewritten to "1".

Now, as shown in FIG. 7A, the counter 104 that indicates the discharge port numbers indicates the discharge port number 98 corresponding to the pixel array 1002 at the time of first scan.

Referring to FIG. 2, the data DI from the output buffer 102, which corresponds to the line number 1 of the pixel array 1002, is "0", while referring to FIG. 3A, the context data on the discharge port number 98 in the nozzle context memory 105 corresponding thereto is "0". Therefore, as shown in FIG. 14D, the operational circuit 106 outputs "0" as the nozzle context data SO and the head drive data DO. In this way, the context of the discharge port number 98 in the nozzle context memory 105 is rewritten to "0".

Now, as shown in FIG. 7A, the counter 104 that indicates the discharge port numbers indicates the discharge port number 99 corresponding to the pixel array 1003 at the time of first scan.

Referring to FIG. 2, the data DI from the output buffer 102, which corresponds to the line number 1 of the pixel array 1003, is "1", while referring to FIG. 3A, the context data on the discharge port number 99 in the nozzle context memory 105 corresponding thereto is "0". Therefore, due to the input and output relationship shown in FIG. 14D, the operational circuit 106 outputs "1" as the nozzle context data SO and the head drive data DO. In this way, the context of the discharge port number 99 in the nozzle context memory 105 is rewritten to "1".

Now, as shown in FIG. 7A, the counter 104 that indicates the discharge port numbers indicates the discharge port number 100 corresponding to the pixel array 1004 at the time of first scan.

Referring to FIG. 2, the data DI from the output buffer 102, which corresponds to the line number 1 of the pixel array 1004, is "1", while referring to FIG. 3A, the context data on the discharge port number 100 in the nozzle context memory 105 corresponding thereto is "0". Therefore, it is noticeable that due to the input and output relationship shown in FIG. 14D, the operational circuit 106 outputs "1" as the nozzle context data SO and the head drive data DO. In this way, the context of the discharge port number 100 in the nozzle context memory 105 is rewritten to "1".

When the processes are completed up to the discharge port number 128 with respect to the line number 1 in the manner as described above, the nozzle context memory 105 is admitted to rewrite the contexts of the discharge port numbers 97, 98, 99, and 100 to "1", "0", "1", and "1", respectively, as indicated by the line number 2 shown in FIG. 3A. Also, the drive data DO output from the operational circuit 106 are in agreement with the data 1, 0, 1, 1 of the line number 1 on the pixel arrays 1001, 1002, 1003, and 1004 shown in FIG. 7A, respectively.

(Line Process for the Line Number 2)

After the line process described above for the line number 1, it proceeds to processing the line number 2. In this process, the counter 103 that indicates the line numbers in the scanning direction indicates the next line number 2. As in the previous process, the counter 104 that indicates the discharge port numbers is being increased to 1, 2, 3, and . . . sequentially for processing. Hereinafter, the description will be made of the processes for the discharge port numbers 97 to 100 corresponding to the pixel arrays 1001 to 1004.

The data DI from the output buffer 102 that corresponds to the line number 2 of the pixel array 1001 is "1" as shown in FIG. 2, while the context data SI on the discharge port number 97 of the context memory 105 corresponding thereto is "1" as shown in FIG. 3A. Therefore, due to the input and output relationship shown in FIG. 14D, the operational circuit 106 makes the data SO "2", and rewrites the context of the discharge port number 97 in the nozzle context memory to "2", and also, the head drive data DO to "0".

Now, the counter 104 that indicates the discharge port numbers indicates the discharge port number 98 corresponding to the pixel array 1002.

Referring to FIG. 2, the data DI from the output buffer 102, which corresponds to the line number 2 of the pixel array 1002, is "1", while, referring to FIG. 3A, the context data SI on the discharge port number 98 in the nozzle context memory 105 corresponding thereto is "0". Therefore, due to the input and output relationship shown in FIG. 14D, the operational circuit 106 makes the data SO "1", and rewrites the context of the discharge port number 98 in the nozzle context memory 105 to "1", and also, the head drive data DO to "0".

Now, the counter 104 that indicates the discharge port numbers indicates the discharge port number 99 corresponding to the pixel array 1003.

Referring to FIG. 2, the data DI from the output buffer 102, which corresponds to the line number 2 of the pixel array 1003, is "1", while, referring to FIG. 3A, the context data on the discharge port number 99 in the nozzle context memory 105 corresponding thereto is "1". Therefore, due to the input and output relationship shown in FIG. 14D, the operational circuit 106 makes the data SO "2", and rewrites the context of the discharge port number 99 in the nozzle context memory to "2", and also, the head drive data DO to "0".

Now, the counter 104 that indicates the discharge port numbers indicates the discharge port number 100 corresponding to the pixel array 1004.

Referring to FIG. 2, the data DI from the output buffer 102, which corresponds to the line number 2 of the pixel array 1004, is "0", while referring to FIG. 3A, the context data on the discharge port number 100 in the nozzle context memory 105 corresponding thereto is "1". Therefore, due to the input and output relationship shown in FIG. 14D, the operational circuit 106 makes the data SO "1", and rewrites the context of the discharge port number 100 in the nozzle context memory 105 to "1", and also, the head drive data DO to "0".

When the processes are completed up to the discharge port number 128 with respect to the line number 2 in the manner as described above, the nozzle context memory 105 is admitted to rewrite the contexts of the discharge port numbers 97, 98, 99, and 100 to "2", "1", "2", and "1", respectively, as indicated by the line number 3 in FIG. 3A. Also, the drive data DO output from the operational circuit 106 are in agreement with the data 0, 1, 0, 0 of the line number 2 on the pixel arrays 1001, 1002, 1003, and 1004 shown in FIG. 7A, respectively.

(Line Process for the Line Number 3)

After the line process described above for the line number 2, it proceeds to processing the next line. In the next process, the counter 103 that indicates the line numbers in the scanning direction is increased to indicate the line number 3. As in the previous process, the counter 104 is being increased to 1, 2, 3, and . . . sequentially for processing. Now, hereinafter, the description will be made of the processes regarding the discharge port numbers 97 to 100 corresponding to the pixel arrays 1001 to 1004.

The data DI from the output buffer 102 that corresponds to the line number 3 of the pixel array 1001 is "1" as shown in FIG. 2, while the context data SI on the discharge port number 97 of the context memory 105 corresponding thereto is "2" as shown in FIG. 3A. Therefore, the operational circuit 106 makes the data SO "3", and rewrites the context of the discharge port number 97 in the nozzle context memory to "3", and also, the head drive data DO to "0".

Now, the counter 104 that indicates the discharge port numbers indicates the discharge port number 98 corresponding to the pixel array 1002.

Referring to FIG. 2, the data DI from the output buffer 102, which corresponds to the line number 3 of the pixel array 1002, is "1", while, referring to FIG. 3A, the context data SI on the discharge port number 98 in the nozzle context memory 105 corresponding thereto is "1". Therefore, the operational circuit 106 makes the data SO "2", and rewrites the context of the discharge port number 98 in the nozzle context memory 105 to "2", and also, the head drive data DO to "0".

Now, the counter 104 that indicates the discharge port numbers indicates the discharge port number 99 corresponding to the pixel array 1003.

Referring to FIG. 2, the data DI from the output buffer 102, which corresponds to the line number 3 of the pixel array 1003, is "1", while referring to FIG. 3A, the context data on the discharge port number 99 in the nozzle context memory 105 corresponding thereto is "2". Therefore, the operational circuit 106 makes the data SO "3", and rewrites the context of the discharge port number 99 in the nozzle context memory to "3", and also, the head drive data DO to "0".

Now, the counter 104 that indicates the discharge port numbers indicates the discharge port number 100 corresponding to the pixel array 1004.

Referring to FIG. 2, the data DI from the output buffer 102, which corresponds to the line number 3 of the pixel array 1004, is "0", while referring to FIG. 3A, the context data on the discharge port number 100 in the nozzle context memory 105 corresponding thereto is "1". Therefore, the operational circuit 106 makes the data SO "1", and rewrites the context of the discharge port number 100 in the nozzle context memory 105 to "1", and also, the head drive data DO to "0".

When the processes are completed up to the discharge port number 128 with respect to the line number 3 in the manner as described above, the nozzle context memory 105 is admitted to rewrite the contexts of the discharge port numbers 97, 98, 99, and 100 to "3", "2", "3", and "1", respectively, as indicated by the line number 4 in FIG. 3A. Also, the drive data DO output from the operational circuit 106 are in agreement with the data 0, 0, 0, 0 of the line number 3 on the pixel arrays 1001, 1002, 1003, and 1004 shown in FIG. 7A, respectively.

(Line Process for the Line Number 4)

After the line process described above for the line number 3, it proceeds to processing the next line. In the next process, the counter 103 that indicates the line numbers in the scanning direction is increased so as to indicate the next line number 4. As in the previous process, the counter 104 is being increased to 1, 2, 3, and . . . sequentially for processing. Now, hereinafter, the description will be made of the processes regarding the discharge port numbers 97 to 100 corresponding to the pixel arrays 1001 to 1004.

The data DI from the output buffer 102 that corresponds to the line number 4 of the pixel array 1001 is "1" as described shown in FIG. 2, while the context data SI on the discharge port number 97 of the context memory 105 corresponding thereto is "3" as shown in FIG. 3A. Therefore, the operational circuit 106 makes the data SO "0", and rewrites the context of the discharge port number 97 in the nozzle context memory to "0", and also, the head drive data DO to "0".

Now, the counter 104 that indicates the discharge port numbers indicates the discharge port number 98 corresponding to the pixel array 1002.

Referring to FIG. 2, the data DI from the output buffer 102, which corresponds to the line number 4 of the pixel array 1002, is "1", while, referring to FIG. 3A, the context data SI on the discharge port number 98 in the nozzle context memory 105 corresponding thereto is "2". Therefore, the operational circuit 106 makes the data SO "3", and rewrites the context of the discharge port number 98 in the nozzle context memory 105 to "3", and also, the head drive data DO to "0".

Now, the counter 104 that indicates the discharge port numbers indicates the discharge port number 99 corresponding to the pixel array 1003.

Referring to FIG. 2, the data DI from the output buffer 102, which corresponds to the line number 4 of the pixel array 1003, is "1", while referring to FIG. 3A, the context data on the discharge port number 99 in the nozzle context memory 105 corresponding thereto is "3". Therefore, the operational circuit 106 makes the data SO "0", and rewrites the context of the discharge port number 99 in the nozzle context memory to "0", and also, the head drive data DO to "0".

Now, the counter 104 that indicates the discharge port numbers indicates the discharge port number 100 corresponding to the pixel array 1004.

Referring to FIG. 2, the data DI from the output buffer 102, which corresponds to the line number 4 of the pixel array 1004, is "0", while referring to FIG. 3A, the context data on the discharge port number 100 in the nozzle context memory 105 corresponding thereto "1". Therefore, the operational circuit 106 makes the data SO "1", and rewrites the context of the discharge port number 100 in the nozzle context memory 105 to "1", and also, the head drive data DO to "0".

When the processes are completed up to the discharge port number 128 with respect to the line number 4 in the manner as described above, the nozzle context memory 105 is admitted to rewrite the contexts of the discharge port numbers 97, 98, 99, and 100 to "0", "3", "0", and "1", respectively, as indicated by the line number 5 in FIG. 3A. Also, the drive data DO output from the operational circuit 106 are in agreement with the data 0, 0, 0, 0 of the line number 4 on the pixel arrays 1001, 1002, 1003, and 1004 shown in FIG. 7A, respectively.

Thereafter, the processes will be executed in the same manner for the first scan with respect to the line numbers 5, 6, 7, and . . . up to the last line.

B-2. Second Scan

The description will be made of the processes at the time of second scan. For the second scan, the recording positions are displaced from those for the first scan as shown in FIG. 5B. The pixel arrays 1001 to 1004 now correspond to the discharge port numbers 65 to 68 of the recording head 1.

(Line Process for the Line Number 1)

For recording of the line number 1, the counter 103 indicates the line number 1, while the counter 104 that indicates the discharge port numbers increases it to indicate the numbers from 1, 2, 3, and . . . sequentially for processing. For the second scan, the pixel array 1001 is recorded by use of the discharge port number 65. Now, hereinafter, the description will be made of the processes corresponding to the pixel arrays 1001 to 1004.

Referring to FIG. 2, the data DI from the output buffer 102, which corresponds to the line number 1 of the pixel array 1001, is "1", while referring to FIG. 3B the context data SO on the discharge port number 65 in the nozzle context memory 105 corresponding thereto is "0". Also, the input and output for the processes of the operational circuit 106, which correspond to the discharge port numbers 65 to 68, are those shown in FIG. 14C. Therefore, the operational circuit 106 outputs "1" as the nozzle context data SO, and also, outputs "0" as the head drive data DO. In this way, the context of the discharge port number 65 in the nozzle context memory 105 is rewritten to "1".

Now, the counter 104 that indicates the discharge port numbers indicates the discharge port number 66 assigned to the pixel array 1002 as shown in FIG. 7B.

Referring to FIG. 2, the data DI from the output buffer 102, which corresponds to the line number 1 of the pixel array 1001, is "0", while referring to FIG. 3B, the context data on the discharge port number 66 in the nozzle context memory 105 corresponding thereto is "0". Therefore, due to the input and output relationship shown in FIG. 14C the operational circuit 106 outputs "0" as the nozzle context data SO and the head drive data DO. In this way, the context of the discharge port number 66 in the nozzle context memory 105 is rewritten to "0".

Now, as shown in FIG. 7B, the counter 104 that indicates the discharge port numbers indicates the discharge port number 67 corresponding to the pixel array 1003 at the time of second scan.

Referring to FIG. 2, the data DI from the output buffer 102, which corresponds to the line number 1 of the pixel array 1003, is "1", while, referring to FIG. 3B, the context data on the discharge port number 67 in the nozzle context memory 105 corresponding thereto is "0". Therefore, due to the input and output relationship shown in FIG. 14C, the operational circuit 106 outputs "1" as the nozzle context data SO and "0" as the head drive data DO. In this way, the context of the discharge port number 67 in the nozzle context memory 105 is rewritten to "1".

Now, as shown in FIG. 7B, the counter 104 that indicates the discharge port numbers indicates the discharge port number 68 corresponding to the pixel array 1004 at the time of second scan.

Referring to FIG. 2, the data DI from the output buffer 102, which corresponds to the line number 1 of the pixel array 1004, is "1", while referring to FIG. 3B, the context data on the discharge port number 68 in the nozzle context memory 105 corresponding thereto is "0". Therefore, due to the input and output relationship shown in FIG. 14C, the operational circuit 106 outputs "1" as the nozzle context data SO and "0" as the head drive data DO. In this way, the context of the discharge port number 68 in the nozzle context memory 105 is rewritten to "1".

When the processes are completed up to the discharge port number 128 with respect to the line number 1 in the manner as described above, the nozzle context memory 105 is admitted to rewrite the contexts of the discharge port numbers 65, 66, 67, and 68 to "1"1, "0" "1", and "1", respectively, as indicated by the line number 2 shown in FIG. 3B. Also, the drive data DO output from the operational circuit 106 are in agreement with the data 0, 0, 0, 0 of the line number 1 on the pixel arrays 1001, 1002, 1003, and 1004 shown in FIG. 7B, respectively.

(Line Process for the Line Number 2)

After the line process described above for the line number 1, the counter 103 that indicates the line numbers in the scanning direction indicates the next line number 2. The counter 104 that indicates the discharge port numbers is being increased to 1, 2, 3, and . . . sequentially for processing. Hereinafter, the description will be made of the processes for the discharge port numbers 65 to 68 corresponding to the pixel arrays 1001 to 1004.

The data DI from the output buffer 102 that corresponds to the line number 2 of the pixel array 1001 is "1" as shown in FIG. 2, while the context data SI on the discharge port number 65 of the context memory 105 corresponding thereto is "1" as shown in FIG. 3B. Therefore, due to the input and output relationship shown in FIG. 14C, the operational circuit 106 makes the data SO "2", and rewrites the context of the discharge port number 65 in the nozzle context memory to "2", and also, the head drive data DO to "0".

Now, the counter 104 that indicates the discharge port numbers indicates the discharge port number 66 corresponding to the pixel array 1002.

Referring to FIG. 2, the data DI from the output buffer 102, which corresponds to the line number 2 of the pixel array 1002, is "1", while, referring to FIG. 3B, the context data SI on the discharge port number 66 in the nozzle context memory 105 corresponding thereto is "0". Therefore, due to the input and output relationship shown in FIG. 14C, the operational circuit 106 makes the data SO "1", and rewrites the context of the discharge port number 66 in the nozzle context memory 105 to "1", and also, the head drive data DO to "0".

Now, the counter 104 that indicates the discharge port numbers indicates the discharge port number 67 corresponding to the pixel array 1003.

Referring to FIG. 2, the data DI from the output buffer 102, which corresponds to the line number 2 of the pixel array 1003, is "1", while referring to FIG. 3B, the context data on the discharge port number 67 in the nozzle context memory 105 corresponding thereto is "1". Therefore, due to the input and output relationship shown in FIG. 14C, the operational circuit 106 makes the data SO "2", and rewrites the context of the discharge port number 67 in the nozzle context memory to "2", and also, the head drive data DO to "1".

Now, the counter 104 that indicates the discharge port numbers indicates the discharge port number 68 corresponding to the pixel array 1004.

Referring to FIG. 2, the data DI from the output buffer 102, which corresponds to the line number 2 of the pixel array 1004, is "0", while referring to FIG. 3B, the context data on the discharge port number 68 in the nozzle context memory 105 corresponding thereto is "1". Therefore, due to the input and output relationship shown in FIG. 14C, the operational circuit 106 makes the data SO "1", and rewrites the context of the discharge port number 68 in the nozzle context memory 105 to "1", and also, the head drive data DO to "0".

When the processes are completed for all the discharge port numbers with respect to the line number 2 in the manner as described above, the nozzle context memory 105 is admitted to rewrite the contexts of the discharge port numbers 65, 66, 67, 68 to "2", "1", "2", and "1", respectively, as indicated by the line number 3 in FIG. 3B. Also, the drive data DO output from the operational circuit 106 are in agreement with the data 1, 0 ,1, 0 of the line number 2 on the pixel arrays 1001, 1002, 1003, and 1004 shown in FIG. 7B, respectively.

(Line Process for the Line Number 3)

After the line process described above for the line number 2, the counter 103 that indicates the line numbers in the scanning direction is increased to indicate the next line number 3. The counter 104 that indicates the discharge port numbers is being increased to 1, 2, 3, and . . . sequentially for processing. Now, hereinafter, the description will be made of the processes for the discharge port numbers 65 to 68 corresponding to the pixel arrays 1001 to 1004.

The data DI from the output buffer 102 that corresponds to the line number 3 of the pixel array 1001 is "1" as shown in FIG. 2, while the context data SI on the discharge port number 65 of the context memory 105 corresponding thereto is "2" as shown in FIG. 3B. Therefore, the operational circuit 106 makes the data SO "3", and rewrites the context of the discharge port number 65 in the nozzle context memory to "3", and also, the head drive data DO to "0".

Now, the counter 104 that indicates the discharge port numbers indicates the discharge port number 66 corresponding to the pixel array 1002.

Referring to FIG. 2, the data DI from the output buffer 102, which corresponds to the line number 3 of the pixel array 1002, is "1", while, referring to FIG. 3B, the context data on the discharge port number 66 in the nozzle context memory 105 corresponding thereto is "1". Therefore, the operational circuit 106 makes the data SO "2", and rewrites the context of the discharge port number 66 in the nozzle context memory 105 to "2", and also, the head drive data DO to "1".

Now, the counter 104 that indicates the discharge port numbers indicates the discharge port number 67 corresponding to the pixel array 1003.

Referring to FIG. 2, the data DI from the output buffer 102, which corresponds to the line number 3 of the pixel array 1003, is "1", while referring to FIG. 3B, the context data on the discharge port number 67 in the nozzle context memory 105 is "2". Therefore, the operational circuit 106 makes the data SO "3", and rewrites the context data on the discharge port number 67 in the nozzle context memory to "3", and also, the head drive data DO to "0".

Now, the counter 104 that indicates the discharge port numbers indicates the discharge port number 68 corresponding to the pixel array 1004.

Referring to FIG. 2, the data DI from the output buffer 102, which corresponds to the line number 3 of the pixel array 1004, is "0", while referring to FIG. 3B, the context data on the discharge port number 68 in the nozzle context memory 105 corresponding thereto is "1". Therefore, the operational circuit 106 makes the data SO "1", and rewrites the context data on the discharge port number 68 in the nozzle context memory 105 to "1", and also, the head drive data DO to "0".

When the processes are completed up to the discharge port number 128 with respect to the line number 3 in the manner as described above, the nozzle context memory 105 is admitted to rewrite the contexts of the discharge port numbers 65, 66, 67, and 68 to "3", "2", "3", and "1", respectively, as indicated by the line number 4 in FIG. 3B. Also, the drive data DO output from the operational circuit 106 are in agreement with the data 0, 1, 0, 0 of the line number 3 on the pixel arrays 1001, 1002, 1003, and 1004 shown in FIG. 7B, respectively.

(Line Process for the Line Number 4)

After the line process described above for the line number 3, the counter 103 that indicates the line numbers in the scanning direction is increased to indicate the next line number 4. Also, the counter 104 that indicates the discharge port numbers is being increased to 1, 2, 3, and . . . sequentially for processing. Now, hereinafter, the description will be made of the processes for the discharge port numbers 65 to 68 corresponding to the pixel arrays 1001 to 1004.

The data DI from the output buffer 102 that corresponds to the line number 4 of the pixel array 1001 is "1" as shown in FIG. 2, while the context data SI on the discharge port number 65 of the context memory 105 corresponding thereto is "3" as shown in FIG. 3B. Therefore, the operational circuit 106 makes the data SO "0", and rewrites the context data on the discharge port number 65 in the nozzle context memory to "0", and also, the head drive data DO to "0".

Now, the counter 104 that indicates the discharge port numbers indicates the discharge port number 66 corresponding to the pixel array 1002.

Referring to FIG. 2, the data DI from the output buffer 102, which corresponds to the line number 4 of the pixel array 1002, is "1", while, referring to FIG. 3B, the context data SI on the discharge port number 66 in the nozzle context memory 105 corresponding thereto is "2". Therefore, the operational circuit 106 makes the data SO "3", and rewrites the context data on the discharge port number 66 in the nozzle context memory 105 to "3", and also, the head drive data DO to "0".

Now, the counter 104 that indicates the discharge port numbers indicates the discharge port number 67 corresponding to the pixel array 1003.

Referring to FIG. 2, the data DI from the output buffer 102, which corresponds to the line number 4 of the pixel array 1003, is "1", while referring to FIG. 3B, the context data SI on the discharge port number 67 in the nozzle context memory 105 corresponding thereto is "3". Therefore, the operational circuit 106 makes the data SO "0", and rewrites the context data on the discharge port number 67 in the nozzle context memory to "0", and also, the head drive data DO to "0".

Now, the counter 104 that indicates the discharge port numbers indicates the discharge port number 68 corresponding to the pixel array 1004.

Referring to FIG. 2, the data DI from the output buffer 102, which corresponds to the line number 4 of the pixel array 1004, is "0", while referring to FIG. 3B, the context data on the discharge port number 68 in the nozzle context memory 105 corresponding thereto is "1". Therefore, the operational circuit 106 makes the data SO "1", and rewrites the context data on the discharge port number 68 in the nozzle context memory 105 to "1", and also, the head drive data DO to "0".

When the processes are completed up to the discharge port number 128 with respect to the line number 4 in the manner as described above, the nozzle context memory 105 is admitted to rewrite the contexts of the discharge port numbers 65, 66, 67, and 68 to "0", "3", "0", and "1", respectively, as indicated by the line number 5 in FIG. 3B. Also, the drive data DO output from the operational circuit 106 are in agreement with the data 0, 0, 0, 0 of the line number 4 on the pixel arrays 1001, 1002, 1003, and 1004 shown in FIG. 7A, respectively.

Thereafter, the processes will be executed in the same manner for the second scan with respect to the line numbers 5, 6, 7, and . . . up to the last line.

B-3. Third Scan

Now, the description will be made of the processes at the time of third scan. For the third scan, the recording positions are displaced from those for the first scan and the second scan as shown in FIG. 5B. The discharge port numbers 33 to 36 of the recording head 1 correspond to the pixel arrays 1001 to 1004.

(Line process for the Line Number 1)

For recording of the line number 1, the counter 103 indicates the line number 1, while the counter 104 that indicates the discharge port numbers increases it to indicate the numbers from 1, 2, 3, and . . . sequentially for processing. For the third scan, the pixel array 1001 is recorded by use of the discharge port number 33. Now, hereinafter, the description will be made of the processes corresponding to the pixel arrays 1001 to 1004.

Referring to FIG. 2, the data DI from the output buffer 102, which corresponds to the line number 1 of the pixel array 1001, is "1", while referring to FIG. 3C, the context data SO on the discharge port number 33 in the nozzle context memory 105 corresponding thereto is "0". Also, the input and output relationship with respect to the processes of the operational circuit 106, which correspond to the discharge port numbers 33 to 36, are those shown in FIG. 14B. Therefore, the operational circuit 106 outputs "1" as the nozzle context data SO, and also, outputs "0" as the head drive data DO. In this way, the context data on the discharge port number 33 in the nozzle context memory 105 is rewritten to "1".

Now, the counter 104 that indicates the discharge port numbers indicates the discharge port number 34 corresponding to the pixel array 1002 as shown in FIG. 7C.

Referring to FIG. 2, the data DI from the output buffer 102, which corresponds to the line number 1 of the pixel array 1002, is "0", while referring to FIG. 3C, the context data on the discharge port number 34 in the nozzle context memory 105 corresponding thereto is "0". Therefore, due to the input and output relationship shown in FIG. 14B the operational circuit 106 outputs "1" as the nozzle context data SO and "0" as the head drive data DO. In this way, the context data on the discharge port number 34 in the nozzle context memory 105 is rewritten to "0".

Now, as shown in FIG. 7C, the counter 104 that indicates the discharge port numbers indicates the discharge port number 35 corresponding to the pixel array 1003 at the time of third scan.

Referring to FIG. 2, the data DI from the output buffer 102, which corresponds to the line number 1 of the pixel array 1003, is "1", while, referring to FIG. 3C, the context data on the discharge port number 35 in the nozzle context memory 105 corresponding thereto is "0". Therefore, due to the input and output relationship shown in FIG. 14B, the operational circuit 106 outputs "1" as the nozzle context data SO and "0" as the head drive data DO. In this way, the context data on the discharge port number 35 in the nozzle context memory 105 is rewritten to "1".

Now, as shown in FIG. 7C, the counter 104 that indicates the discharge port numbers indicates the discharge port number 36 corresponding to the pixel array 1004 at the time of third scan.

Referring to FIG. 2, the data DI from the output buffer 102, which corresponds to the line number 1 of the pixel array 1004, is "1", while referring to FIG. 3C, the context data on the discharge port number 36 in the nozzle context memory 105 corresponding thereto is "0". Therefore, due to the input and output relationship shown in FIG. 14B, the operational circuit 106 outputs "1" as the nozzle context data SO and "0" as the head drive data DO. In this way, the context of the discharge port number 36 in the nozzle context memory 105 is rewritten to "1".

When the processes are completed up to the discharge port number 128 with respect to the line number 1 in the manner as described above, the nozzle context memory 105 is admitted to rewrite the contexts of the discharge port numbers 33, 34, 35, and 36 to "1", "0", "1", and "1", respectively, as indicated by the line number 2 shown in FIG. 3C. Also, the drive data DO output from the operational circuit 106 are in agreement with the data 0, 0, 0, 0 of the line number 1 on the pixel arrays 1001, 1002, 1003, and 1004 shown in FIG. 7C, respectively.

(Line Process for the Line Number 2)

After the line process described above for the line number 1, the counter 103 that indicates the line numbers in the scanning direction indicates the next line number 2. The counter 104 that indicates the discharge port numbers is being increased to 1, 2, 3, and . . . sequentially for processing. Hereinafter, the description will be made of the processes for the discharge port numbers 33 to 36 corresponding to the pixel arrays 1001 to 1004.

The data DI from the output buffer 102 that corresponds to the line number 2 of the pixel array 1001 is "1" as shown in FIG. 2, while the context data SI on the discharge port number 33 of the context memory 105 corresponding thereto is "1" as shown in FIG. 3C. Therefore, due to the input and output relationship shown in FIG. 14B, the operational circuit 106 makes the data SO "2", and rewrites the context data on the discharge port number 33 in the nozzle context memory 105 to "2", and also, the head drive data Do to "1".

Now, the counter 104 that indicates the discharge port numbers indicates the discharge port number 34 corresponding to the pixel array 1002.

Referring to FIG. 2, the data DI from the output buffer 102, which corresponds to the line number 2 of the pixel array 1002, is "1", while, referring to FIG. 3C, the context data SI on the discharge port number 34 in the nozzle context memory 105 corresponding thereto is "0". Therefore, due to the input and output relationship shown in FIG. 14B, the operational circuit 106 makes the data SO "1", and rewrites the context data on the discharge port number 34 in the nozzle context memory 105 to "1", and also, the head drive data DO to "0".

Now, the counter 104 that indicates the discharge port numbers indicates the discharge port number 35 corresponding to the pixel array 1003.

Referring to FIG. 2, the data DI from the output buffer 102, which corresponds to the line number 2 of the pixel array 1003, is "1", while referring to FIG. 3C, the context data on the discharge port number 35 in the nozzle context memory 105 corresponding thereto is "1". Therefore, due to the input and output relationship shown in FIG. 14B, the operational circuit 106 makes the data SO "2", and rewrites the context data on the discharge port number 35 in the nozzle context memory to "2", and also, the head drive data DO to "1".

Now, the counter 104 that indicates the discharge port numbers indicates the discharge port number 36 corresponding to the pixel array 1004.

Referring to FIG. 2, the data DI from the output buffer 102, which corresponds to the line number 2 of the pixel array 1004, is "0", while referring to FIG. 3B, the context data on the discharge port number 36 in the nozzle context memory 105 corresponding thereto is "1". Therefore, due to the input and output relationship shown in FIG. 14B, the operational circuit 106 makes the data SO "1", and rewrites the context data on the discharge port number 36 in the nozzle context memory 105 to "1", and also, the head drive data DO to "0".

When the processes are completed for all the discharge port numbers with respect to the line number 2 in the manner as described above, the nozzle context memory 105 is admitted to rewrite the contexts of the discharge port numbers 33, 34, 35, and 36 to "2", "1", "2", and "1", respectively, as indicated by the line number 3 in FIG. 3C. Also, the drive data DO output from the operational circuit 106 are in agreement with the data 0, 0, 0, 0 of the line number 2 on the pixel arrays 1001, 1002, 1003, and 1004 shown in FIG. 7C, respectively.

(Line Process for the Line Number 3)

After the line process described above for the line number 2, the counter 103 that indicates the line numbers in the scanning direction indicates the next line number 3. The counter 104 that indicates the discharge port numbers indicates 1, 2, 3, and . . . sequentially for processing. Now, hereinafter, the description will be made of the processes for the discharge port numbers 33 to 36 corresponding to the pixel arrays 1001 to 1004.

The data DI from the output buffer 102 that corresponds to the line number 3 of the pixel array 1001 is "1" as shown in FIG. 2, while the context data SI on the discharge port number 33 of the context memory 105 corresponding thereto is "2" as shown in FIG. 3C. Therefore, the operational circuit 106 makes the data SO "3", and rewrites the context data on the discharge port number 33 in the nozzle context memory to "3", and also, the head drive data DO to "1".

Now, the counter 104 that indicates the discharge port numbers indicates the discharge port number 33 corresponding to the pixel array 1002.

Referring to FIG. 2, the data DI from the output buffer 102, which corresponds to the line number 3 of the pixel array 1002, is "1", while, referring to FIG. 3C, the context data on the discharge port number 34 in the nozzle context memory 105 corresponding thereto is "1". Therefore, the operational circuit 106 makes the data SO "2", and rewrites the context of the discharge port number 34 in the nozzle context memory 105 to "2", and also, the head drive data DO to "1".

Now, the counter 104 that indicates the discharge port numbers indicates the discharge port number 35 corresponding to the pixel array 1003.

Referring to FIG. 2, the data DI from the output buffer 102, which corresponds to the line number 3 of the pixel array 1003, is "1", while referring to FIG. 3C, the context data on the discharge port number 35 in the nozzle context memory 105 corresponding thereto is "2". Therefore, the operational circuit 106 makes the data SO "3", and rewrites the context data on the discharge port number 35 in the nozzle context memory to "3", and also, the head drive data DO to "1".

Now, the counter 104 that indicates the discharge port numbers indicates the discharge port number 36 corresponding to the pixel array 1004.

Referring to FIG. 2, the data DI from the output buffer 102, which corresponds to the line number 3 of the pixel array 1004, is "0", while referring to FIG. 3C, the context data on the discharge port number 36 in the nozzle context memory 105 corresponding thereto is "1". Therefore, the operational circuit 106 makes the data SO "1", and rewrites the context data on the discharge port number 36 in the nozzle context memory 105 to "1", and also, the head drive data DO to "0".

When the processes are completed up to the discharge port number 128 with respect to the line number 3 in the manner as described above, the nozzle context memory 105 is admitted to rewrite the contexts of the discharge port numbers 33, 34, 35, and 36 to "3", "2", "3", and "1", respectively, as indicated by the line number 4 in FIG. 3C. Also, the drive data DO output from the operational circuit 106 are in agreement with the data 1, 0, 1, 0 of the line number 3 on the pixel arrays 1001, 1002, 1003, and 1004 shown in FIG. 7C, respectively.

(Line Process for the Line Number 4)

After the line process described above for the line number 3, the counter 103 that indicates the line numbers in the scanning direction indicates the next line number 4. Also, the counter 104 that indicates the discharge port numbers indicates 1, 2, 3, and . . . sequentially for processing. Now, hereinafter, the description will be made of the processes for the discharge port numbers 33 to 36 corresponding to the pixel arrays 1001 to 1004.

The data DI from the output buffer 102 that corresponds to the line number 4 of the pixel array 1001 is "1" as shown in FIG. 2, while the context data SI on the discharge port number 33 of the context memory 105 corresponding thereto is "3" as shown in FIG. 3C. Therefore, the operational circuit 106 makes the data SO "0", and rewrites the context data on the discharge port number 33 in the nozzle context memory to "0", and also, the head drive data DO to "0".

Now, the counter 104 that indicates the discharge port numbers indicates the discharge port number 34 corresponding to the pixel array 1002.

Referring to FIG. 2, the data DI from the output buffer 102, which corresponds to the line number 4 of the pixel array 1002, is "1", while, referring to FIG. 3C, the context data SI on the discharge port number 34 in the nozzle context memory 105 corresponding thereto is "2". Therefore, the operational circuit 106 makes the data SO "3", and rewrites the context data on the discharge port number 34 in the nozzle context memory 105 to "3", and also, the head drive data DO to "1".

Now, the counter 104 that indicates the discharge port numbers indicates the discharge port number 35 corresponding to the pixel array 1003.

Referring to FIG. 2, the data DI from the output buffer 102, which corresponds to the line number 4 of the pixel array 1003, is "1", while referring to FIG. 3C, the context data SI on the discharge port number 35 in the nozzle context memory 105 corresponding thereto is "3". Therefore, the operational circuit 106 makes the data SO "0", and rewrites the context data on the discharge port number 35 in the nozzle context memory to "0", and also, the head drive data DO to "0".

Now, the counter 104 that indicates the discharge port numbers indicates the discharge port number 36 corresponding to the pixel array 1004.

Referring to FIG. 2, the data DI from the output buffer 102, which corresponds to the line number 4 of the pixel array 1004, is "0", while referring to FIG. 3C, the context data on the discharge port number 36 in the nozzle context memory 105 corresponding thereto is "1". Therefore, the operational circuit 106 makes the data SO "1", and rewrites the context data on the discharge port number 36 in the nozzle context memory 105 to "1", and also, the head drive data DO to "0".

When the processes are completed up to the discharge port number 128 with respect to the line number 4 in the manner as described above, the nozzle context memory 105 is admitted to rewrite the contexts of the discharge port numbers 33, 34, 35, and 36 to "0", "3", "0", and "1", respectively, as indicated by the line number 5 in FIG. 3C. Also, the drive data DO output from the operational circuit 106 are in agreement with the data 0, 1, 0, 0 of the line number 4 on the pixel arrays 1001, 1002, 1003, and 1004 shown in FIG. 7C, respectively.

Thereafter, the processes will be executed in the same manner for the second scan with respect to the line numbers 5, 6, 7, and . . . up to the last line.

B-4. Fourth Scan

Now, the description will be made of the processes at the time of fourth scan. For the fourth scan, the recording positions are displaced from those for the previous scans. The discharge port numbers 1 to 4 of the recording head 1 correspond to the pixel arrays 1001 to 1004.

(Line process for the Line Number 1)

For recording of the line number 1, the counter 103 indicates the line number 1, while the counter 104 that indicates the discharge port numbers increases it to indicate the numbers from 1, 2, 3, and . . . sequentially for processing. Now, hereinafter, the description will be made of the processes of the discharge numbers 1 to 4 corresponding to the pixel arrays 1001 to 1004.

Referring to FIG. 2, the data DI from the output buffer 102, which corresponds to the line number 1 of the pixel array 1001, is "1", while referring to FIG. 3D, the context data SO on the discharge port number 1 in the nozzle context memory 105 corresponding thereto is "0". Also, the input and output relationship with respect to the processes of the operational circuit 106, which correspond to the discharge port numbers 1 to 4, are those shown in FIG. 14A. Therefore, the operational circuit 106 outputs "1" as the nozzle context data SO, and outputs "0" as the head drive data DO. In this way, the context data on the discharge port number 1 in the nozzle context memory 105 is rewritten to "0".

Now, the counter 104 that indicates the discharge port numbers indicates the discharge port number 2 corresponding to the pixel array 1002 as shown in FIG. 7D at the fourth scan.

Referring to FIG. 2, the data DI from the output buffer 102, which corresponds to the line number 1 of the pixel array 1002, is "0", while referring to FIG. 3D, the context data on the discharge port number 2 in the nozzle context memory 105 corresponding thereto is "0". Therefore, due to the input and output relationship shown in FIG. 14A the operational circuit 106 outputs "0" as the nozzle context data SO, and also, "0" as the head drive data DO. In this way, the context data on the discharge port number 2 in the nozzle context memory 105 is rewritten to "0".

Now, as shown in FIG. 7D, the counter 104 that indicates the discharge port numbers indicates the discharge port number 3 corresponding to the pixel array 1003 at the time of fourth scan.

Referring to FIG. 2, the data DI from the output buffer 102, which corresponds to the line number 1 of the pixel array 1003, is "1", while, referring to FIG. 3D, the context data on the discharge port number 3 in the nozzle context memory 105 corresponding thereto is "0". Therefore, due to the input and output relationship shown in FIG. 14A, the operational circuit 106 outputs "1" as the nozzle context data SO and "0" as the head drive data DO. In this way, the context data on the discharge port number 3 in the nozzle context memory 105 is rewritten to "1".

Now, as shown in FIG. 7D, the counter 104 that indicates the discharge port numbers indicates the discharge port number 4 corresponding to the pixel array 1004 at the time of fourth scan.

Referring to FIG. 2, the data DI from the output buffer 102, which corresponds to the line number 1 of the pixel array 1004, is "1", while referring to FIG. 3D, the context data on the discharge port number 4 in the nozzle context memory 105 corresponding thereto is "0". Therefore, due to the input and output relationship shown in FIG. 14A, the operational circuit 106 outputs "1" as the nozzle context data SO and "0" as the head drive data DO. In this way, the context of the discharge port number 4 in the nozzle context memory 105 is rewritten to "1".

When the processes are completed up to the discharge port number 128 with respect to the line number 1 in the manner as described above, the nozzle context memory 105 is admitted to rewrite the contexts of the discharge port numbers 1, 2, 3, and 4 to "1", "0", "1", and "1", respectively, as indicated by the line number 2 shown in FIG. 3D. Also, the drive data DO output from the operational circuit 106 are in agreement with the data 0, 0, 0, 0 of the line number 1 on the pixel arrays 1001, 1002, 1003, and 1004 shown in FIG. 7D, respectively.

(Line Process for the Line Number 2)

After the line process described above for the line number 1, the counter 103 that indicates the line numbers in the scanning direction indicates the next line number 2. The counter 104 that indicates the discharge port numbers indicates 1, 2, 3, and . . . sequentially for processing. Hereinafter, the description will be made of the processes for the discharge port numbers 1 to 4 corresponding to the pixel arrays 1001 to 1004.

The data DI from the output buffer 102 that corresponds to the line number 2 of the pixel array 1001 is "1" as shown in FIG. 2, while the context data SI on the discharge port number 1 of the context memory 105 corresponding thereto is "1" as shown in FIG. 3D. Therefore, due to the input and output relationship shown in FIG. 14A, the operational circuit 106 makes the data SO "2", and rewrites the context data on the discharge port number 2 in the nozzle context memory 105 to "2", and also, the head drive data DO to "1".

Now, the counter 104 that indicates the discharge port numbers indicates the discharge port number 2 corresponding to the pixel array 1002.

Referring to FIG. 2, the data DI from the output buffer 102, which corresponds to the line number 2 of the pixel array 1002, is "1", while, referring to FIG. 3D, the context data SI on the discharge port number 2 in the nozzle context memory 105 corresponding thereto is "0". Therefore, due to the input and output relationship shown in FIG. 14A, the operational circuit 106 makes the data SO "1", and rewrites the context data on the discharge port number 2 in the nozzle context memory 105 to "1", and also, the head drive data DO to "0".

Now, the counter 104 that indicates the discharge port numbers indicates the discharge port number 3 corresponding to the pixel array 1003.

Referring to FIG. 2, the data DI from the output buffer 102, which corresponds to the line number 2 of the pixel array 1003, is "1", while referring to FIG. 3D, the context data on the discharge port number 3 in the nozzle context memory 105 corresponding thereto is "1". Therefore, due to the input and output relationship shown in FIG. 14A, the operational circuit 106 makes the data SO "2", and rewrites the context data on the discharge port number 3 in the nozzle context memory to "2", and also, the head drive data DO to "1".

Now, the counter 104 that indicates the discharge port numbers indicates the discharge port number 4 corresponding to the pixel array 1004.

Referring to FIG. 2, the data DI from the output buffer 102, which corresponds to the line number 2 of the pixel array 1004, is "0", while referring to FIG. 3A, the context data on the discharge port number 4 in the nozzle context memory 105 corresponding thereto is "1". Therefore, due to the input and output relationship shown in FIG. 14A, the operational circuit 106 makes the data SO "1", and rewrites the context data on the discharge port number 4 in the nozzle context memory 105 to "1", and the head drive data DO to "0".

When the processes are completed for the discharge port numbers up to 128 with respect to the line number 2 in the manner as described above, the nozzle context memory 105 is admitted to rewrite the contexts of the discharge port numbers 1, 2, 3, and 4 to "2", "1", "2", and "1", respectively, as indicated by the line number 3 in FIG. 3D. Also, the drive data DO output from the operational circuit 106 are in agreement with the data 0, 0, 0, 0 of the line number 2 on the pixel arrays 1001, 1002, 1003, and 1004 shown in FIG. 7D, respectively.

(Line Process for the Line Number 3)

After the line process described above for the line number 2, the counter 103 that indicates the line numbers in the scanning direction indicates the next line number 3. The counter 104 that indicates the discharge port numbers indicates 1, 2, 3, and . . . sequentially for processing. Now, hereinafter, the description will be made of the processes for the discharge port numbers 1 to 4 corresponding to the pixel arrays 1001 to 1004.

The data DI from the output buffer 102 that corresponds to the line number 3 of the pixel array 1001 is "1" as shown in FIG. 2, while the context data SI on the discharge port number 3 of the context memory 105 corresponding thereto is "2" as shown in FIG. 3D. Therefore, the operational circuit 106 makes the data SO "3", and rewrites the context data on the discharge port number 3 in the nozzle context memory to "3", and also, the head drive data DO to "0".

Now, the counter 104 that indicates the discharge port numbers indicates the discharge port number 2 corresponding to the pixel array 1002.

Referring to FIG. 2, the data DI from the output buffer 102, which corresponds to the line number 3 of the pixel array 1002, is "1", while, referring to FIG. 3D, the context data on the discharge port number 3 in the nozzle context memory 105 corresponding thereto is "1". Therefore, the operational circuit 106 makes the data SO "2", and rewrites the context of the discharge port number 34 in the nozzle context memory 105 to "2", and also, the head drive data DO to "1".

Now, the counter 104 that indicates the discharge port numbers indicates the discharge port number 3 corresponding to the pixel array 1003.

Referring to FIG. 2, the data DI from the output buffer 102, which corresponds to the line number 3 of the pixel array 1003, is "1", while referring to FIG. 3D, the context data on the discharge port number 3 in the nozzle context memory 105 corresponding thereto is "2". Therefore, the operational circuit 106 makes the data SO "3", and rewrites the context data on the discharge port number 3 in the nozzle context memory to "3", and also, the head drive data DO to "0".

Now, the counter 104 that indicates the discharge port numbers indicates the discharge port number 4 corresponding to the pixel array 1004.

Referring to FIG. 2, the data DI from the output buffer 102, which corresponds to the line number 3 of the pixel array 1004, is "0", while referring to FIG. 3D, the context data on the discharge port number 4 in the nozzle context memory 105 corresponding thereto is "1". Therefore, the operational circuit 106 makes the data SO "1", and rewrites the context data on the discharge port number 4 in the nozzle context memory 105 to "1", and also, the head drive data DO to "0".

When the processes are completed up to the discharge port number 128 with respect to the line number 3 in the manner as described above, the nozzle context memory 105 is admitted to rewrite the contexts of the discharge port numbers 1, 2, 3, and 4 to "3", "2", "3", and "1", respectively, as indicated by the line number 4 in FIG. 3D. Also, the drive data DO output from the operational circuit 106 are in agreement with the data 0, 0, 0, 0 of the line number 3 on the pixel arrays 1001, 1002, 1003, and 1004 shown in FIG. 7D, respectively.

(Line Process for the Line Number 4)

After the line process described above for the line number 3, the counter 103 that indicates the line numbers in the scanning direction indicates the next line number 4. Also, the counter 104 that indicates the discharge port numbers indicates 1, 2, 3, and . . . sequentially for processing. Now, hereinafter, the description will be made of the processes for the discharge port numbers 1 to 4 corresponding to the pixel arrays 1001 to 1004.

The data DI from the output buffer 102 that corresponds to the line number 4 of the pixel array 1001 is "1" as shown in FIG. 2, while the context data SI on the discharge port number 1 of the context memory 105 corresponding thereto is "3" as shown in FIG. 3D. Therefore, the operational circuit 106 makes the data SO "0", and rewrites the context data on the discharge port number 33 in the nozzle context memory to "0", and the head drive data DO to "1".

Now, the counter 104 that indicates the discharge port numbers indicates the discharge port number 2 corresponding to the pixel array 1002.

Referring to FIG. 2, the data DI from the output buffer 102, which corresponds to the line number 4 of the pixel array 1002, is "1", while, referring to FIG. 3D, the context data SI on the discharge port number 2 in the nozzle context memory 105 corresponding thereto is "2". Therefore, the operational circuit 106 makes the data SO "3", and rewrites the context data on the discharge port number 34 in the nozzle context memory 105 to "3", and also, the head drive data DO to "0".

Now, the counter 104 that indicates the discharge port numbers indicates the discharge port number 3 corresponding to the pixel array 1003.

Referring to FIG. 2, the data DI from the output buffer 102, which corresponds to the line number 4 of the pixel array 1003, is "1", while referring to FIG. 3D, the context data SI on the discharge port number 3 in the nozzle context memory 105 corresponding thereto is "3". Therefore, the operational circuit 106 makes the data SO "0", and rewrites the context data on the discharge port number 3 in the nozzle context memory to "0", and the head drive data DO to "1".

Now, the counter 104 that indicates the discharge port numbers indicates the discharge port number 4 corresponding to the pixel array 1004.

Referring to FIG. 2, the data DI from the output buffer 102, which corresponds to the line number 4 of the pixel array 1004, is "0", while referring to FIG. 3D, the context data on the discharge port number 4 in the nozzle context memory 105 corresponding thereto is "1". Therefore, the operational circuit 106 makes the data SO "1", and rewrites the context data on the discharge port number 4 in the nozzle context memory 105 to "1", and the head drive data DO to "0".

When the processes are completed up to the discharge port number 128 with respect to the line number 4 in the manner as described above, the nozzle context memory 105 is admitted to rewrite the contexts of the discharge port numbers 1, 2, 3, and 4 to "0", "3", "0", and "1", respectively, as indicated by the line number 5 in FIG. 3D. Also, the drive data DO output from the operational circuit 106 are in agreement with the data 1, 0, 1, 0 of the line number 4 on the pixel arrays 1001, 1002, 1003, and 1004 shown in FIG. 7A, respectively.

Thereafter, the processes will be executed in the same manner for the fourth scan with respect to the line numbers 5, 6, 7, and . . . up to the last line.

As described above, with the structure arranged to record in such a manner that the recording in a given area is completed by means of a plurality of recording scans, and at the same time, the positions of the discharge ports of a recording head corresponding to the given area are made different per scan, it is possible to obtain the data that indicate discharge/non-discharge of ink per recording scan by calculation using the output from the output buffer 102 that stores the recording data, as well as the context data to which the data to be formed at the time of such recording scan are assigned. Therefore, with the provision of the memory that stores the context data corresponding to the numbers of discharge ports of the recording head, it is possible to obtain the discharge data per scan. As a result, there is no need for the preparation and storage of recording data per scan as in the conventional art, hence making it possible to make the memory capacity smaller, and implement the reduction of costs of the apparatus.

Also, with the use of the context memory 105 described in the present embodiment, a given pixel array is formed by several scans in accordance with the discharge data per scan obtainable by the operational circuit shown in FIG. 4, and at the same time, the pixels to be recorded in the pixel array can be recorded sequentially by each of the discharge ports corresponding to each scan. Therefore, it is possible to uniformalize the use frequencies of discharge ports, thus reducing the occurrence of defective discharges. Also, even if any defective discharges take place, it is possible to scatter the positions of pixels where no recording is made. As a result, it is possible to minimize the degradation of quality of images to be recorded.

Second Embodiment

Now, with reference to the accompanying drawings, the detailed description will be made of a second embodiment in accordance with the present invention.

For the first embodiment, the described example is that an image in a given area is recorded by the application of four-time scans by use of a recording head provided with 128 discharge ports. In accordance with the present embodiment, recording is made by the two-time scans that uses a recording head 1 provided with 128 discharge ports.

Figure 9A:
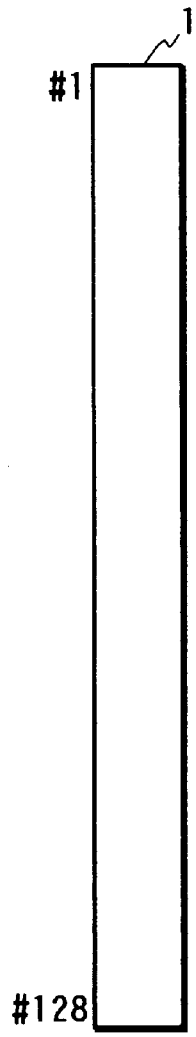
FIGS. 9A and 9B are views which illustrate recording methods in accordance with a second embodiment of the present invention.
Figure 9B:
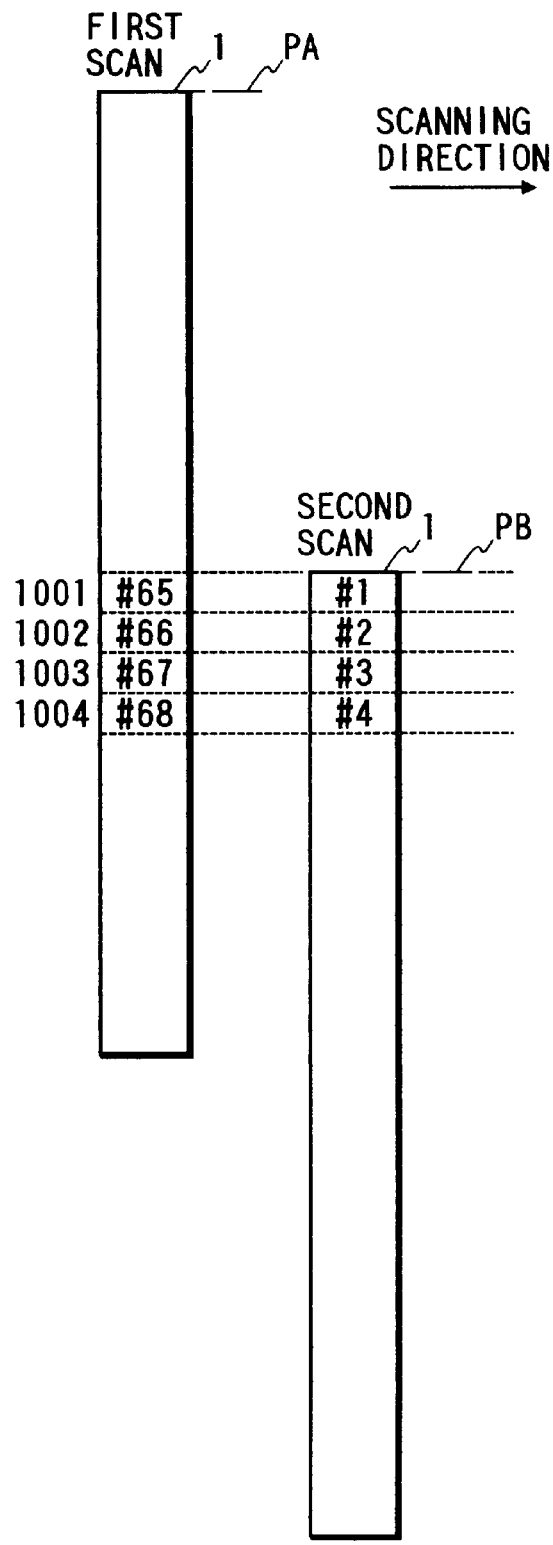

FIG. 9A is a view which shows the recording head 1 having 128 discharge ports, #1 to #128. In FIG. 9B, a reference mark PA designates the first scanning position of the recording head 1 with respect to a recording material, and PB, the second scanning position thereof to follow. In FIG. 9B, reference numerals 1001, 1002, 1003, and 1004 designate pixel arrays in the scanning direction of the head 1, respectively. Also, in FIG. 9B, each number with a mark # designates each of the discharge port numbers of the recording head 1.

With the structure described above, an image is formed on the pixel array 1001 in the head scanning direction, for example, by the application of ink discharges from the discharge numbers #65 and #1 at the first and second scans, respectively.

The principal part of a printing apparatus of the present embodiment is the same as the one represented in FIG. 1. Therefore, the detailed description thereof will be omitted. In accordance with the present embodiment, however, the nozzle context memory 105 is prepared by a collection of three-bit data, and the three-bit data are stored only for a portion for the discharge port numbers. By the adoption of the three-bit context data, seven states are provided for "1" to "7".

FIG. 15A and FIG. 15B are views that illustrate the processed contents of the operational circuit 106 for the present embodiment.

In FIG. 15A and FIG. 15B, the input from the output buffer 102 is defined as DI; the output to the head driver controller, as DO; the input from the nozzle context memory 105, as SI; and the output to the nozzle context memory 105, as SO as in the first embodiment. Also, the input DI from the output buffer 102 and the output DO to the head driver controller 107 are one-bit information, respectively. Here, "1" means ink discharge, and "0", non-discharge thereof. Also, the input and output SI and SO to and from the nozzle context memory 105 are three-bit information. Here, the seven states from "1" to "7" are obtainable. Also, for the discharge port numbers 1 to 64, processes are executed as shown in FIG. 15A. For the discharge port numbers 65 to 128, processes are executed as shown in FIG. 15B.

Figure 12:
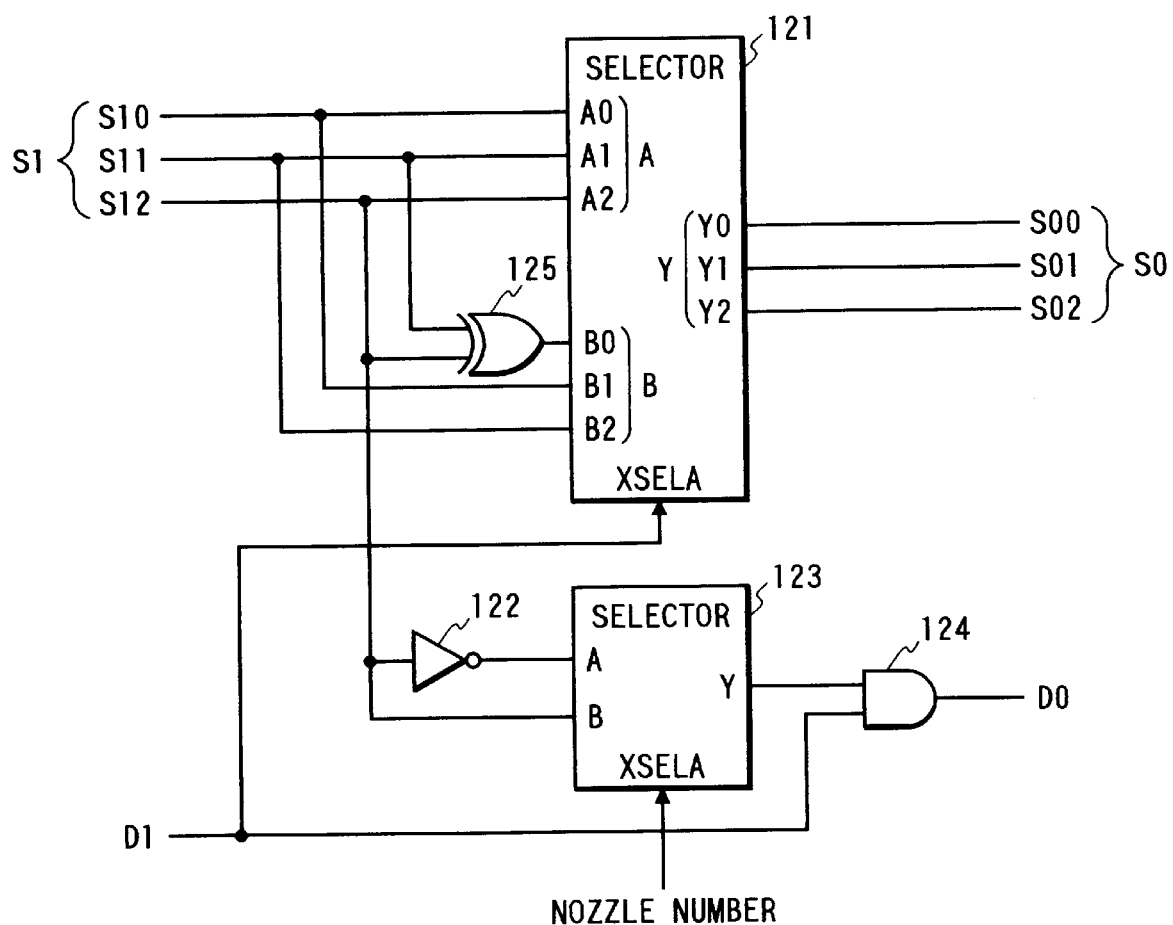
FIG. 12 is a view which partly shows the structure of an operational circuit in accordance with the second embodiment of the present invention.

FIG. 12 is a view which shows one example of a circuit structured in the operational circuit 106 for the executions of processes described in FIG. 15A and FIG. 15B.

In FIG. 12, a reference numeral 125 designates an exclusive OR gate that executes an exclusive OR between SI1 and SI2 of the outputs SI (SI0, SI1, and SI2) of the three-bit structured nozzle context memory 105, and 121, a selector that selects either one of the input from the terminals A0, A1, and A2 or from the terminals B0, B1, and B2, and makes its output from the terminals Y0, Y1, and Y2. Each input from the terminals A0, A1, and A2 is the output SI from the nozzle context memory 105. Each input from the terminals B0, B1, and B2 is the signal provided by shifting the bits of the output SI from the nozzle context memory 105 and the output from the exclusive OR gate 125. A reference numeral 122 designates an invertor that inverts the output SI2 from the nozzle context memory 105; 123, a selector that selects the decoder outputs in accordance with the discharge port numbers; and 124, an AND circuit.

Here, each of the selectors 121 and 123 outputs the inputted signals from the A side to Y when the XSELA is at "0". When it is at "1", the signals from the B side are output to Y. Also, the nozzle number signals are inputted as "1" when the nozzle numbers (discharge port numbers) are 1 to 64, and as "0" when the numbers are 65 to 128.

Now, the operation of the circuit shown in FIG. 12 will be described.

At first, when the DI is "0", the selector 12 outputs the A side to Y, thus making SO=SI, while the DO is "0" by means of AND 124.

Also, when the DI is "1", the selector 121 outputs the B side to Y. When the DI is "1" and the SI is "0", that is, SI0="0", SI1="0", and SI2="0", SO0 becomes "0" because it is the exclusive OR between SI1 and SI2, and SO1=SI0= "0", SO2=SI2="0". Thus, as shown in FIGS. 15A and 15B, the SO is "0".

Also, when DI is "1" and SI is "1", that is, SI0="1", SI1="0", and SI2="0", the SO is "2", because the SO0 becomes "0" as it is the exclusive OR between SI1 and SI2, and SO1=SI0="1", SO2=SI1="0".

FIG. 10A and FIG. 10B are views that show the states schematically in which the contents of the nozzle context memory 105 change sequentially in accordance with the line numbers at the first and second scans represented in FIG. 9B when the image shown in FIG. 6 is being recorded with the structure arranged as in the present embodiment, respectively. In FIG. 10A and FIG. 10B, reference numerals 1001, 1002, 1003, and 1004 designate pixel arrays in the scanning direction of the head, respectively, which correspond to the pixel arrays represented in FIG. 6 and FIG. 9B. Also, reference numerals 1 to 16 designate the line numbers that indicate each line in the head scanning direction.

Now, the detailed description will be made of the recording operation of the present embodiment in accordance with a specific example.

A. Specific Example of the Operation

At first, with reference to FIG. 1, the recording operation will be described with regard to the image shown in FIG. 6 by dividing it into the first and second scans. Here, for the present embodiment, it is assumed that the nozzle context memory 105 is set at "1" by means of the main controller 101 before each scan. The data on the image to be recorded are the same as those for the first embodiment, that is, the data represented in FIG. 2. Also, of the data to be recorded by the first scan and the second scan for the present embodiment, the data on the pixel arrays 1001 to 1004 are shown in FIG. 11A and FIG. 11B.

A-1. First Scan
(Line Process for the Line Number 1)

In executing the line process for the line number 1, the counter 103 indicates the line number 1, and the counter 104 that indicates the discharge port numbers indicates the discharge port numbers 1, 2, 3, and . . . sequentially for processing. At first, the description will be made of the process corresponding to the discharge number 65 assigned to the pixel array 1001.

Referring to FIG. 2, the data DI from the output buffer 102, which corresponds to the line number 1 of the pixel array 1001, is "1", while referring to FIG. 10A, the context data SI on the discharge port number 65 in the nozzle context memory 105 corresponding thereto is "1". Therefore, as shown in FIG. 15B, the operational circuit 106 makes the data SO "2" and rewrites the context of the discharge port number 65 in the nozzle context memory 105 to "2". The output head drive data DO is made "0".

Then, the counter 104 that indicates the discharge numbers indicates the discharge port number 66 that corresponds to the pixel array 1002.

Referring to FIG. 2, the data DI from the output buffer 102, which corresponds to the line number 1 of the pixel array 1002, is "0", while referring to FIG. 10A, the context data SI on the discharge port number 66 in the nozzle context memory 105 corresponding thereto is "1". Therefore, as shown in FIG. 15B, the operational circuit 106 makes the data SO "1", and rewrites the context of the discharge port number 66 in the nozzle context memory 105 to "1". Also, the output head drive data DO is made "0".

Now, the counter 104 that indicates the discharge port numbers indicates the discharge port number 67 corresponding to the pixel array 1003.

Referring to FIG. 2, the data DI from the output buffer 102, which corresponds to the line number 1 of the pixel array 1003, is "1", while referring to FIG. 10A, the context data SI on the discharge port number 68 in the nozzle context memory 105 corresponding thereto is "1". Therefore, as shown in FIG. 15B, the operational circuit 106 makes the data SO "2", and rewrites the context of the discharge port number 68 in the nozzle context memory 105 to "2". The output head drive data DO is made "0".

Now, the counter 104 that indicates the discharge port numbers indicates the discharge port number 68 that corresponds to the pixel array 1004.

Referring to FIG. 2, the data DI from the output buffer 102, which corresponds to the line number 1 of the pixel array 1004, is "1", while referring to FIG. 10A, the context data SI on the discharge port number 68 in the nozzle context memory 105 corresponding thereto is "1". Therefore, as shown in FIG. 15B, the operational circuit 106 makes the data SO "2", and rewrites the context of the discharge port number 68 in the nozzle context memory 105 to "2". The output head drive data DO is made "0".

When the processes are completed up to the discharge port number 128 with respect to the line number 1 in the manner as described above, the nozzle context memory 105 are admitted to rewrite the contexts of the discharge port numbers 65, 66, 67, and 68 to "2", "1", "2", and "2", respectively, as indicated by the line number 2 in FIG. 10A. Also, the drive data DO output from the operational circuit 106 are in agreement with the data 0, 0, 0, 0 as indicated by the line number 1 on the pixel arrays 1001, 1002, 1003, and 1004 shown in FIG. 11A, respectively.

(Line Process for the Line Number 2)

Now, the counter 103 that indicates the line numbers in the scanning direction indicates the line number 2, and the counter 104 that indicates the discharge port numbers indicates the discharge port number 1, 2, 3, and . . . sequentially for processing. Hereinafter, the description will be made of the data processes corresponding to the discharge numbers 65 to 68 corresponding to the pixel arrays 1001 to 1004.

Referring to FIG. 2, the data DI from the output buffer 102, which corresponds to the line number 2 of the pixel array 1001, is "1", while referring to FIG. 10A, the context data SI on the discharge port number 65 in the nozzle context memory 105 corresponding thereto is "2". Therefore, as shown in FIG. 15B, the operational circuit 106 makes the data SO "5" and rewrites the context of the discharge port number 65 in the nozzle context memory 105 to "5". The output head drive data DO is made "0".

Then, the counter 104 that indicates the discharge numbers indicates the discharge port number 66 that corresponds to the pixel array 1002.

Referring to FIG. 2, the data DI from the output buffer 102, which corresponds to the line number 2 of the pixel array 1002, is "1", while referring to FIG. 10A, the context data SI on the discharge port number 66 in the nozzle context memory 105 corresponding thereto is "1". Therefore, as shown in FIG. 15B, the operational circuit 106 makes the data SO "2", and rewrites the context of the discharge port number 66 in the nozzle context memory 105 to "2". Also, the output head drive data DO is made "0".

Now, the counter 104 that indicates the discharge port numbers indicates the discharge port number 67 corresponding to the pixel array 1003.

Referring to FIG. 2, the data DI from the output buffer 102, which corresponds to the line number 2 of the pixel array 1003, is "1", while referring to FIG. 10A, the context data SI on the discharge port number 68 in the nozzle context memory 105 corresponding thereto is "2". Therefore, as shown in FIG. 15B, the operational circuit 106 makes the data SO "5", and rewrites the context of the discharge port number 68 in the nozzle context memory 105 to "5". The output head drive data DO is made "0".

Now, the counter 104 that indicates the discharge port numbers indicates the discharge port number 68 that corresponds to the pixel array 1004.

Referring to FIG. 2, the data DI from the output buffer 102, which corresponds to the line number 2 of the pixel array 1004, is "0", while referring to FIG. 10A, the context data SI on the discharge port number 68 in the nozzle context memory 105 corresponding thereto is "2". Therefore, as shown in FIG. 15B, the operational circuit 106 makes the data SO "2", and rewrites the context of the discharge port number 68 in the nozzle context memory 105 to "2". The output head drive data DO is made "0".

When the processes are completed up to the discharge port number 128 with respect to the line number 2 in the manner as described above, the nozzle context memory 105 is admitted to rewrite the contexts of the discharge port numbers 65, 66, 67, and 68 to "5", "2", "5", and "2", respectively, as indicated by the line number 3 in FIG. 10A. Also, the drive data DO output from the operational circuit 106 are in agreement with the data 0, 0, 0, 0 as indicated by the line number 2 on the pixel arrays 1001, 1002, 1003, and 1004 shown in FIG. 11A, respectively.

(Line Process for the Line number 3)

Now, the processes for the line number 3 will be described. The counter 103 that indicates the line numbers in the scanning direction indicates the line number 3, and the counter 104 that indicates the discharge port numbers indicates the discharge port number 1, 2, 3, and . . . sequentially for processing. Hereinafter, the description will be made of the data processes corresponding to the discharge numbers 65 to 68 corresponding to the pixel arrays 1001 to 1004.

Referring to FIG. 2, the data DI from the output buffer 102, which corresponds to the line number 3 of the pixel array 1001, is "1", while referring to FIG. 10A, the context data SI on the discharge port number 65 in the nozzle context memory 105 corresponding thereto is "5". Therefore, as shown in FIG. 15B, the operational circuit 106 makes the data SO "3" and rewrites the context of the discharge port number 65 in the nozzle context memory 105 to "3". The output head drive data DO is made "1".

Then, the counter 104 that indicates the discharge numbers indicates the discharge port number 66 that corresponds to the pixel array 1002.

Referring to FIG. 2, the data DI from the output buffer 102, which corresponds to the line number 3 of the pixel array 1002, is "1", while referring to FIG. 10A, the context data SI on the discharge port number 66 in the nozzle context memory 105 corresponding thereto is "2". Therefore, as shown in FIG. 15B, the operational circuit 106 makes the data SO "5", and rewrites the context of the discharge port number 66 in the nozzle context memory 105 to "5". Also, the output head drive data DO is made "0".

Now, the counter 104 that indicates the discharge port numbers indicates the discharge port number 67 corresponding to the pixel array 1003.

Referring to FIG. 2, the data DI from the output buffer 102, which corresponds to the line number 3 of the pixel array 1003, is "1", while referring to FIG. 10A, the context data SI on the discharge port number 68 in the nozzle context memory 105 corresponding thereto is "5". Therefore, as shown in FIG. 15B, the operational circuit 106 makes the data SO "3", and rewrites the context of the discharge port number 68 in the nozzle context memory 105 to "3". The output head drive data DO is made "1".

Now, the counter 104 that indicates the discharge port numbers indicates the discharge port number 68 that corresponds to the pixel array 1004.

Referring to FIG. 2, the data DI from the output buffer 102, which corresponds to the line number 3 of the pixel array 1004, is "0", while referring to FIG. 10A, the context data SI on the discharge port number 68 in the nozzle context memory 105 corresponding thereto is "2". Therefore, as shown in FIG. 15B, the operational circuit 106 makes the data SO "2", and rewrites the context of the discharge port number 68 in the nozzle context memory 105 to "2". The output head drive data DO is made "0".

When the processes are completed up to the discharge port number 128 with respect to the line number 3 in the manner as described above, the nozzle context memory 105 is admitted to rewrite the contexts of the discharge port numbers 65, 66, 67, and 68 to "3", "5", "3", and "2", respectively, as indicated by the line number 4 in FIG. 10A. Also, the drive data DO output from the operational circuit 106 are in agreement with the data 1, 0, 1, 0 as indicated by the line number 3 on the pixel arrays 1001, 1002, 1003, and 1004 shown in FIG. 11A, respectively.

(Line Process for the Line Number 4)

Now, the processes for the line number 4 will be described. the counter 103 that indicates the line numbers in the scanning direction indicates the line number 4, and the counter 104 that indicates the discharge port numbers indicates the discharge port number 1, 2, 3, and . . . sequentially for processing. Hereinafter, the description will be made of the data processes corresponding to the discharge numbers 65 to 68 corresponding to the pixel arrays 1001 to 1004.

Referring to FIG. 2, the data DI from the output buffer 102, which corresponds to the line number 4 of the pixel array 1001, is "1", while referring to FIG. 10A, the context data SI on the discharge port number 65 in the nozzle context memory 105 corresponding thereto is "3". Therefore, as shown in FIG. 15B, the operational circuit 106 makes the data SO "7" and rewrites the context of the discharge port number 65 in the nozzle context memory 105 to "7". The output head drive data DO is made "0".

Then, the counter 104 that indicates the discharge numbers indicates the discharge port number 66 that corresponds to the pixel array 1002.

Referring to FIG. 2, the data DI from the output buffer 102, which corresponds to the line number 4 of the pixel array 1002, is "0", while referring to FIG. 10A, the context data SI on the discharge port number 66 in the nozzle context memory 105 corresponding thereto is "1". Therefore, as shown in FIG. 15B, the operational circuit 106 makes the data SO "3", and rewrites the context of the discharge port number 66 in the nozzle context memory 105 to "3". Also, the output head drive data DO is made "1".

Now, the counter 104 that indicates the discharge port numbers indicates the discharge port number 67 corresponding to the pixel array 1003.

Referring to FIG. 2, the data DI from the output buffer 102, which corresponds to the line number 4 of the pixel array 1003, is "1", while referring to FIG. 10A, the context data SI on the discharge port number 68 in the nozzle context memory 105 corresponding thereto is "1". Therefore, as shown in FIG. 15B, the operational circuit 106 makes the data SO "7", and rewrites the context of the discharge port number 68 in the nozzle context memory 105 to "7". The output head drive data DO is made "0".

Now, the counter 104 that indicates the discharge port numbers indicates the discharge port number 68 that corresponds to the pixel array 1004.

Referring to FIG. 2, the data DI from the output buffer 102, which corresponds to the line number 4 of the pixel array 1004, is "0", while referring to FIG. 10A, the context data SI on the discharge port number 68 in the nozzle context memory 105 corresponding thereto is "1". Therefore, as shown in FIG. 15B, the operational circuit 106 makes the data SO "2", and rewrites the context of the discharge port number 68 in the nozzle context memory 105 to "2". The output head drive data DO is made "0".

When the processes are completed up to the discharge port number 128 with respect to the line number 3 in the manner as described above, the nozzle context memory 105 is admitted to rewrite the contexts of the discharge port numbers 65, 66, 67, and 68 to "7", "3", "7", and "2", respectively, as indicated by the line number 5 in FIG. 10A. Also, the drive data DO output from the operational circuit 106 are in agreement with the data 0, 1, 0, 0 as indicated by the line number 4 on the pixel arrays 1001, 1002, 1003, and 1004 shown in FIG. 11A, respectively.

Thereafter, the processes described above are executed in accordance with data on each line, and after the processes on the last line are completed, the processes for the second scan will begin.

A-2. Second Scan

Now, the processes at the second scan will be described. For the second scan, the discharge ports that correspond to the pixel arrays 1001 to 1004 described above are the discharge port numbers 1 to 4. As in the first scan, the data to be stored in the nozzle context memory 105 are set at "1" before scanning begins.

(Line Process for the Line Number 1)

In executing the line process for the line number 1, the counter 103 that indicates the line numbers in the scanning direction indicates the line number 1, and the counter 104 that indicates the discharge port numbers indicates the discharge port numbers 1, 2, 3, and . . . sequentially for processing. Hereinafter, the description will be made of the data processes for the discharge numbers 1 to 4 assigned to the pixel arrays 1001 to 1004.

Referring to FIG. 2, the data DI from the output buffer 102, which corresponds to the line number 1 of the pixel array 1001, is "1", while referring to FIG. 10B, the context data SI on the discharge port number 1 in the nozzle context memory 105 corresponding thereto is "1". Therefore, as shown in FIG. 15A, the operational circuit 106 makes the data SO "2" and rewrites the context of the discharge port number 1 in the nozzle context memory 105 to "2". The output head drive data DO is made "0".

Then, the counter 104 that indicates the discharge numbers indicates the discharge port number 2 that corresponds to the pixel array 1002.

Referring to FIG. 2, the data DI from the output buffer 102, which corresponds to the line number 1 of the pixel array 1002, is "0", while referring to FIG. 10B, the context data SI on the discharge port number 2 in the nozzle context memory 105 corresponding thereto is "1". Therefore, as shown in FIG. 15A, the operational circuit 106 makes the data SO "1", and rewrites the context of the discharge port number 2 in the nozzle context memory 105 to "1". Also, the output head drive data DO is made "0".

Now, the counter 104 that indicates the discharge port numbers indicates the discharge port number 3 corresponding to the pixel array 1003.

Referring to FIG. 2, the data DI from the output buffer 102, which corresponds to the line number 1 of the pixel array 1003, is "1", while referring to FIG. 10B, the context data SI on the discharge port number 3 in the nozzle context memory 105 corresponding thereto is "1". Therefore, as shown in FIG. 15A, the operational circuit 106 makes the data SO "2", and rewrites the context of the discharge port number 3 in the nozzle context memory 105 to "2". The output head drive data DO is made "1".

Now, the counter 104 that indicates the discharge port numbers indicates the discharge port number 4 that corresponds to the pixel array 1004.

Referring to FIG. 2, the data DI from the output buffer 102, which corresponds to the line number 1 of the pixel array 1004, is "1", while referring to FIG. 10B, the context data SI on the discharge port number 4 in the nozzle context memory 105 corresponding thereto is "1". Therefore, as shown in FIG. 15A, the operational circuit 106 makes the data SO "2", and rewrites the context of the discharge port number 4 in the nozzle context memory 105 to "2". The output head drive data DO is made "1".

When the processes are completed up to the discharge port number 128 with respect to the line number 1 in the manner as described above, the nozzle context memory 105 are admitted to rewrite the contexts of the discharge port numbers 1, 2, 3, and 4 to "2", "1", "2", and "2", respectively, as indicated by the line number 2 in FIG. 10B. Also, the drive data DO output from the operational circuit 106 are in agreement with the data 1, 0, 1, 1 as indicated by the line number 1 on the pixel arrays 1001, 1002, 1003, and 1004 shown in FIG. 11B, respectively.

(Line Process for the Line Number 2)

Now, the processes for the line number 2 will be described. The counter 103 that indicates the line numbers in the scanning direction indicates the line number 2, and the counter 104 that indicates the discharge port numbers indicates the discharge port number 1, 2, 3, and . . . sequentially for processing. Hereinafter, the description will be made of the data processes corresponding to the discharge numbers 1 to 4 assigned to the pixel arrays 1001 to 1004.

Referring to FIG. 2, the data DI from the output buffer 102, which corresponds to the line number 2 of the pixel array 1001, is "1", while referring to FIG. 10B, the context data SI on the discharge port number 1 in the nozzle context memory 105 corresponding thereto is "2". Therefore, as shown in FIG. 15A, the operational circuit 106 makes the data SO "5" and rewrites the context of the discharge port number 1 in the nozzle context memory 105 to "5". The output head drive data DO is made "1".

Then, the counter 104 that indicates the discharge numbers indicates the discharge port number 2 that corresponds to the pixel array 1002.

Referring to FIG. 2, the data DI from the output buffer 102, which corresponds to the line number 2 of the pixel array 1002, is "1", while referring to FIG. 10B, the context data SI on the discharge port number 2 in the nozzle context memory 105 corresponding thereto is "1". Therefore, as shown in FIG. 15A, the operational circuit 106 makes the data SO "2", and rewrites the context of the discharge port number 66 in the nozzle context memory 105 to "2". Also, the output head drive data DO is made "1".

Now, the counter 104 that indicates the discharge port numbers indicates the discharge port number 3 corresponding to the pixel array 1003.

Referring to FIG. 2, the data DI from the output buffer 102, which corresponds to the line number 2 of the pixel array 1003, is "1", while referring to FIG. 10B, the context data SI on the discharge port number 3 in the nozzle context memory 105 corresponding thereto is "2". Therefore, as shown in FIG. 15A, the operational circuit 106 makes the data SO "5", and rewrites the context of the discharge port number 3 in the nozzle context memory 105 to "5". The output head drive data DO is made "1".

Now, the counter 104 that indicates the discharge port numbers indicates the discharge port number 4 that corresponds to the pixel array 1004.

Referring to FIG. 2, the data DI from the output buffer 102, which corresponds to the line number 2 of the pixel array 1004, is "0", while referring to FIG. 10B, the context data SI on the discharge port number 4 in the nozzle context memory 105 corresponding thereto is "2". Therefore, as shown in FIG. 15A, the operational circuit 106 makes the data SO "2", and rewrites the context of the discharge port number 4 in the nozzle context memory 105 to "2". The output head drive data DO is made "0".

When the processes are completed up to the discharge port number 128 with respect to the line number 2 in the manner as described above, the nozzle context memory 105 is admitted to rewrite the contexts of the discharge port numbers 1, 2, 3, and 4 to "5", "2", "5", and "2", respectively, as indicated by the line number 3 in FIG. 10B. Also, the drive data DO output from the operational circuit 106 are in agreement with the data 1, 1, 1, 0 as indicated by the line number 2 on the pixel arrays 1001, 1002, 1003, and 1004 shown in FIG. 11B, respectively.

(Line Process for the Line number 3)

Now, the processes for the line number 3 will be described. The counter 103 that indicates the line numbers in the scanning direction indicates the line number 3, and the counter 104 that indicates the discharge port numbers indicates the discharge port number 1, 2, 3, and . . . sequentially for processing. Hereinafter, the description will be made of the data processes corresponding to the discharge numbers 1 to 4 assigned to the pixel arrays 1001 to 1004.

Referring to FIG. 2, the data DI from the output buffer 102, which corresponds to the line number 3 of the pixel array 1001, is "1", while referring to FIG. 10B, the context data SI on the discharge port number 1 in the nozzle context memory 105 corresponding thereto is "5". Therefore, as shown in FIG. 15A, the operational circuit 106 makes the data SO "5" and rewrites the context of the discharge port number 1 in the nozzle context memory 105 to "3". The output head drive data DO is made "1".

Then, the counter 104 that indicates the discharge numbers indicates the discharge port number 2 that corresponds to the pixel array 1002.

Referring to FIG. 2, the data DI from the output buffer 102, which corresponds to the line number 3 of the pixel array 1002, is "1", while referring to FIG. 10B, the context data SI on the discharge port number 2 in the nozzle context memory 105 corresponding thereto is "2". Therefore, as shown in FIG. 15A, the operational circuit 106 makes the data SO "5", and rewrites the context of the discharge port number 2 in the nozzle context memory 105 to "5". Also, the output head drive data DO is made "1".

Now, the counter 104 that indicates the discharge port numbers indicates the discharge port number 3 corresponding to the pixel array 1003.

Referring to FIG. 2, the data DI from the output buffer 102, which corresponds to the line number 3 of the pixel array 1003, is "1", while referring to FIG. 10B, the context data SI on the discharge port number 3 in the nozzle context memory 105 corresponding thereto is "5". Therefore, as shown in FIG. 15A, the operational circuit 106 makes the data SO "3", and rewrites the context of the discharge port number 3 in the nozzle context memory 105 to "3". The output head drive data DO is made "0".

Now, the counter 104 that indicates the discharge port numbers indicates the discharge port number 4 that corresponds to the pixel array 1004.

Referring to FIG. 2, the data DI from the output buffer 102, which corresponds to the line number 3 of the pixel array 1004, is "0", while referring to FIG. 10B, the context data SI on the discharge port number 4 in the nozzle context memory 105 corresponding thereto is "2". Therefore, as shown in FIG. 15A, the operational circuit 106 makes the data SO "2", and rewrites the context of the discharge port number 4 in the nozzle context memory 105 to "2". The output head drive data DO is made "0".

When the processes are completed up to the discharge port number 128 with respect to the line number 3 in the manner as described above, the nozzle context memory 105 is admitted to rewrite the contexts of the discharge port numbers 1, 2, 3, and 4 to "3", "5", "3", and "2", respectively, as indicated by the line number 4 in FIG. 10B. Also, the drive data DO output from the operational circuit 106 are in agreement with the data 0, 1, 0, 0 as indicated by the line number 3 on the pixel arrays 1001, 1002, 1003, and 1004 shown in FIG. 11B, respectively.

(Line Process for the Line Number 4)

Now, the processes for the line number 4 will be described. The counter 103 that indicates the line numbers in the scanning direction indicates the line number 4, and the counter 104 that indicates the discharge port numbers indicates the discharge port number 1, 2, 3, and . . . sequentially for processing. Hereinafter, the description will be made of the data processes corresponding to the discharge numbers 1 to 4 assigned to the pixel arrays 1001 to 1004.

Referring to FIG. 2, the data DI from the output buffer 102, which corresponds to the line number 4 of the pixel array 1001, is "1", while referring to FIG. 10B, the context data SI on the discharge port number 1 in the nozzle context memory 105 corresponding thereto is "3". Therefore, as shown in FIG. 15A, the operational circuit 106 makes the data SO "7" and rewrites the context of the discharge port number 1 in the nozzle context memory 105 to "7". The output head drive data DO is made "1".

Then, the counter 104 that indicates the discharge numbers indicates the discharge port number 2 that corresponds to the pixel array 1002.

Referring to FIG. 2, the data DI from the output buffer 102, which corresponds to the line number 4 of the pixel array 1002, is "0", while referring to FIG. 10B, the context data SI on the discharge port number 2 in the nozzle context memory 105 corresponding thereto is "1". Therefore, as shown in FIG. 15A, the operational circuit 106 makes the data SO "3", and rewrites the context of the discharge port number 2 in the nozzle context memory 105 to "3". Also, the output head drive data DO is made "0".

Now, the counter 104 that indicates the discharge port numbers indicates the discharge port number 3 corresponding to the pixel array 1003.

Referring to FIG. 2, the data DI from the output buffer 102, which corresponds to the line number 4 of the pixel array 1003, is "1", while referring to FIG. 10B, the context data SI on the discharge port number 3 in the nozzle context memory 105 corresponding thereto is "1". Therefore, as shown in FIG. 15A, the operational circuit 106 makes the data SO "7", and rewrites the context of the discharge port number 3 in the nozzle context memory 105 to "7". The output head drive data DO is made "1".

Now, the counter 104 that indicates the discharge port numbers indicates the discharge port number 4 that corresponds to the pixel array 1004.

Referring to FIG. 2, the data DI from the output buffer 102, which corresponds to the line number 4 of the pixel array 1004, is "0", while referring to FIG. 10B, the context data SI on the discharge port number 4 in the nozzle context memory 105 corresponding thereto is "1". Therefore, as shown in FIG. 15A, the operational circuit 106 makes the data SO "2", and rewrites the context of the discharge port number 4 in the nozzle context memory 105 to "2". The output head drive data DO is made "0".

When the processes are completed up to the discharge port number 128 with respect to the line number 3 in the manner as described above, the nozzle context memory 105 is admitted to rewrite the contexts of the discharge port numbers 1, 2, 3, and 4 to "7", "3", "7", and "2", respectively, as indicated by the line number 5 in FIG. 10B. Also, the drive data DO output from the operational circuit 106 are in agreement with the data 1, 0, 1, 0 as indicated by the line number 4 on the pixel arrays 1001, 1002, 1003, and 1004 shown in FIG. 11A, respectively.

FIG. 13 is a view which shows the discharge ports used for the formation of pixels receiving attention in the present embodiment with the attention given to the pixel array 1001 in the scanning direction of the head 1.

In FIG. 13, one square represents the position of one pixel formation. The square filled in black indicates the corresponding pixel is formed by discharged ink. Also, each of the numbers with the mark # represents each discharge port number. Numerals 1 to 16 designate line numbers in the scanning direction of the head 1.

As understandable form FIG. 13, the discharge ports #1 and #65 for the formation of the pixel array 1001 are used four times each for discharging ink. By the use of the discharge ports as shown in the present embodiment, it is possible to use them uniformly. Thus, there is no deviation in the use frequencies of discharge ports. Therefore, the occurrence of defective discharges can be reduced, while making the life of the recording head longer. Also, even if there are discharge ports whose amount of ink discharge are defective, it is possible to scatter the positions of pixels that are not recorded, hence obtaining good images.

Third Embodiment

At first, before the description of the present embodiment, the structural example of the principal part of an ink jet printing apparatus for use of the present embodiment will be described with reference to FIG. 16.

Figure 16:
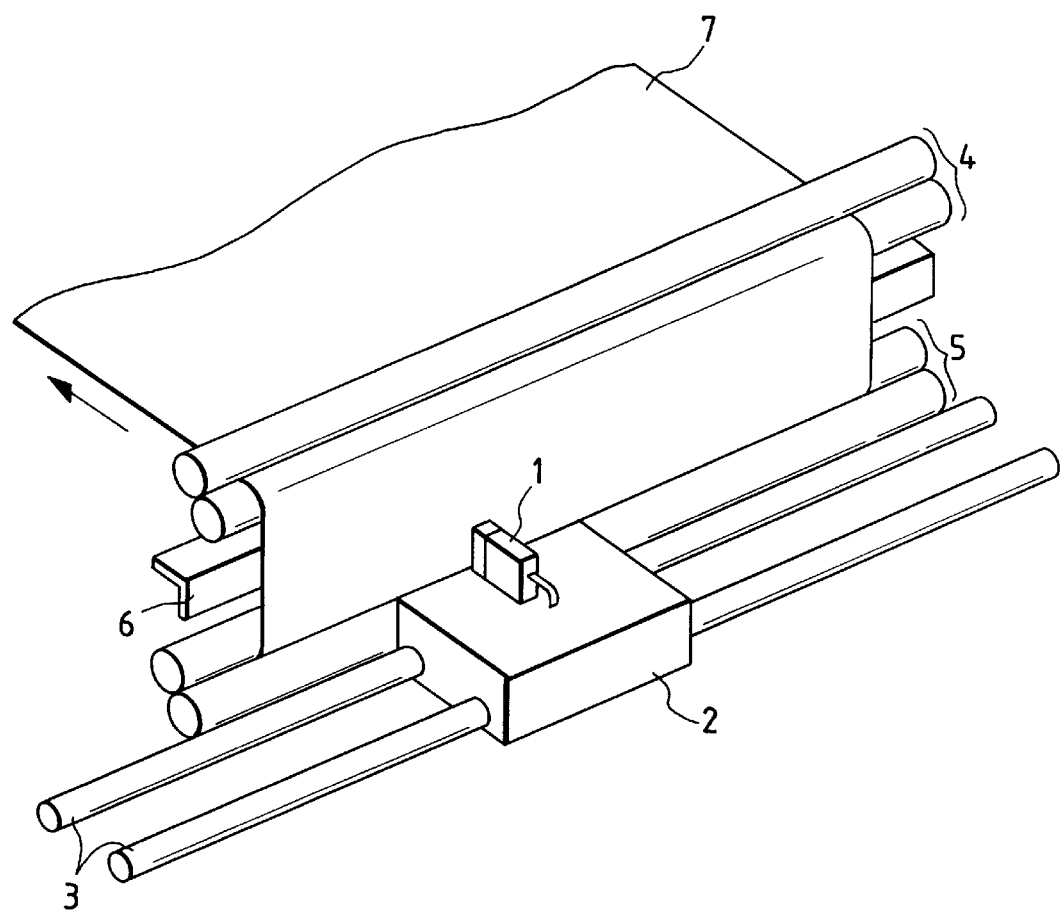
FIG. 16 is a perspective view which shows the principal part of an ink jet printing apparatus to which the present invention is applicable.

In FIG. 16, a recording head (printing head) 1 is provided with 128 ink discharge ports (not shown), for example, on the plane that faces a recording sheet 7 serving as a recording material in the conveying direction of the recording sheet 7. Also, the recording head 1 is provided with ink paths (not shown) conductively connected to each of the 128 discharge ports. On the base board that provides the recording head 1, electrothermal transducing elements are formed corresponding to each of the ink paths to generate thermal energy for ink discharges. The electrothermal transducing elements generate heat by the application of electric pulses in accordance with drive data. With heat thus generated, film boiling is created in ink. By the film boiling thus created, air bubbles are developed. Along the development thereof, ink is discharged from each of the discharge ports. For the ink paths, a common liquid chamber is provided and connected to each of them for its shared use. Ink retained in this chamber is supplied to each of the ink paths in accordance with the ink discharge operation in each of the ink paths.

The recording head 1 is mounted on a carriage 2. The carriage 2 is slidably guided by a pair of guide rails 3 that extend in parallel with the recording surface of the recording sheet 7. Therefore, the recording head 1 can scan while traveling along the guide rails 3 in a state that it is mounted on the carriage 2. Along such scans, it discharges ink onto the recording surface for recording at a given timing. Then, the recording sheet 7 is sequentially carried for a given amount per scan in the direction indicated by an arrow in FIG. 16. With the repetition of such operations, recording is being made on the recording sheet sequentially.

The conveyance of the recording sheet 7 is performed by the rotation of each pair of carrier rollers 4 and 5 arranged above and below the recording surface, respectively. Also, on the reverse side of the recording surface of the recording sheet 7, a platen 6 is arranged to keep the flatness of the recording surface. The carriage 2 can travel by means of a belt (not shown) attached thereto when it is driven by a motor. Also, the rotation of the carrier rollers 4 and 5 are possible by transmitting the rotation of a motor thereto.

Now, when recording is made dividedly by the four-time scan as in the first embodiment described above, the recording sheet 7 serving as a recording material is carried per scan in the direction indicated by the arrow in FIG. 16 in a length equivalent to ¼ of the portion of the array of all the discharge ports (128 pieces).

In accordance with a third embodiment of the present invention, the structure is arranged to provide a control so that the recording speed is enhanced depending on the selection of use modes for the first embodiment. Here, the use modes that require the enhancement of the recording speed is the so-called draft mode of the description is made earlier. Such mode is selected when it takes a long time to obtain the result of a regular recording, while its recording result is needed immediately even if it is simplified, or when the required output of the result of recording is not very important, for example. Usually, for the draft mode, its recording speed is made faster by recording pixels intermittently like a checker pattern. Also, the draft mode is adopted for curtailing the ink consumption.

For the present embodiment, only the first scan is executed for all the pixel arrays when the draft mode is selected in the first embodiment described above. After such first scan, the recording sheet 7 is carried in the direction indicated by the arrow in FIG. 16 in the length equivalent to the portion of the array of all the discharge ports (128 pieces). Therefore, on the recording sheet 7, only approximately ¼ of the pixels to be recording regularly are recorded. As a result, a higher recording can be implemented as required for the draft mode to the extent that the frequencies of scanning and feeding of the recording sheet 7 are reduced with respect to the entire surface of the recording sheet 7. Further, even if the numbers of pixels to be recorded are reduced, the pixels per discharge port are thinned almost uniformly, thus making it possible to enhance the drive frequency and make the scanning speed of the head 1 faster four times to implement the intended higher-speed recording.

Furthermore, in accordance with the present embodiment, it is possible to repeat the first and third scans represented in FIG. 5 described for the first embodiment, and the recording sheet 7 is carried in the direction indicated by the arrow in FIG. 16 in an amount equivalent to the portion of half a length of each array of the all the discharge ports while these scans are being executed. In this way, almost ½ of the pixels can be recorded regularly.

Also, the present embodiment is applicable to the case where recording is executed by two-time scans as in the second embodiment described above. In other words, if the draft mode is selected in the second embodiment, only the first scan is executed for all the pixel arrays as described above, and after such first scan, the recording sheet 7 is carried in the direction indicated by the arrow in FIG. 16 in the length equivalent to the portion of the arrays of all the discharge ports (128 pieces). Therefore, on the recording sheet 7, only almost ½ of pixels, which are recorded regularly are recorded, thus implementing a higher speed recording required as the draft mode.

Fourth Embodiment

Figure 17:
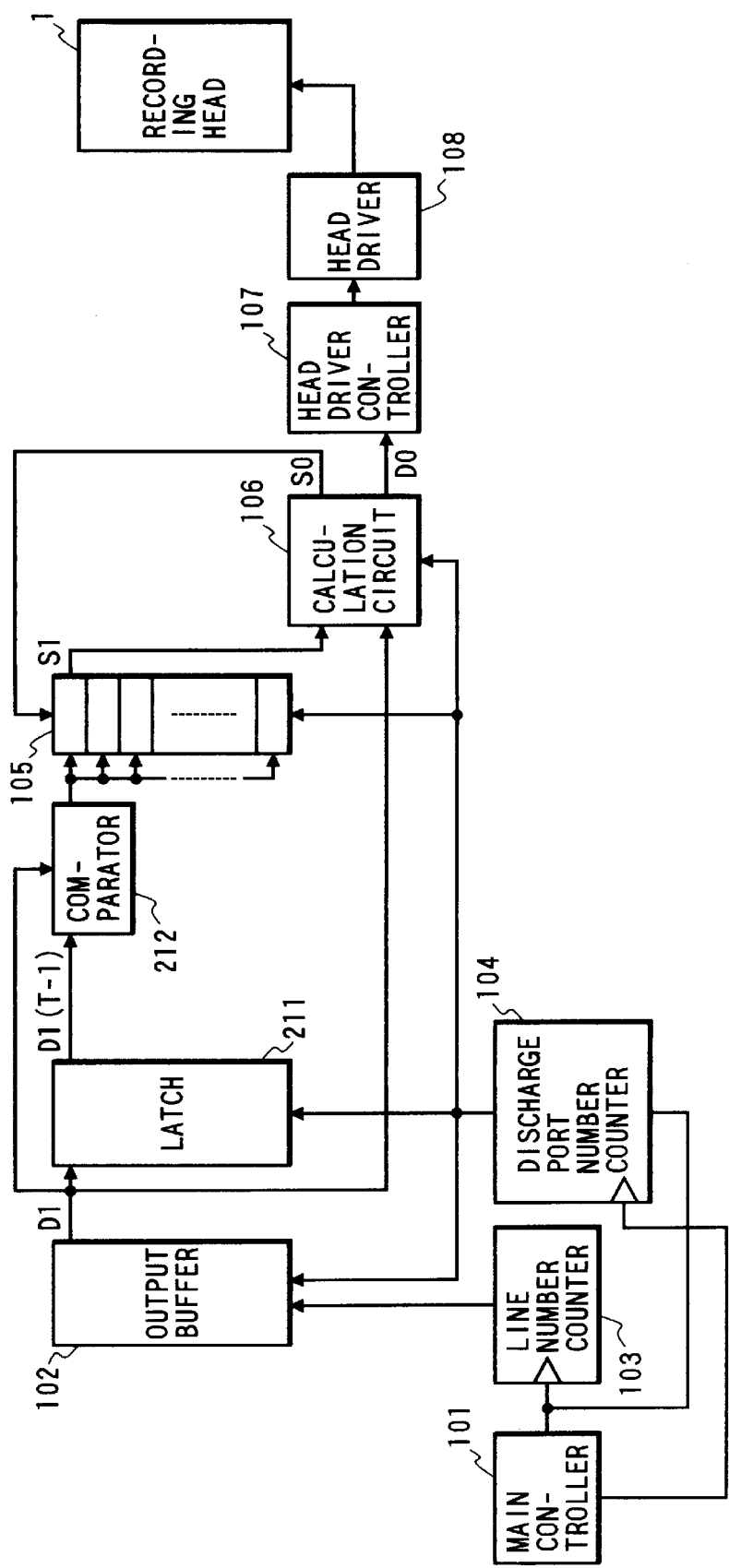
FIG. 17 is a block diagram which shows the principal part of a fourth embodiment in accordance with the present invention.
Figure 18:
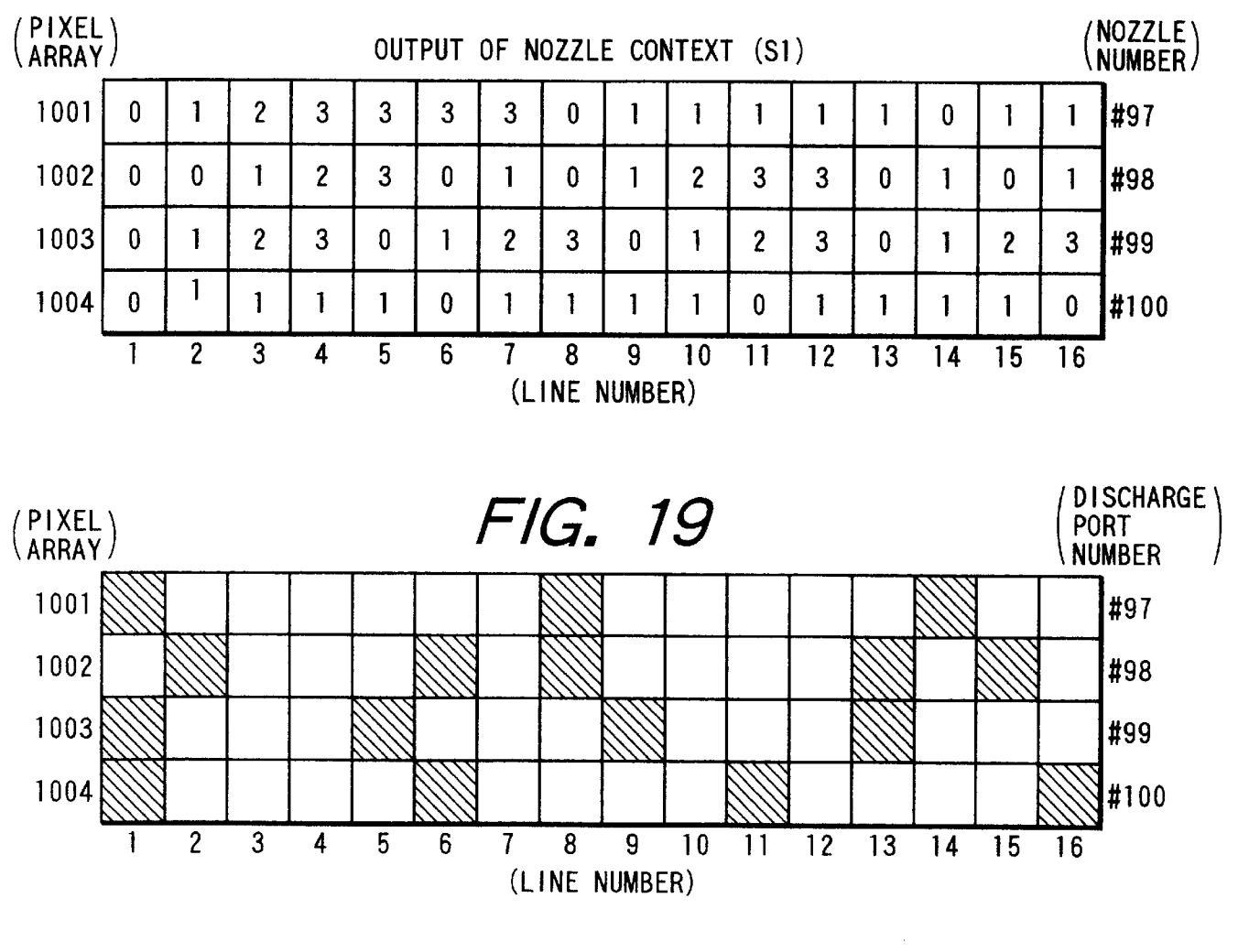

FIG. 17, FIG. 18, and FIG. 19 are views that illustrate a fourth embodiment in accordance with the present invention.

As in the third embodiment described above, the present embodiment is structured to execute only the first scan of the four scans represented in FIG. 5B described for the first embodiment, and to carry the recording sheet 7 in the direction indicated by the arrow in FIG. 16 in a length equivalent to the width portion of the array of all the discharge ports. Further, the present embodiment is an application example where a data processing function, which will be described later, is additionally provided for recording edge portions of images. Here, the operational circuit 106 is assumed to execute the processes for the input and output relationship as shown in FIG. 14A with respect to all the discharge ports at the time of the first scan shown in FIG. 5B.

FIG. 17 is a block diagram, which is the same as FIG. 1 used for the first embodiment described above. Here, the description will be made of only the parts that differ from those in FIG. 1.

In FIG. 17, a reference numeral 211 designates the latch that holds the output data DI corresponding to the line number that precedes by 1 the line number indicated by the line number counter 103. In other words, the latch 211 holds the data DI per discharge port number as a binary data to indicate discharge or non-discharge of ink for the line number that precedes by 1 the line number currently in process. The latch 211 is a comparator, and the data latched by the latch 211, that is, the data DI (hereinafter referred to as DI (t−1)) on the line number that precedes by 1 the currently processed line number, and the output data from the output buffer 102, that is, the data DI on the currently processed line number are compared for every discharge port number. Then, if the data DI (t−1) is "0" for the line number precedes by 1 the currently processed line number and the data DI on the later is "1" (indicating non-discharge of ink), the output signal from the comparator 212 is asserted as "0".

When the output of this comparator 212 is asserted as "0", the data SI output from the corresponding nozzle context memory 105 is reset to "0". In other words, on the image edge portion where data DI changes from "0" to "1" on the pixel array corresponding to each discharge port number, the nozzle context SI is reset to "0".

As described above, by resetting the nozzle context SI to "0" on the image edge portion where the data DI changes from "0" to "1", the DO on the currently processed pixel becomes "1" if the pixel is among those on the edge portion. Hence, ink is discharged from the corresponding discharge port.

FIG. 18 is a view which shows the changing state of the contents of the nozzle context memory 105 corresponding to the image data DO represented in FIG. 2 in accordance with the processes executed in the present embodiment. In this case, recording is executed as shown in FIG. 19, and the pixels on the edge portions of images are formed as understandable from the comparison between the representations in FIG. 19 and FIG. 7A used for the first embodiment.

As described above, in accordance with the present embodiment, the pixels on the edge portions are always set at "ink discharge" on the edge portions where the image data DI changes from "0" to "1". In this way, even for the mode where recording is executed by thinning the dots that may be recorded regularly, there is no possibility that the dots on the edge portions are thinned, thus making it possible to record images whose character portion or the like are easily recognizable.

In this respect, the changing point of image data DI from "0" to "1" is detected as the edge portion of an image in accordance with the present embodiment. However, a structure may be arranged so that a comparison is made possible with the recording data on the next line, and then, the changing point of the image data DI from "1" to "0" or the changing points both from "1" to "0" and "0" to "1" can be detected as the edge portion of the image.

Fifth Embodiment

The present embodiment adopts as its recording method the method for forming images by four-time scans as in FIGS. 5A and 5B described for the first embodiment. Also, as the recording example of images, those represented in FIG. 6 are recorded. Also, the fundamental structures of the recording apparatus, recording head, and others are the same as those adopted for the previous embodiment.

FIG. 20 is a structural block diagram which shows the principal part of the printing apparatus as a fifth embodiment in accordance with the present invention.

In FIG. 20, the same reference marks are applied to the same constituents as those appearing in FIG. 1 and FIG. 17. The description thereof will be omitted. In FIG. 20, a reference numeral 109 designates operational circuits which correspond to each of the discharge ports one to one. Here, #1, #2, . . . , #128 indicated at 109 designate the discharge port numbers 1, 2, . . . , 128, respectively.

FIG. 21A, FIG. 21B, FIG. 21C, and FIG. 21D are views which illustrate the processing circuits forming the principal part of the operational circuits 109. FIG. 21A shows the processing circuit corresponding to each of the discharge port number 1 to 32; likewise, FIG. 21B, discharge port numbers 33 to 64; FIG. 21C, discharge port numbers 65 to 96; and FIG. 21D, discharge port numbers 97 to 128, respectively.

At first, in FIG. 21A, a reference numeral 311 designates a counter, which is increased by 1 per input of one-bit data DI. The counter outputs two-bit data (0, 0), (0, 1), (1, 0), and (1, 1) as SO from QA and QB sequentially and repeatedly. In other words, whenever the data DI becomes "1", the output SO repeats the state of "0", "1", "2", and "3". Also, the data DI is "0", the output SO does not change. A reference numeral 312A designates a decoder. The output from the decoder 312A and the data DI are inputted into an AND gate 113. The AND thereof becomes the drive data DO for the head 1. The processing circuits shown in FIG. 21B, FIG. 21C, and FIG. 21D are structured, in which the decoder 312A shown in FIG. 21A is replaced with decoders 312B, 312C, and 312D, respectively, thus being arranged to differentiate the outputs of the decoders depending on the outputs of the counter 311.

The outputs SO from the counter 311 shown in FIGS. 21A, 21B, 21C, and 21D change sequentially in accordance with the line numbers as shown in FIG. 4 at each time of the first, second, third, and fourth scans as shown in FIGS. 5A and 5B. As regards the pixel arrays 1001, 1002, 1003, and 1004 at the time of first scan shown in FIG. 3A, for example, the outputs from the counter 311 corresponding thereto are "0", "0", "0", "0" before recording the line number 1, but before recording the next line number 2, the counter is increased to change its outputs to "1", "0", "1" "1" in accordance with the data DI to be described later.

In other words, the processing circuits shown in FIGS. 21A to 21D execute the same processes as shown in FIGS. 14A to 14D, and the outputs SO sequentially repeat the state "0", "1", "2", "3" whenever "1" is inputted as the data DI as described above. If the data DI is "0", no change takes place. Also, the SI corresponds to the output SO before the data DI is inputted. Therefore, in accordance with the present embodiment, it is possible to record the image shown in FIG. 6 by dividing scans into four times, while updating the nozzle context as in the first embodiment described above.

Sixth Embodiment

Now, the detailed description will be made of a sixth embodiment in accordance with the present invention.

The present embodiment adopts the recording method that divides scans into two as shown in FIGS. 9A and 9B described for the second embodiment, and records the image shown in FIG. 6 as the example of image to be recorded by the present embodiment.

Figure 22A:
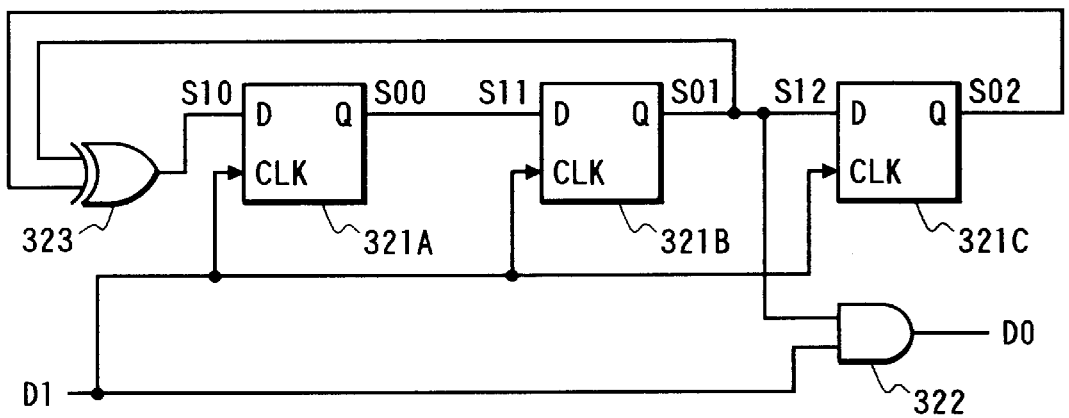
FIGS. 22A and 22B are views which partly show the structures of an operational circuit in accordance with a sixth embodiment of the present invention.

The principal parts of the printing apparatus to which the present embodiment is applicable are structured the same as those shown in FIG. 20 described for the fifth embodiment. However, the operational circuits 109 that correspond to the discharge ports one to one are structured as in FIGS. 22A and 22B. FIG. 22A shows the processing circuit in the operation circuit 109, which correspond to discharge port numbers 1 to 64, and FIG. 22B shows the processing circuits that correspond to the discharge port numbers 65 to 128.

At first, in FIG. 22A, reference marks 321A, 321B and 321C designates D flip-flops, which receive SI0, SI1, and SI2 as its input and output SO0, SO1, and SO2, respectively. The outputs SI0, SI1, and SI2 form 3-bit inputs SI as in the second embodiment described above. Also, the inputs SO0, SO0, and SO2 form the outputs SO as in the second embodiment described above. Also, a reference numeral 322 designates an AND circuit and 323, and exclusive OR circuit. The processing circuit shown in FIG. 22B is of such a structure that an not circuit 122 is further provided for the circuit shown in FIG. 22A.

Figure 22B:
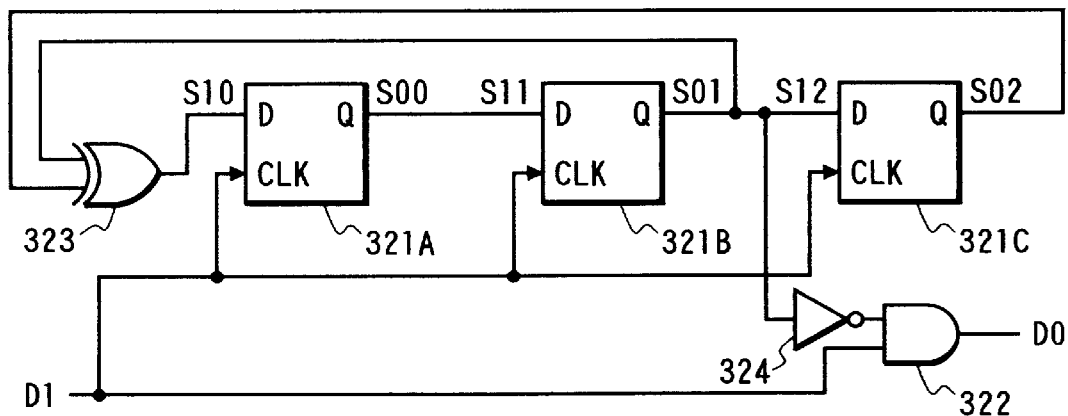

In other words, each of the processing circuits shown in FIG. 22A and FIG. 22B is arranged to execute the same processes as shown in FIG. 10A and FIG. 10B, respectively. Therefore, with the structure arranged for the present embodiment, it is possible to record the image shown in FIG. 6 by dividing the scans into two as in the second embodiment, while updating the nozzle context.

Other Embodiments

Now, for each of the embodiments, first to fourth, described above, only one operational circuit 106 is provided, but it may be possible to arrange it in plural numbers in order to allow the numbers of the operational circuits and discharge ports to correspond one to one. With this arrangement, it becomes unnecessary to provide the selectors 113 and 123 shown in FIG. 4 and FIG. 12, respectively.

Also, in accordance with the first embodiment, the nozzle context memory 105 is reset to "0" before starting each scan. It is not necessarily reset to "0". It should be good enough if only the nozzle context memory 105, which corresponds to the discharge ports used for recording on one and the same pixel array, is set at the same value.

Also, in the first embodiment, it may be possible to obtain the same result by enabling the operational circuit 106 to make its outputs as shown in FIG. 14D for all the discharge port numbers #1 to 128 by making an arrangement so that before starting each scan, the nozzle context memory 105 is resent to "0" for the discharge port numbers #97, 98, 99, and 100; the nozzle context memory 105 is set at "3" for the discharge port numbers #65, 66, 67, and 68; the nozzle context memory 105 is set at "2" for the discharge port numbers #33, 34, 35, and 36; and the nozzle context memory 105 is set at "1" for the discharge port numbers #1, 2, 3, and 4. With the structure thus arranged, it also becomes unnecessary to provide the selector 113.

Further, in accordance with each embodiment described above, only one recording head 1 is adopted, but it is of course possible to arrange the structure so that a color ink jet recording apparatus is adopted with the provision of plural heads.

Also, in each of the embodiments described above, the data stored on the output buffer 102 are defined as the binary data that indicate discharge/non-discharge of ink. However, it may be possible to arrange the structure so that, while preparing the image data handled by the recording apparatus itself to be applicable to the multiply valued images, the output buffer 102 stores the binary data, which are treated by the known binarization process such as dither method, error diffusion method, among some others.

Here, particularly among ink jet recording methods, the present invention produces excellent effects on a recording head and a recording apparatus of a method where thermal energy generating means (electrothermal transducing elements, laser beam, or the like, for example) is provided for generating energy to be utilized for discharging ink, and ink is caused to change its states by the application of such thermal energy, because a method of the kind makes it possible to attain recording in high density and high precision.

Regarding the typical structure and operational principle of such method, it is preferable to adopt those which can be implemented using the fundamental principle disclosed in the specifications of U.S. Pat. Nos. 4,723,129 and 4,740,796, for example. This method is applicable to the systems of the so-called on-demand type and a continuous type. Particularly, however, the method is suitable for the on-demand type because the principle is such that at least one driving signal, which provides a rapid temperature rise beyond a departure from nucleation boiling point in response to recording information, is applicable to an electrothermal transducing element disposed on a liquid (ink) retaining sheet or liquid path whereby to cause the electrothermal transducing element to generate thermal energy to produce film boiling on the thermoactive portion of recording means (recording head), thus effectively leading to the resultant formation of a bubble in the recording liquid (ink) one to one in response to each of the driving signals. By the development and contraction of the bubble, the liquid (ink) is discharged through a discharge port to produce at least one droplet. The driving signal is more preferably in the form of pulses because the development and contraction of the bubble can be effectuated instantaneously and appropriately. Therefore, the liquid (ink) is discharged with quicker response. The driving signal in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid paths, and the electrothermal transducing elements (linear type liquid paths or right-angled liquid paths). Besides, the structure, such as disclosed in the specifications of U.S. Pat. Nos. 4,558,333 and 4,459,600 wherein the thermal activation portions are arranged in a curved area, is also included in the present invention. In addition, the present invention is effectively applicable to the structure disclosed in Japanese Patent Laid-Open Application No. 59-123670 wherein a common slit is used as the discharging ports for plural electrothermal transducers, and to the structure disclosed in Japanese Patent Laid-Open Application No. 59-138461 wherein an aperture for absorbing pressure wave of the thermal energy is formed corresponding to the discharge ports. In other words, it is possible to perform recording reliably and more effectively in accordance with the present invention irrespective of the modes of recording heads.

Also, with respect to the third and fourth embodiments of those described above, the present invention is effectively applicable to the recording head of a full-line type having a length corresponding to the maximum width of a recording medium recordable by the recording apparatus. For such recording head, it may be possible to adopt either a structure whereby to satisfy the required length by combining a plurality of recording heads or a structure arranged by one recording head integrally formed.

In addition, the present invention is effectively applicable not only to the serial type as described above, but also, applicable to a recording head fixed to an apparatus main body; a recording head of an exchangeable chip type, which is made operative when electrically connected with an apparatus main body, and receiving ink supply therefrom when mounted on an apparatus main body; or a recording head of a cartridge type where an ink tank is integrally formed with the recording head itself.

Also, for the present invention, it is preferable to additionally provide a recording head with recovery means and preliminarily auxiliary means as constituents of the recording apparatus because these additional means will contribute to making the effectiveness of the present invention more stabilized. To name them specifically, these are capping means, cleaning means, suction or compression means, preheating means such as electrothermal transducing elements or heating elements other than such transducing elements or the combination of those types of elements, and a predischarge means for performing discharge other than the regular discharge for the recording head.

Also, regarding the kinds and numbers of ink jet recording heads to be mounted, the present invention is not only applicable to a recording mode in which only one recording head is provided for use of one monochromic ink, but also to an apparatus having plural recording heads provided for use of plural kinds of ink in different colors or in densities. In other words, the present invention is extremely effective in applying it to an apparatus provided with at least one of various recording modes using a multi-color of different colors or a full-color of mixed colors, irrespective of whether the recording heads are integrally structured or it is structured by a combination of plural recording heads.

Furthermore, for the embodiments of the present invention described above, ink has been described as liquid. However, ink may be an ink material which is solidified below the room temperature but soften or liquefied at the room temperature, or for the ink jet method, since ink is generally controlled within the temperature not lower than 30° C. and not higher than 70° C. in order to stabilize its viscosity for the execution of stable discharges, the ink may be such as to be liquefied when the required recording signals are applied. In addition, while positively preventing the temperature rise due to the thermal energy by use of such energy as an energy to be consumed for changing states of ink from solid to liquid, or by use of the ink which will be solidified when left intact for the purpose of preventing the ink from being evaporated, it may be possible to adopt for the present invention the use of an ink having a nature of being liquefied only by the application of thermal energy, such as ink capable of being discharged as ink liquid by enabling itself to be liquefied anyway when the thermal energy is given in accordance with recording signals, and also, a kind of ink that will have already begun solidifying itself by the time it reaches a recording medium. In such a case, it may be possible to retain ink in the form of liquid or solid in the recesses or through holes of a porous sheet such as disclosed in Japanese Patent Laid-Open Application No. 54-56847 or 60-71260 in order to keep such ink to face the electrothermal transducing elements. In the present invention, the most effective method applicable to various kinds of ink mentioned above is the one capable of implementing the film boiling method as described above.

Moreover, as the mode of the recording apparatus of the present invention, it may be possible to adopt a copying apparatus combined with a reader or the like, in addition to the image output terminal for a computer or other information processing apparatus. Also, it may be possible to adopt a mode of a facsimile equipment having transmitting and receiving functions, among some others.

Figure 23:
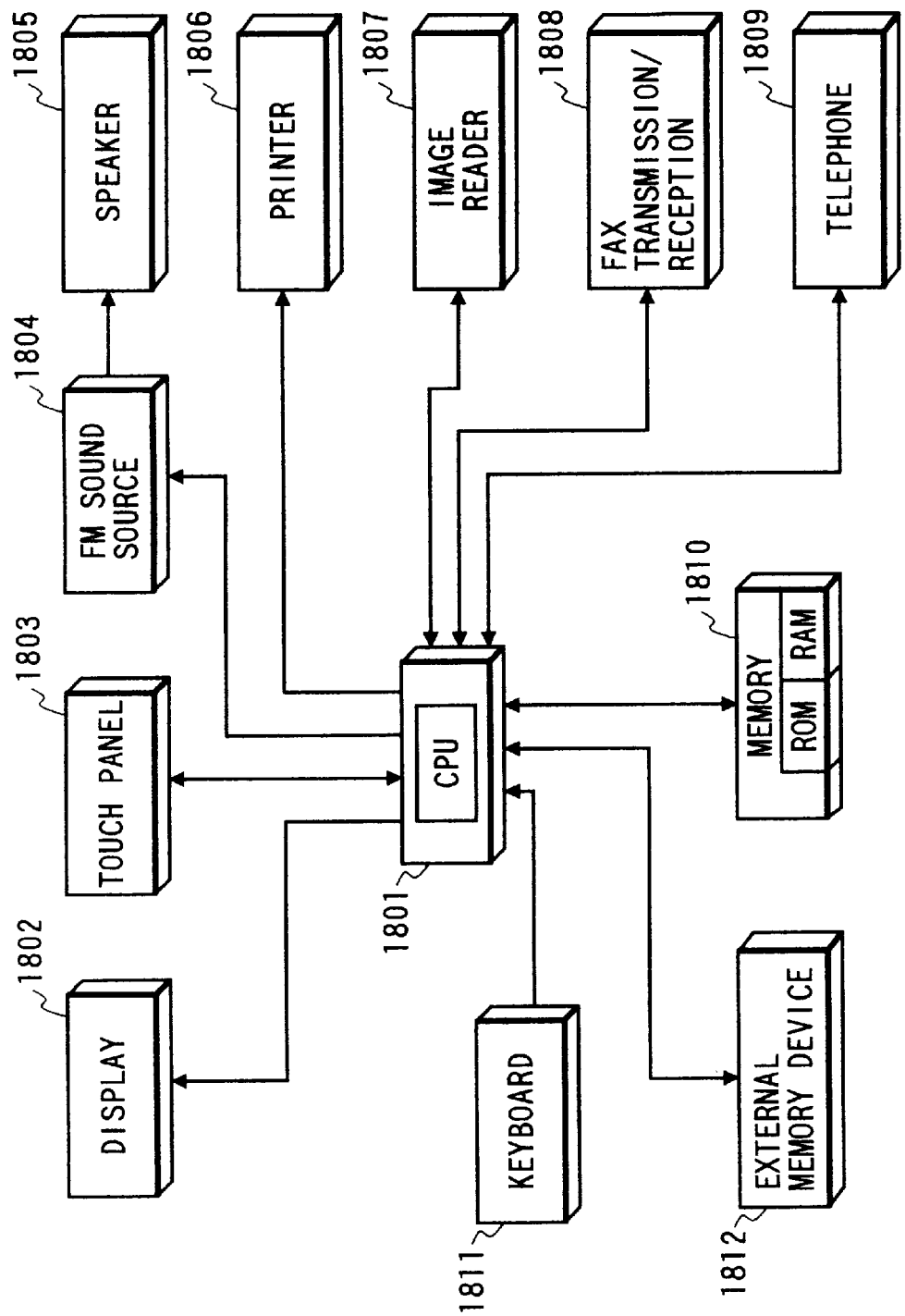
FIG. 23 is a block diagram which schematically shows the structure when the printing apparatus of the present invention is adopted for an information processing apparatus provided with the functions of a word processor, a personal computer, a facsimile equipment, and a copying apparatus.

FIG. 23 is a block diagram which schematically shows the structure when the recording apparatus of the present invention is made applicable to an information processing apparatus provided with functions as a word processor, a personal computer, a facsimile equipment, and a copying apparatus.

In FIG. 23, a reference numeral 1801 designates a controller that controls the systems as a whole, which is provided with a CPU of a microprocessor type or the like and various I/O ports in order to output control signals and data signals to each unit, and to receive control and data signals from each unit, thus executing controls as required; 1802, a display unit to indicate various menus, document information, image data read out by a image reader 1807, and some others on its display screen; and 1803, a transparent pressure-sensitive touch panel installed on the display unit 1802, which enables items and coordinate positions to be inputted through the display unit when the surface thereof is depressed by use of a finger or the like accordingly.

A reference numeral 1804 designates an FM (Frequency Modulation) sound generating unit that stores musical information prepared by a musical editor or the like on a memory unit 1810 or an external memory device 1812 as digital data, and then, reads them out from the memory to execute the FM modulation thereof. The electric signals from the FM sound generating unit 1804 is converted to audible sounds by means of a speaker unit 1805. The printer unit 1806 is the one to which the apparatus of the present invention is applicable, and functions as output terminals of a word processor, a personal computer, a facsimile equipment, and a copying apparatus.

A reference numeral 1807 designates an image reader unit arranged on the carrier path in order to read out data on a source document photoelectrically for input. This unit reads source documents not only for facsimile and copying operations, but also, reads various other documents; 1808, the transmission and reception unit of a facsimile (FAX) equipment that transmits data on source documents read out by the image reader unit 1807 for facsimile operation, and receives facsimile signals being transmitted and demodulates them. This unit has an interface function with external devices. A reference numeral 1809 designates a telephone unit provided with the usual telephone, answering telephone, and various other related functions.

A reference numeral 1810 designates a memory unit that includes a ROM storing a system program, a manager program, and other application programs together with character fonts, dictionaries, and the like, a RAM to store application program and document information loaded from the external memory devices, and a video RAM.

A reference numeral 1811 designates a keyboard unit to input document information, various commands, and the like.

The external memory device 1812 uses a floppy disc, a hard disc, or the like as storage medium to store document information, music or voice information, user application programs, and others.

Figure 24:
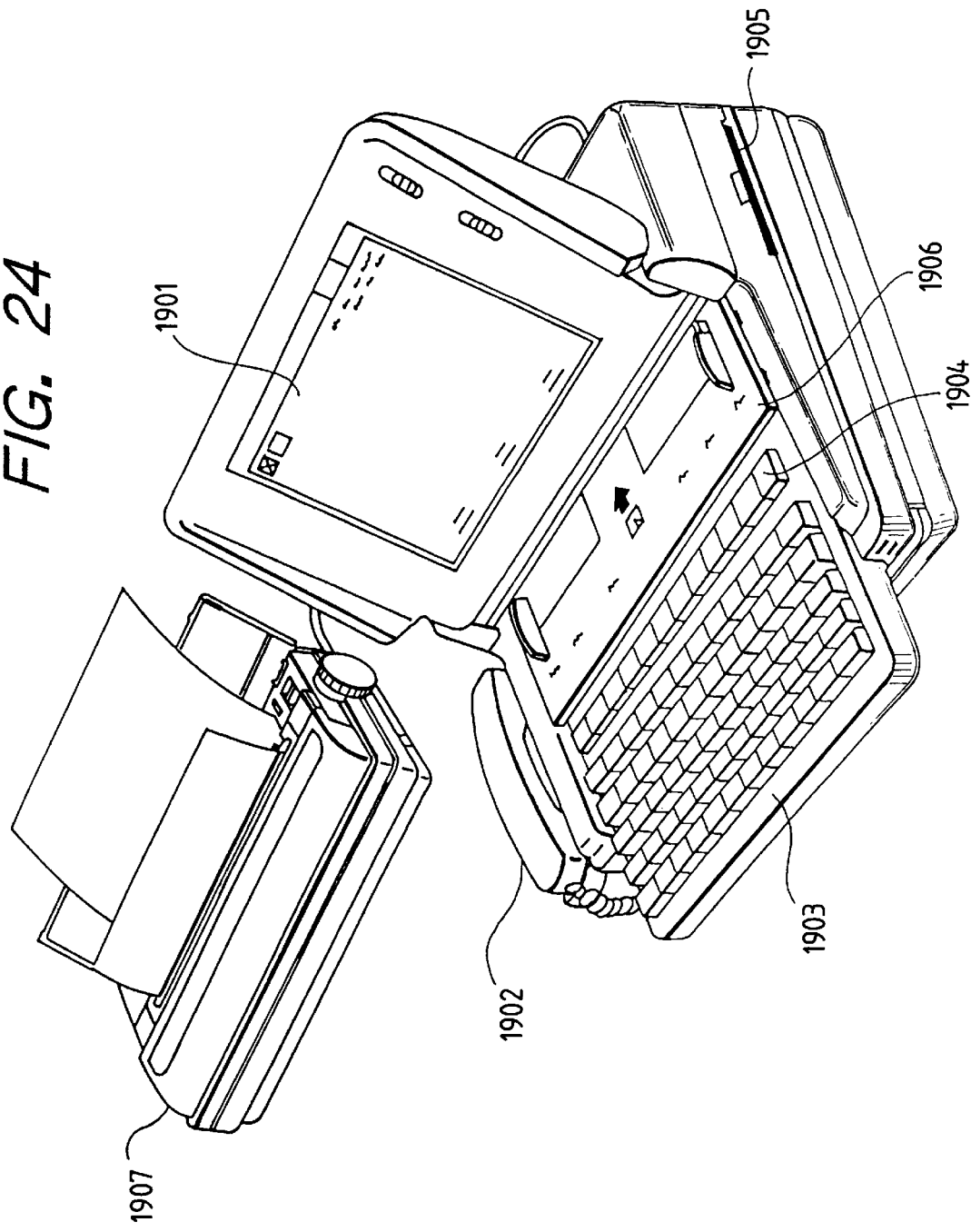
FIG. 24 is a schematic view which shows the outer appearance of the information processing apparatus represented in FIG. 23.

FIG. 24 is a view which schematically shows the information processing apparatus represented in FIG. 23.

In FIG. 24, a reference numeral 1901 designates a flat panel display that utilizes liquid crystal and others and displays various menus, graphic information, document information, and the like. On the display 1901, a touch panel 1803 is installed, which enables coordinates and items to be inputted when its surface is being depressed by use of a finger or the like as required. A reference numeral 1902 designates a hand set to be used when the apparatus functions as a telephone. The keyboard 1903 is detachably connected with the apparatus main body by means of a cord to input various document information and various data. Also, for the keyboard 1903, various functional keys and others are provided. A reference numeral 1905 designates a floppy disc insertion inlet for the external memory device 1812.

A reference numeral 1906 designates a sheet stacking unit to stack source documents to be read out by means of the image reader unit 1807. The source documents are delivered to the rear portion of the apparatus after reading. Also, for the facsimile reception or the like, the received data are printed by use of the ink jet printer 1907.

In this respect, the display unit 1802 may be a CRT, but it is preferable to use the flat panel of a liquid crystal display type that utilizes ferroelectric liquid crystal. With such display unit, the apparatus can be made smaller and thinner.

When the information processing apparatus described above is made to function as a personal computer or a word processor, each kind of information inputted through the keyboard unit 1811 is processed by the controlling unit 1801 in accordance with a given program, and is output to the printer unit 1806 as images.

When the apparatus is made to function as the receiver of a facsimile equipment, the facsimile information, which are received from the FAX transmission and reception unit 1808 through a communication line, are received and processed by the controlling unit 1801 in accordance with a given program, and output to the printer unit 1806 as reception images.

Also, when the apparatus is made to function as a copying apparatus, a source document is read by the image reader unit 1807, and the data on the source document thus read are output to the printer unit 1806 through the controlling unit 1801 as copied images. In this respect, when the apparatus is made to function as the transmitter of a facsimile equipment, the data on a source document read by the image reader unit 1807 are transmitted to a communication line through the FAX transmission and reception unit 1808 after being processed by the controlling unit 1801 for transmission in accordance with a given program.

Figure 25:
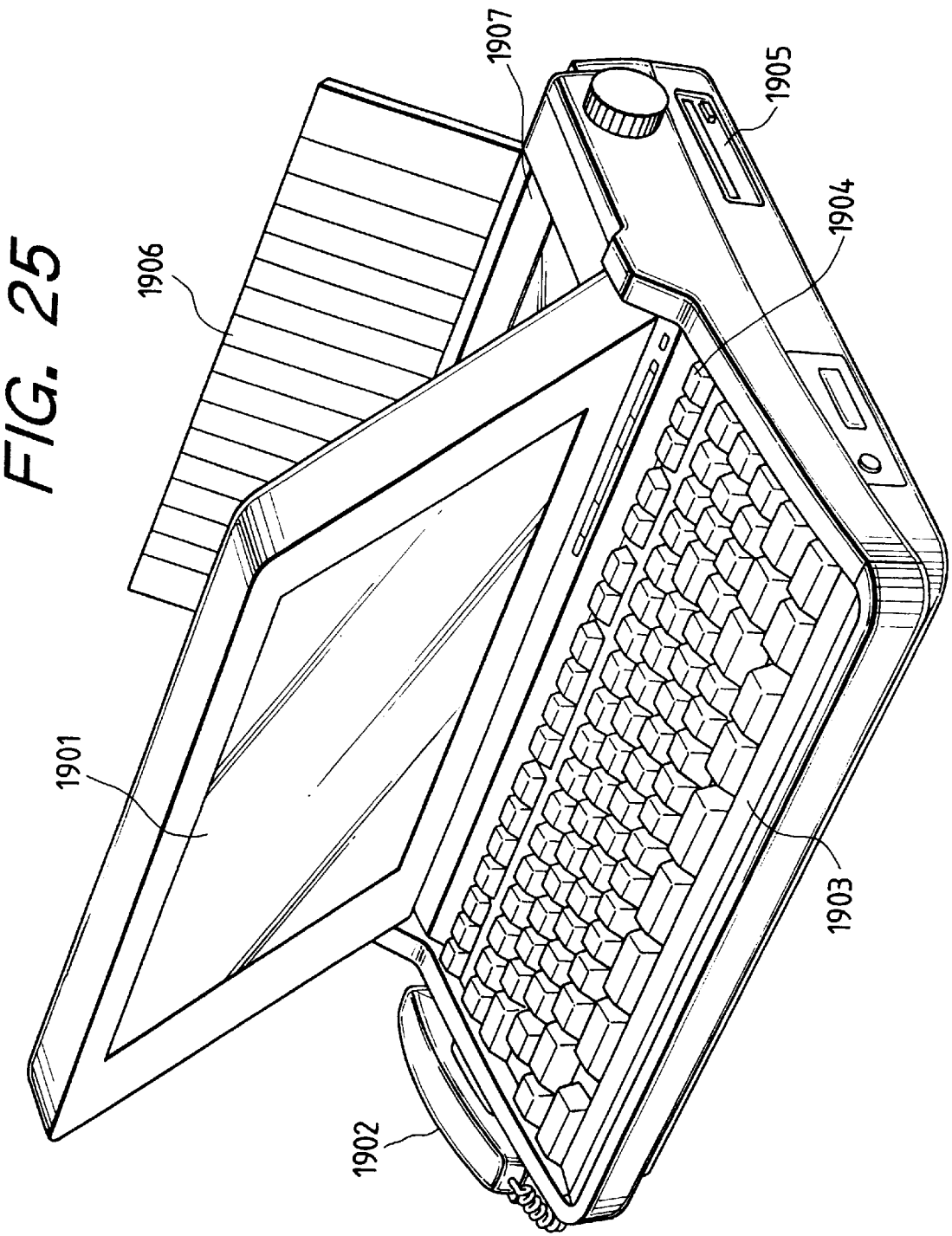
FIG. 25 is a view which schematically shows one example where the printing apparatus of the present invention is adopted for an information processing apparatus.

Here, as shown in FIG. 25, the information processing apparatus described above may be of an integrated type that incorporates an ink jet printer in it. In such case, the portability of the apparatus is further enhanced. In FIG. 25, the corresponding reference marks are applied to those parts where the apparatus has the same functions as those referred to in FIG. 24.

Now, by applying the recording apparatus of the present invention to the multi-functional information processing apparatus that has been described above, it is possible to obtain high-quality images recorded at higher speeds with a lesser amount of noises, and to further enhance the functions of such information processing apparatus accordingly.

As described above, in accordance with the present invention, it is possible to obtain good images by the uniform use of plural discharge ports, and at the same time, to make the capacity of memory smaller for the storage of data to control the plural discharge ports by use of the control data to assign pixels to be formed to the plural discharge ports, and by the calculation of the drive data to control discharge or non-discharge of ink from such plural discharge ports, while updating such control data sequentially.

Also, by processing the control data with respect to the edge portions of images, it is possible to obtain good images by use of the so-called draft mode.

What is claimed is:

1. A data control apparatus for controlling drive data indicating recording/non-recording by each recording element of a recording head in accordance with image data on images to be recorded for a recording apparatus provided with the recording head having a plurality of recording elements, comprising:

means for storing image data in accordance with images to be recorded;

means for storing context data for controlling the recording/non-recording of said image data corresponding to said recording elements of said recording head; and calculating means for creating drive data indicating the recording/non-recording of each of the plurality of recording elements in accordance with the image data stored in said means for storing image data and the context data, said calculating means creating drive data corresponding to a predetermined recording element in accordance with the image data and the context data corresponding to the predetermined recording element and updating the context data.

2. A data control apparatus according to claim 1, wherein context data created by said calculating means are stored in said means for storing context data corresponding to recording elements.

3. A data control apparatus according to claim 1, wherein said calculating means differentiates modes of drive data creation in accordance with context data corresponding to the recording elements of said recording head.

4. A data control apparatus according to claim 1, wherein an initial value of said context data is different in accordance with recording elements corresponding to context data.

5. A data control apparatus according to claim 1, further comprising:

detecting means for detecting edge portions of an image in accordance with said image data; and means for changing said context data with respect to the edge portions in accordance with a result of detection by said detecting means.

6. A data control apparatus according to claim 5, wherein said detecting means detects positions of image changing image data from data indicating non-recording to data indicating recording as edge portions.

7. A data control apparatus according to claim 5, wherein said detecting means detects positions of image changing image data from data indicating recording to data indicating non-recording as edge portions.

8. A data control apparatus according to claim 5, wherein said detecting means detects the positions of image changing image data from data indicating nonrecording to data indicating recording, and changing image data from data indicating recording to data indicating non-recording as edge portions.

9. A data controlling method for controlling drive data indicating recording/non-recording of each recording element of a recording head in accordance with recording image data stored on means for storing image data for a recording apparatus provided with the recording head having a plurality of recording elements, comprising the following steps of:

providing context data for controlling the recording/non-recording of the image data corresponding to the plurality of recording elements of the recording head;

creating drive data indicating the recording/non-recording of each of the recording elements in accordance with the context data and the image data corresponding to each of the plurality of recording elements; and updating the context data corresponding to a predetermined recording element in accordance with a creation of the drive data.

10. A data controlling method according to claim 9, wherein said context data created in said step for updating context data are stored in accordance with the recording elements.

11. A data controlling method according to claim 9, wherein said drive data differentiate modes of drive data creation in accordance with context data corresponding to the recording elements of said recording head in said drive data creating step.

12. A data controlling method according to claim 9, wherein an initial value of said context data is different in accordance with recording elements corresponding to the context data.

13. A data controlling means according to claim 9, further comprising the following steps of:

detecting edge portions of images in accordance with said image data; and changing said context data for detected edge portions.

14. A data controlling method according to claim 13, wherein positions of image changing image data from data indicating non-recording to data indicating recording are detected as edge portions in said detecting step.

15. A data controlling method according to claim 13, wherein positions of image changing image data from data indicating recording to data indicating non-recording are detected as edge portions in said detecting step.

16. A data controlling method according to claim 13, positions of image changing image data from data indicating non-recording to data indicating recording, and changing image data from data indicating recording to data indicating non-recording are detected as edge portions in said detecting step.

17. A recording apparatus having a recording head provided with a plurality of recording elements for forming pixels to be recorded on a recording medium; means for storing image data in accordance with images to be recorded; and scanning means for enabling the recording head to scan relatively with respect to the recording medium, comprising:

means for storing context data for controlling the recording/non-recording of the image data corresponding to the plural recording elements of the recording head;

calculating means for creating drive data indicating the recording/non-recording of each of the plurality of recording elements in accordance with the image data stored in the means for storing image data and the context data, said calculating means creating drive data corresponding to a predetermined recording element in accordance with the image data and the context data corresponding to the predetermined recording element and updating the context data; and head driving means for driving the plural recording elements of the recording head in accordance with the drive data.

18. A recording apparatus according to claim 17, wherein said calculating means decodes said context data, selects decoded data in accordance with positions of corresponding recording elements of said recording head, and creates drive data in accordance with AND of the selected data and the corresponding image data.

19. A recording apparatus according to claim 17, wherein said calculating means creates context data by adding said image data and the context data of the recording elements corresponding to said image data.

20. A recording apparatus according to claim 17, wherein the context data created by said calculating means are stored in said means for storing context data corresponding to recording elements.

21. A recording apparatus according to claim 17, wherein said calculating means differentiates modes of drive data creation in accordance with context data corresponding to the recording elements of said recording head.

22. A recording apparatus according to claim 17, wherein an initial value of said context data is different in accordance with the recording elements corresponding to context data.

23. A recording apparatus according to claim 17, further comprising:

conveying means for conveying said recording medium with respect to said recording head in a direction orthogonal to a scanning direction of said scanning means;

recording control means for making an amount of conveyance of the recording medium by said conveying means smaller than a recording width of said recording head, and enabling a recording area continuously scanned by said scanning means to be recorded repeatedly, wherein said calculating means creates drive data complementing recording on the area repeatedly scanned continuously by said recording control means by several recording scans on said recording area.

24. A recording apparatus according to claim 23, wherein said plural recording elements are divided into a plurality of recording element groups in accordance with a number of recording scans to complement recording an image in a give area by said recording control means; and said calculating means differentiates modes of drive data creation for each of said plural recording elements groups.

25. A recording apparatus according to claim 17, wherein said context data are stored in said means for storing context data corresponding to each of said plural recording element groups.

26. A recording apparatus according to claim 17, further comprising:

means for detecting edge portions of an image in accordance with said image data; and means for changing said context data with respect to the edge portions in accordance with the result of detection by said detecting means.

27. A recording apparatus according to claim 26, wherein said detecting means detects positions of image changing image data from data indicating non-recording to data indicating recording as edge portions.

28. A recording apparatus according to claim 26, wherein said detecting means detects positions of image changing image data from data indicating recording to data indicating non-recording as edge portions.

29. A recording apparatus according to claim 26, wherein said detecting means detects positions of image changing image data from data indicating non-recording to data indicating recording, and changing image data from data indicating recording to data indicating non-recording as edge portions.

30. A recording apparatus according to claim 26, wherein said changing means changes said context data to create recording drive data in accordance with image data on said edge portions.

31. A recording apparatus according to claim 17, further comprising setting means for setting said context data at a given initial value before recording begins by scanning by said scanning means.

32. A recording apparatus according to claim 31, wherein said setting means sets all the context data corresponding to said plural recording elements at a same initial value.

33. A recording apparatus according to claim 31, wherein said setting means sets context data corresponding to said plural recording elements at an initial value in accordance with a position of recording elements.

34. A recording apparatus according to claim 17, wherein said recording head is an ink jet head provided with a plurality of discharge ports for discharging ink from said discharge ports.

35. A recording apparatus according to claim 34, wherein said recording elements are electrothermal transducing elements for applying thermal energy to ink, and air bubbles are created in ink by thermal energy generated by driving said electrothermal transducing elements, and ink is discharged from said discharge ports by pressure exerted by the development of said air bubbles.

36. A recording method for forming images on a recording medium by driving a recording head relatively with respect to a recording medium in a main scanning thereof by use of the recording head provided with a plurality of recording elements for forming pixels to be recorded on a recording medium, comprising the following steps of:

provyding context data for controlling recording/non-recording of image data corresponding to the plurality of recording elements of the recording head;

creating drive data indicating the recording/non-recording of each of the recording elements in accordance with the context data and the image data corresponding to each of the plurality of recording elements;

updating the context data corresponding to a predetermined recording element in accordance with a creation of the drive data; and recording by driving the plural recording elements of the recording head in accordance with the created drive data.

37. A recording method according to claim 36, wherein context data are decoded, said decoded data are selected in accordance with positions of corresponding recording elements of said recording head, and drive data are created in accordance with AND of said selected data and said corresponding image data in said calculating means.

38. A recording method according to claim 36, wherein context data are created by adding said image data and said context data of the recording elements corresponding to said image data in said calculating means.

39. A recording method according to claim 36, further comprising the step of storing context data created in said context data updating step.

40. A recording method according to claim 36, wherein modes of drive data creation in accordance with context data corresponding to the recording elements of said recording head are differentiated in said drive data creating step.

41. A recording method according to claim 36, wherein an initial value of said context data is different in accordance with the recording elements corresponding to context data.

42. A recording method according to claim 36, further comprising the following steps of:

conveying said recording medium with respect to said recording head in a direction orthogonal to a scanning direction of said scanning means per scan in the main scanning direction of said recording head; and controlling recording for making an amount of conveyance of said recording medium in said conveying step smaller than a recording width of said recording head, and enabling the recording area to be recorded repeatedly by several continuous main scans, wherein drive data are created in said drive data creating step to complement said recording on the area repeatedly recorded by several recording scans by continuous recording scans in said recording control step for said area to be recorded repeatedly.

43. A recording method according to claim 36, further comprising the following steps of:

detecting edge portions of images in accordance with said image data; and changing said context data on the detected edge portions.

44. A recording method according to claim 43, wherein said context data are changed in said changing step to create drive data indicating driving in accordance with the image data on said edge portions.

45. A recording method according to claim 36, further comprising the step of setting said context data at a given initial value before starting recording scan.

46. A recording method according to claim 45, wherein all the context data corresponding to said plural recording elements are set at the same initial value in said setting step.

47. A recording method according to claim 45, wherein the context data corresponding to said plural recording elements are set at the initial value in accordance with positions of recording elements in said setting step.

48. A recording method according to claim 36, wherein said recording head is an ink jet head provided with a plurality of discharge ports for discharging ink from said discharge ports.

49. A recording method according to claim 48, wherein said recording elements are electrothermal transducing elements for applying thermal energy to ink, and air bubbles are created in the ink by thermal energy generated by driving said electrothermal transducing elements, and ink is discharged from said discharge ports by pressure exerted by the development of said air bubbles.

50. A recording apparatus having an ink jet head provided with a plurality of discharge ports to discharge ink onto a recording medium; main scanning means for enabling the ink jet head to scan in a main scanning direction relative to the recording medium; conveying means for conveying the recording medium in a sub-scanning direction orthogonal to the main scanning direction; and recording control means for forming images with ink on the recording medium by driving the ink jet head in accordance with drive data while the ink jet head performs the main scanning thereof by the main scanning means, comprising:

means for storing image data of images to be recorded, the image data being formed by data indicating pixels to be recorded or pixels not to be recorded;

context data storing means for storing context data for controlling recording/non-recording of the image data corresponding to each of the plurality of discharge ports;

calculating means for creating drive data indicating the recording/non-recording of each of the plurality of discharge ports in accordance with the image data stored in said means for storing image data and the context data, said calculating means creating drive data corresponding to a predetermined discharge port in accordance with the image data and the context data corresponding to the predetermined discharge port and updating the context data; and setting means for setting the context data at the initial value thereof per main scan by the main scanning means.

51. A recording apparatus according to claim 50, wherein said calculating means creates drive data for discharging ink from the corresponding discharge ports by driving said ink jet recording head per data appearing in given numbers indicating pixels of said image data to be recorded.

52. A recording apparatus according to claim 50, wherein said setting means sets context data corresponding to all said plural discharge ports at a specific value; and said calculating means creates said data indicating pixels of image data to be recorded as drive data to execute ink discharges from the corresponding discharge ports when said context data are set at the specific value.

53. A recording apparatus according to claim 50, further comprising:

multi-scanning control means for making a conveying amount of said recording medium by said conveying means smaller than a recording width of said recording head, and recording the area to be recorded repeatedly by several numbers of continuous main scans by said scanning means, wherein said setting means sets context data corresponding to all said plural discharge ports at a specific value;

said plural discharge ports are divided into a plurality of discharge port groups in accordance with the numbers of recording scans for recording a given area of image by several numbers of scans by said multi-scanning control means; and said calculating means creates drive data for discharging ink from the corresponding discharge ports as data indicating pixels of said image data to be recorded when the context data are given values, said given values being different per discharge port group having corresponding discharge ports being assigned thereto.

54. A recording apparatus according to claim 50, further comprising:

multi-scanning control means for making a conveying amount of said recording medium by said conveying means smaller than a recording width of said recording head, and recording an area to be recorded repeatedly by several numbers of continuous main scans by said scanning means, wherein said plural discharge ports are divided into a plurality of discharge port groups in accordance with the numbers of recording scans for recording a given area of image by several numbers of scans by said multi-scanning control means;

said setting means sets said context data at different values per discharge port group having the corresponding discharge ports being assigned thereto; and said calculation means creates drive data for discharging ink from the corresponding discharge ports as data indicating pixels of said image data to be recorded when the context data are given values.

55. A recording apparatus according to claim 50, wherein said recording head is provided with discharge means for discharging ink from said discharge ports, said discharge means being electrothermal transducing elements to apply thermal energy to ink, and air bubbles are created in ink by thermal energy generated by driving said electrothermal elements to discharge ink from said discharge ports by pressure exerted by the development of said air bubbles.

56. A recording method for a recording apparatus having an ink jet head provided with a plurality of discharge ports to discharge ink onto a recording medium; main scanning means for enabling the ink jet head to scan in a main scanning direction relative to the recording medium; conveying means for conveying the recording medium in a sub-scanning direction orthogonal to the main scanning direction; and recording control means for forming images with ink on the recording medium by driving the ink jet head in accordance with drive data while the ink jet head performs the main scanning thereof by main scanning means, comprising the following steps of:

providing image data formed by data indicating pixels to be recorded or pixels not to be recorded with respect to images to be recorded;

providing context data for controlling recording/non-recording of the image data corresponding to each of the plurality of discharge ports;

calculating drive data corresponding to the recording/non-recording of each of the discharge ports in accordance with the context data and the image data corresponding to each of the plurality of discharge ports, updating the context data corresponding to a predetermined discharge port in accordance with calculating the drive data, and recording by driving the plurality of discharge ports during a main scan by the main scanning means in accordance with the calculated drive data.

57. A data control apparatus according to claim 1, wherein said calculating means updates the context data corresponding to the predetermined recording element upon each creation of driving data for indicating the predetermined recording element.

58. A data controlling method according to claim 9, wherein said updating step updates the context data corresponding to the predetermined recording element upon each creation of driving data for indicating the predetermined recording element.

59. A recording apparatus according to claim 17, wherein said calculating means updates the context data corresponding to the predetermined recording element upon each creation of driving data for indicating the predetermined recording element.

60. A recording apparatus according to claim 50, wherein said calculating means updates the context data corresponding to the predetermined discharge port upon each creation of driving data for indicating the predetermined discharge port.

* * * * *

UNITED STATES PATENT AND TRADEMARK OFFICE
CERTIFICATE OF CORRECTION

PATENT NO.    : 6,085,028
DATED         : July 4, 2000
INVENTOR(S)   : Shinji Takagi et al.

It is certified that error appears in the above-identified patent and that said Letters Patent is hereby corrected as shown below:

<u>Title page,</u>
<u>Item [56] References Cited, under FOREIGN PATENT DOCUMENTS</u>:
"53-030083 5/1992 Japan" should read -- 5-330083 5/1993 Japan --.

<u>Column 1,</u>
Line 17, "an" should read -- a --.

<u>Column 8,</u>
Line 30, "102" should read -- 102, --; and
Line 38, "assign" should read -- assigns --.

<u>Column 9,</u>
Line 44, "give" should read -- given --.

<u>Column 10,</u>
Line 15, "number" should read -- numbers --;
Line 17, "number" should read -- numbers are --;
Line 20, "C1 and C1" should read -- C0 and C1 --;
Line 53, "#1" should read -- number 1 --; and
Line 54, "101 lets" should read -- controls --.

<u>Column 11,</u>
Line 8, "#2" should read -- number 2 --;
Line 35, "#1" should read -- number 1 --; and
Line 46, "at" should be deleted.

<u>Column 15,</u>
Line 56, "thereto" should read -- thereto is --.

<u>Column 17,</u>
Line 13, ""1"1, "0" "1", and "1"," should read -- "1", "0", "1", and "1", --.

<u>Column 20,</u>
Line 22, "process" should read -- Process --.

<u>Column 21,</u>
Line 45, "Do" should read -- DO --.

UNITED STATES PATENT AND TRADEMARK OFFICE
CERTIFICATE OF CORRECTION

PATENT NO. : 6,085,028
DATED : July 4, 2000
INVENTOR(S) : Shinji Takagi et al.

It is certified that error appears in the above-identified patent and that said Letters Patent is hereby corrected as shown below:

Column 30,
Line 60, ""2"" should read -- "2", --.

Column 31,
Line 56, ""5"" should read -- "5", --.

Column 32,
Line 43, "number" should read -- numbers --.

Column 33,
Line 40, "number" should read -- numbers --.

Column 35,
Line 46, "number" should read -- numbers --; and
Line 56, ""5"" should read -- "5", --.

Column 36,
Line 38, "number" should read -- Number --.
Line 43, "number" should read -- numbers --; and
Line 53, ""5"" should read -- "5", --.

Column 37,
Line 40, "number" should read -- numbers --; and
Line 50, ""7"" should read -- "7", --.

Column 38,
Line 42, "form" should read -- from --.

Column 40,
Line 58, "precedes" should read -- that precedes --.

Column 41,
Line 55, "number" should read -- numbers --.

Column 42,
Line 51, "S00" should read -- S01 --.

UNITED STATES PATENT AND TRADEMARK OFFICE
CERTIFICATE OF CORRECTION

PATENT NO. : 6,085,028
DATED : July 4, 2000
INVENTOR(S) : Shinji Takagi et al.

It is certified that error appears in the above-identified patent and that said Letters Patent is hereby corrected as shown below:

Column 43,
Line 18, "resent" should read -- reset --.

Column 46,
Line 27, "program" should read -- programs --.

Column 48,
Line 31, "nonrecording" should read -- non-recording --; and
Line 66, "means" should read -- method --.

Column 49,
Line 12, "positions" should read -- wherein positions --; and
Line 67, "means;" should read -- means; and --.

Column 50,
Line 16, "elements" should read -- element --.

Column 54,
Line 17, "ports;" should read -- ports; and --.

Signed and Sealed this

Thirteenth Day of November, 2001

Attest:

NICHOLAS P. GODICI
*Attesting Officer*   *Acting Director of the United States Patent and Trademark Office*